United States Patent [19]

Scott et al.

[11] Patent Number: 4,713,775
[45] Date of Patent: Dec. 15, 1987

[54] INTELLIGENT ASSISTANT FOR USING AND OPERATING COMPUTER SYSTEM CAPABILITIES TO SOLVE PROBLEMS

[75] Inventors: A. Carlisle Scott, Palo Alto; Jan E. Clayton, Los Altos Hills, both of Calif.; Jacques Garnier, Courbevoie, France

[73] Assignees: Teknowledge, Incorporated, Palo Alto, Calif.; Compagnie Generale de Geophysique, Colo.

[21] Appl. No.: 768,012

[22] Filed: Aug. 21, 1985

[51] Int. Cl.$^4$ .................... G06F 15/20; G01V 1/28
[52] U.S. Cl. .................... 364/513; 364/194; 364/300; 364/421; 367/38
[58] Field of Search ............. 364/513, 148, 191–193, 364/194, 200, 300, 900, 421; 382/14, 15; 367/37, 38, 73

[56] References Cited

U.S. PATENT DOCUMENTS

| | | | |
|---|---|---|---|
| 4,209,847 | 6/1980 | Noda et al. | 364/900 |
| 4,315,315 | 2/1982 | Kossiakoff | 364/300 |
| 4,389,706 | 6/1983 | Gomola et al. | 364/200 |

OTHER PUBLICATIONS

Arron Barr & Edward A. Feigenbaum, *Handbook of Artificial Intelligence*, vol. 2, Chapter X, William Kaufman, Inc. (1982) pp. 297–379.
James Bennett & Robert Engelmore, "Sacon: A Knowledge-Based Consultant For Structural Analysis," vol. 1 Proc. of the Sixth Int. Joint Conf. or Artificial Intelligence, Tokyo (Aug. 20–23 1979) pp. 47–49.
James Bennett & Robert Engelmore, "Sacon" A Knowledge-Based Consultant For Structural Analysis, Stanford University Computer Science Department Report No. Stan-CS-78-699 (Sep. 1978).
W. Van Melle et al., *The Emycin Manual*, Stanford Computer Science Report No. Stan-CS-81-885 (1981).
Wilensky et al., "Talking to UNIX in English: An Overview of UC", *Communications of the ACM*, vol. 27, No. 6 (Jun. 1984) pp. 574–592.
Larry R. Harris, "Natural Language Front Ends" Reprinted in P. H. Winston & K. A. Pendergast (Eds.), *The AI Business*, Chapter 12, MIT Press, Cambridge, Mass. (1984), pp. 149–161.
Kenneth H. Waters, *Reflection Seismology*, John Wiley & Sons, New York (1981) pp. 157–166, 181–223, 238–244, 307–316, 342–369.
J. J. Jakowski, *Exploration Geophysics*, Trija Publishing Co., (1950), pp. 696–705, 714–723, 842–847, 851–856.

*Primary Examiner*—Joseph Ruggiero
*Attorney, Agent, or Firm*—Stephen G. Rudisill

[57] ABSTRACT

To help a user program a computer target system to solve problems, the computer system is provided with predefined capabilities and the user is provided with a knowledge system that includes knowledge about applying the capabilities to effectively and efficiently solve the user's problems. The knowledge system provides automatic programming for solving problems within a particular domain, rejects problems that cannot be solved using the available capabilities of the target computer, and explains how and why a certain program was generated or why a program cannot be generated to solve a given problem. The knowledge system preferably collects information about the user's problem, designs a program that exploits the capabilities of the target computer system effectively to address the user's problem, encodes the program into a form suitable for execution on the computer system, conveys the program to the computer system, explains to the user why particular elements of the program are included, and justifies its reasoning to the user. A specific embodiment pertaining to reflection seismology is described for advising a user on how to apply a set of program modules for performing static corrections on seismic data, and for generating a job deck for execution on a general-purpose digital computer.

70 Claims, 19 Drawing Figures

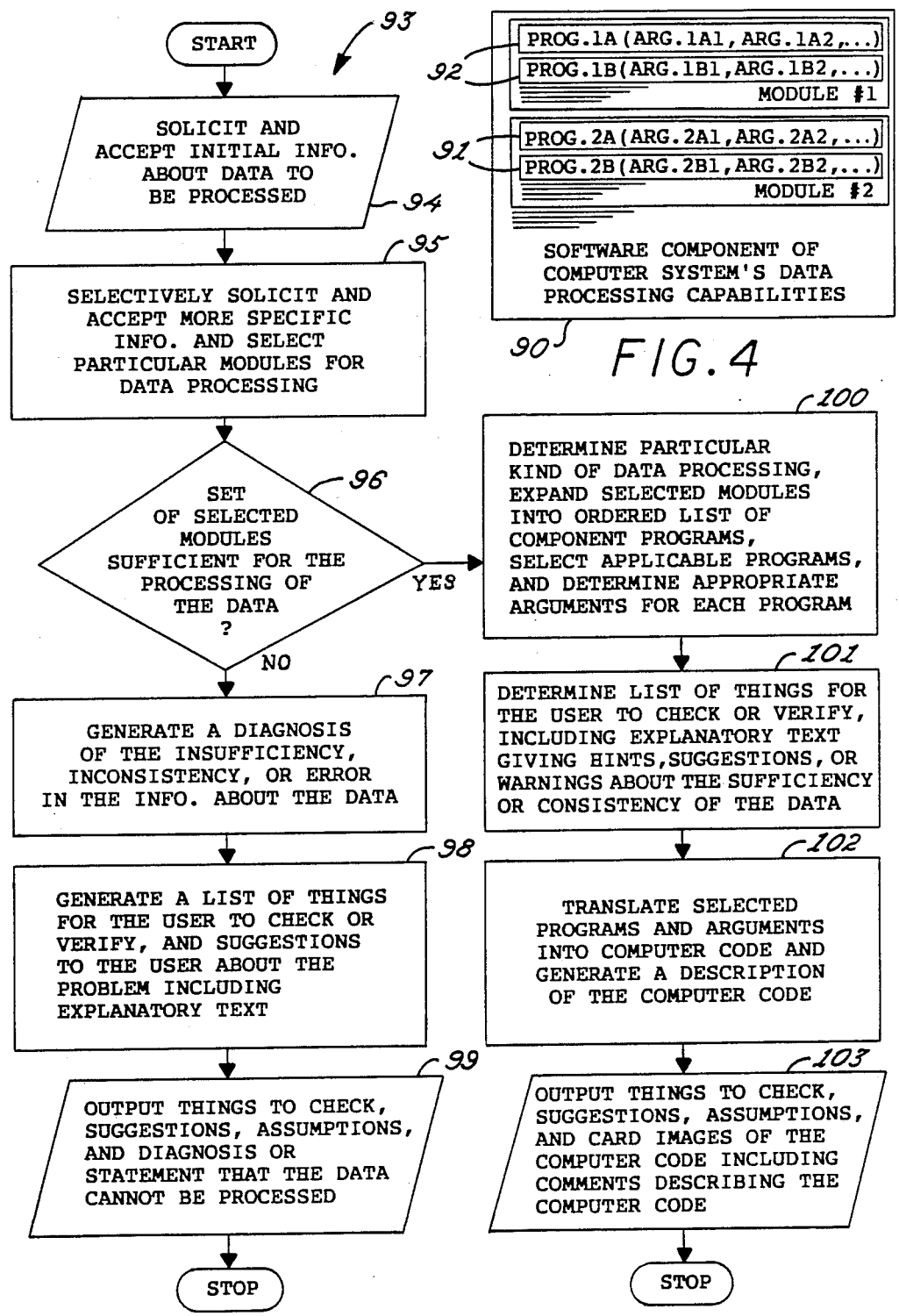

SET OF RULES

RULES TO DETERMINE CHECKS, WARNINGS, AND RECOMMENDATIONS REGARDING THE SURVEY —271

RULES TO FIND STATIC ANALYSIS TYPE (RIVER-STATICS, MOUNTAIN-STATICS, PLAIN-STATICS, DUNE-STATICS) —272

RULES TO DETERMINE TYPE OF STATICS INDICATED BY AN ANOMALY (LONG-WAVE, SHORT-WAVE, VERY SMALL) —273

RULES TO DETERMINE WHETHER SEMI-AUTOMATIC PROCESSING IS NEEDED —274

RULES TO DETERMINE TYPE OF SEMI-AUTOMATIC PROCESSING —275

RULES TO DETERMINE WHETHER AUTOMATIC LONG-WAVE CORRECTIONS SHOULD BE DONE —276

RULES TO DETERMINE THE TYPE OF PROCESSING FOR AUTOMATIC LONG-WAVE CORRECTIONS —277

RULES TO DETERMINE THE TYPE OF PROCESSING FOR AUTOMATIC SHORT-WAVE CORRECTIONS —278

RULES TO CREATE AN ORDERED LIST OF PROGRAMS FOR SELECTED TYPES OF PROCESSING —279

RULES TO DETERMINE ARGUMENTS FOR SELECTED PROGRAMS —280

RULES TO DETERMINE ARGUMENTS FOR FILTERING —281

RULES TO DETERMINE EXPLANATIONS FOR THE ARGUMENTS OF PROGRAMS —282

RULES TO DETERMINE PROBABLE CAUSE FOR STATICS —283

DEFINITIONAL RULES, AND RULES FOR PERFORMING CALCULATIONS OR OTHERWISE DETERMINING VALUES FOR COMMONLY USED PARAMETERS —284

INTELLIGENT ASSISTANT FOR USING AND OPERATING COMPUTER SYSTEM CAPABILITIES TO SOLVE PROBLEMS

BACKGROUND OF THE INVENTION

1. Technical Field

The present invention relates to artificial intelligence and knowledge engineering, and in particular to automatic programming. A specific embodiment is described pertaining to the field of reflection seismology.

2. Description of the Related Art

An overview of automatic programming systems and methods is presented in Avron Barr & Edward A. Feigenbaum, *Handbook of Artificial Intelligence*, Vol. 2, Chapter X, William Kaufmann, Inc. (1982), pp. 297-379. Programming can be defined as specifying a method for doing something the computer can do in terms the computer can interpret. Although at the most basic level the computer performs hard-wired primitives such as adding, subtracting, or moving numbers, it is now common to write the computer program in a higher level language which is compiled or translated into the computer's primitive codes. The use of higher level languages, however, has not solved the problem of minimizing the degree of detail and precision with which the steps in the computer must be specified. Over the years, the capabilities of computer hardware have steadily improved, and the cost of hardware has steadily declined. Consequently, programming applications of increasingly greater complexity have been addressed, and due to the sheer size of the software, the software is costly and often unreliable.

Automatic programming refers to the use of a computer system that assists humans in some aspect of programming. Typically, an automatic programming system has four identifying characteristics including a specification method, a target language, a problem area, and an approach or method of operation.

Several methods have been used or proposed for specifying the properties or characteristics of the desired program. The desired program may be precisely and unambiguously defined by the syntax and semantics of a very high-level programming language. Alternatively, the desired program might be specified by a sufficient number of examples of input/output behavior. To date, some success has been achieved by natural language systems which can interpret a user's description in English of what the desired program is to do. Natural language systems often interact with the user by checking hypotheses, pointing out inconsistencies, and asking for further information.

The target language is the language in which the computer program is written for execution on a target computer. Typically, the target language is a standard high-level language such as LISP, PL/1, or GPSS.

The problem area is the area of intended application or field of use of the desired program when it is executed or run on the target computer. A natural language system called NLPQ, for example, helps generate programs for solving simple queuing problems. A system called Protosystem I is intended to help generate computer programs for all input/output-intensive data-processing systems such as inventory control, payroll, and other record-keeping systems. A system called PSI is intended to help generate computer programs for all symbolic computation such as list processing, searching and sorting, data storage and retrieval, and concept formation.

The method of operation is the procedure by which the automatic programming system generates the desired computer program coded in the target language in response to the specification of the properties or characteristics of the desired program. Because automatic programming is a young research area, the categorization of the methods used by existing systems is difficult. Some of the more clear-cut methods include theorem proving, program formation, knowledge engineering, automatic data selections, traditional problem solving, and induction.

A knowledge system called SACON advised engineers in the use of a general-purpose structural analysis program called MARC which uses finite-element analysis techniques to simulate the mechanical behavior of objects. The MARC program offers a large choice of analysis methods, material properties, and geometries that may be used to model the structure of interest. SACON interacts with the engineer to obtain a description of the structure and the loading conditions and to recommend an appropriate analysis strategy which the engineer can implement. An analysis strategy includes a number of analysis classes and their associated analysis recommendations. Although SACON identifies factors that should be considered, SACON does not actually determine how to solve the structural analysis problem and does not direct the target computer system. SACON determines an appropriate analysis strategy by the backward chaining of rules, and uses EMYCIN as its framework. EMYCIN is a domain-independent system for building rule based consultants. See James Bennett & Robert Engelmore, "SACON: A Knowledge-Based Consultant For Structural Analysis," Vol. 1 Proc. of the Sixth Int. Joint Conf. on Artificial Intelligence, Tokyo (Aug. 20-23 1979), pp. 47-49; James Bennett and Robert Engelmore, "SACON: A Knowledge-Based Consultant For Structural Analysis," Stanford University Computer Science Department Report No. STAN-CS-78-699 (September 1978). See also W. van Melle et al., The Emycin Manual, Stanford Computer Science Report No. STAN-CS-81-885 (1981).

A UNIX natural language help facility called UC advises users in using the UNIX operating system. UC is comprised of a language analyzer and generator, a context and memory model, an experimental commonsense planner, knowledge bases which are said to be highly extensible on both the UNIX domain and the English language, a goal analysis component, and a system for acquisition of new knowledge through instruction in English. UC translates English requestes such as "delete all files" into appropriate UNIX shell commands such as "rm *". UC does not, however, incorporate expertise or explain its reasoning. See Wilensky et al., "Talking to UNIX in English: An Overview of UC", *Communications of the ACM*, Vol. 27, No. 6 (June 1984), pp. 574-592.

Natural language front ends have also been used in database management systems. A system called INTELLECT is said to enable nontechnical people to access data stored in their computers. INTELLECT translates questions such as "how many salespeople were above quota in 1982" into a data retrieval request for a back-end database system and then translates the answer into English for the user. INTELLECT cannot explain its reasoning and doesn't incorporate knowledge about problem solving. See Larry R. Harris, "Natural Language Front Ends", reprinted in P. H. Winston & K. A. Pendergast (Eds.), *The AI Business*, Chapter 12, MIT Press, Cambridge, Mass. (1984), pp. 149-161.

SUMMARY OF THE INVENTION

The primary object of the invention is to enable a user to solve a problem within a particular problem area by efficiently and effectively applying predefined capabilities of a target computer system.

Another object of the invention is to automate functions that otherwise would require user attention.

Still another object of the invention is to provide user access to expertise on how to solve problems and in particular on how to best employ predefined capabilities of a target computer system.

Yet another object of the invention is to increase productivity by providing more efficient use of a user's time and computer system resources while at the same time achieving better solutions to a user's problem.

Still another object of the invention is to help users learn what kinds of information are relevant to the solution of problems within a particular problem area, what plans are effective and efficient for solving such problems, and how to accomplish desired results using the available capabilities of a particular computer system.

Moreover, another object of the invention is to preserve, make maintainable, and distribute to all interested users otherwise limited expertise on both problem-solving methods and corresponding ways of using the available capabilities of a particular computer system.

And yet another object of the invention is to provide assistance to inexperienced users in using predefined programs for analyzing and interpreting data such as seismic data.

Moreover, another object of the invention is to make the user aware of specific pieces of the user's information that are of particular relevance to the design of a computer program.

Yet another object of the invention is to insure that all relevant information possessed by the user is considered in the design of a computer program and to insure that data to be processed by the computer program are properly collected and formatted for data processing.

And still another object of the invention is to provide a means for identifying the limitations of the data processing capabilities of a particular computer system so that the capabilities can be enhanced.

BRIEF DESCRIPTION OF THE DRAWINGS

Other objects and advantages of the invention will become apparent upon reading the following detailed description and upon reference to the drawings, in which:

FIG. 4 is a Venn diagram illustrating the division of the software component of a target computer system's data processing capabilities into a plurality of modules including programs having respective arguments;

FIG. 5 is a flowchart of the control procedure implemented by the preferred embodiment of the present invention for automatically programming the target computer system to use modularized software capabilities as shown in FIG. 4 for analyzing or solving a user's problem;

FIG. 19 is a Venn diagram of the set of rules in the knowledge base of the EMYCIN based embodiment of the invention corresponding to the hierarchy of context types of FIG. 11 and incorporating the reasoning strategy shown in FIG. 10.

Figure 1:
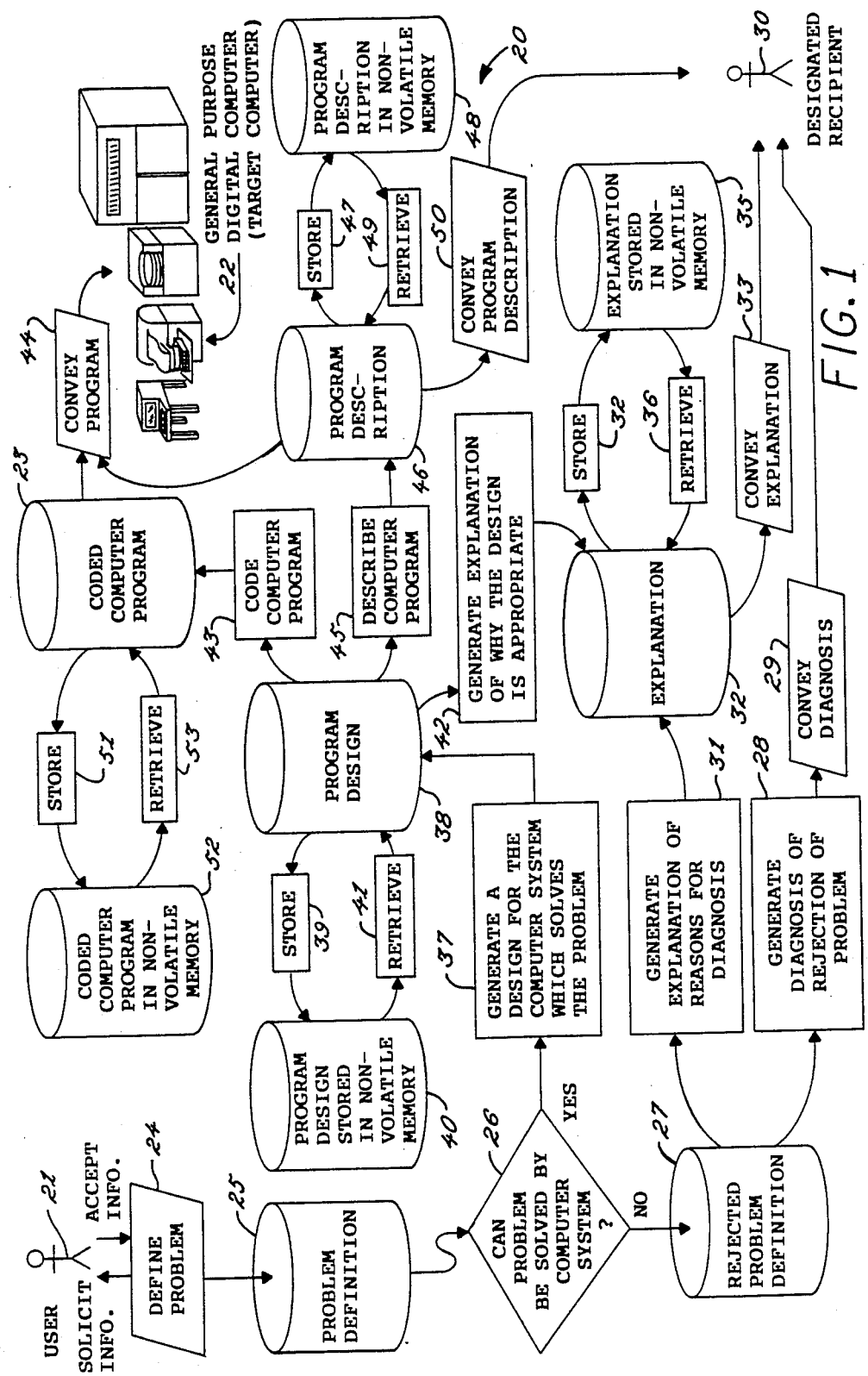
FIG. 1 is a functional block diagram of a preferred embodiment of the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DESCRIPTION OF THE PREFERRED EMBODIMENT

Turning now to the drawings, there is shown in FIG. 1 a generalized functional block diagram of a preferred embodiment of the present invention generally designated 20 to help a user 21 program a general purpose digital computer 22 to solve a specified problem.

In accordance with standard terminology, the system 20 is an automatic programming system having the general purpose digital computer 22 as its "target" computer. As in any kind of automatic programming system, the primary object of the system 20 is to assist the user 21 in generating a coded computer program 23, called the "target" computer program, to be executed by the target computer 22. Reference to the general purpose digital computer 22 as the target computer also helps distinguish the target computer from the "host" computer (not shown) which implements the automatic programming system 20. As will become apparent, the automatic programming system 20 is a computer system implementing the techniques of applied artificial intelligence and it is preferably implemented on a host computer such as a Digital Equipment Corp. model DEC-20 which is suited for running interactive artificial intelligence programs. The target computer 22 is typically a rather large computer suitable for batch processing. As described further below, for the processing of seismic data, the target computer 22 is preferably a Control Data Corporation CYBER 700 or 170 series computer. For some other applications, however, the automatic programming system 20 could be implemented by or executed on the target computer 22. In general, the target computer 22 is any system of information processing capabilities stored and executed in hardware or software. At any given time, however, the target computer 22 has limited and predefined capabilities or functions that it can perform upon request. These capabilities are limited by the available hardware such as memory capacity and the available software such as system utilites and application packages.

To help the user 21 program the target computer 22 to solve a problem specified by the user, the user is given access to the automatic programming system 20 which is a knowledge system that includes knowledge about applying the target computer system's capabilities to effectively and efficiently solve the user's problem. In particular, the knowledge system 20 provides automatic programming for solving problems within a particular domain or problem area, rejects problems that cannot be solved using the available capabilities of the target computer 22, and explains how and why a certain computer program 23 was generated or why a program cannot be generated to solve a given problem.

To define the user's problem, the knowledge system 20 includes means 24 for soliciting and accepting information so that a definition or specification 25 of the problem is obtained. To determine whether it is impractical to design a computer program for the target computer 22 that uses the capabilities of the target computer system to solve the problem specified by the user, the knowledge system includes means 26 for using specific knowledge about methods of employing the capabilities of the target computer system 22 to solve problems relating to the problem area. By applying this specific knowledge to the problem definition 25, the knowledge system 20 determines whether the problem definition 25 specifies a problem that can be solved by the target computer system 22.

If the problem cannot be solved by the target computer system, the problem definition 25 becomes a rejected problem definition 27. The knowledge system 20, however, includes means 28 for generating a diagnosis characterizing the impracticality of designing a computer program for the target computer system when the problem definition is rejected, and also includes means 29 for conveying the diagnosis to a designated recipient 30.

The designated recipient 30 could be the user 21. Alternatively, the designated recipient 30 could be a person having specialized knowledge about the capabilities of the target computer 22. In such a case, the designated recipient 30 could have responsibility for enhancing the capabilities of the target computer system 22 and/or upgrading the knowledge system 20 so that the target computer system 22 may better suit the legitimate needs of the user 21.

In addition to the diagnosis characterizing the impracticality of designing a computer program to solve the particular problem, the knowledge system 20 includes means 31 for generating an explanation 32 of the reasons for the diagnosis, and the knowledge system 20 further includes means 33 for conveying the explanation to the designated recipient 30. Means are also provided for storing 34 the explanation 32 in nonvolatile memory 35 and for retrieving 36 the stored explanation 35. Stored explanations for a number of rejected problem definitions can then be stored in nonvolatile memory 35 to be retrieved and reviewed by the designated recipient 30. Therefore, the designated recipient 30 need not be monitoring the knowledge system 20 when the system is assisting the user 21. Rather, the designated recipient 30 can review the explanations at a more convenient time.

When the means 26 determines that the problem can be solved by the target computer system, then means 37 generate a program design 38 for the computer system 22 which solves the problem. Means are also provided for storing 39 the program design 38 in nonvolatile memory 40 and for retrieving 41 the stored program design. A number of program designs, for example, can be stored in the nonvolatile memory 40 based on variations in the problem definition 25, and a selected one can later be retrieved for further processing.

In order to provide justification for a program design 38, means 42 are provided for generating an explanation 32 of why the design is appropriate. This explanation can be stored in the nonvolatile memory 35 with other explanations for review by the designated recipient 30 at a later time.

In general, the program design 38 is a prescription for behavior of the target computer 22 which typically omits some minor details but which specifies the program in enough detail so that filling-in of final details required by the particular target computer 22 is straightforward. In particular, the knowledge system 20 includes means 43 for generating the coded computer program 23 which is transmitted by means 44 for conveying the program to the target computer 22. The means 43 for coding the computer program, in other words, fill in any missing details and translate the program design into an executable format.

The program design 38 is preferably in an internal format efficient for storage, retrieval, and coding. In order to provide a description of the program design and the functional aspects of the coded computer program 23, means 45 are provided for generating a program description 46. The program description may include a graphical or symbolic description such as a flowchart as well as a natural language description. Preferably, the program description 46 provides comments for the coded computer program 23 which are merged with the coded computer program and conveyed to the target computer 22. Comments, for example, are especially useful when the target computer 22 is run in the batch mode so that the operators of the target computer 22 can properly identify the program, its objectives, operations and results. Means are also provided for storing 47 the program description 46 in nonvolatile memory 48 and for retrieving 49 the stored program description. Means 50 are provided for conveying the retrieved program description 46 to the designated recipient 30 for review at a convenient time.

One of the functions of the designated recipient 30 could be to review the program description 46 of the coded computer program 23 before the coded computer program is conveyed 44 to the target computer 22. For this purpose, means 51 are provided for storing the coded computer program 23 in nonvolatile memory 52. Means 53 are provided for retrieving a selected computer program stored in nonvolatile memory 52 after the designated recipient 30 has reviewed the respective program description 46. Then the retrieved computer programs 23 can be conveyed to the target computer 22 for execution. Thus, it is evident that the knowledge system 20 selects, configures and controls the appropriate capabilities of the target computer 22 to increase the productivity of the user 21. The explanation facilities 42, 31 provide justification for the work planned and performed.

Figure 2:
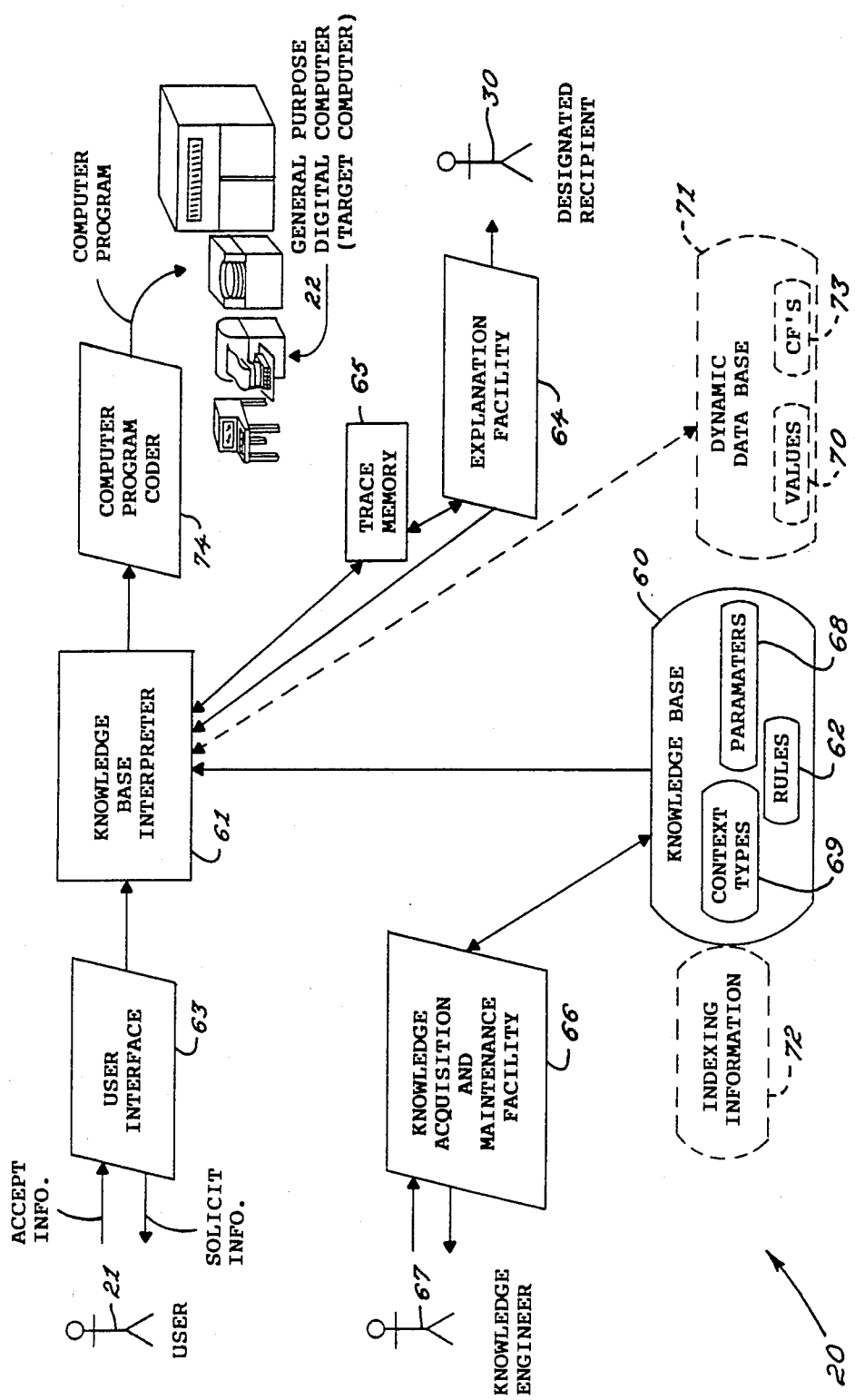
FIG. 2 is a schematic diagram of the preferred components for implementing the preferred embodiment of the present invention shown in FIG. 1.

Turning now to FIG. 2, there is shown a schematic diagram of the knowledge system 20 implemented as a rule-based expert system comprising a knowledge base 60 and a knowledge base interpreter 61. The knowledge base 60 includes distinct rules 62 for encoding predefined knowledge about methods of solving problems relating to the particular problem area. The knowledge base interpreter 61 includes a rule interpreter or inference engine for applying the rules 62 to the problem definition. To obtain a problem definition from the user 21, the knowledge system 20 includes a user interface 63. Moreover, the knowledge base 20 includes an explanation facility 64 providing the means 31 for generating an explanation of the reasons for the diagnosis and the means 42 for generating an explanation of why the program design is appropriate (see FIG. 1). The same explanation facility 64 provides both of these functions since in either case an explanation can be generated by tracing the sequence of the rules 62 that are interpreted by the knowledge base interpreter 61. Each time that a particular rule is interpreted or applied, a note is made in a trace memory 65. Therefore, a sequential record of the rules applied becomes stored in the trace memory 63 and the explanation facility 64 can generate an explanation or justification of any result by reference to the particular rules that are applied to achieve the respective result.

The versatility of the knowledge system 20 is enhanced by the fact that the knowledge base interpreter 61 is domain independent and the knowledge base 60 is domain dependent. In other words, the knowledge base 60 may be programmed for any desired problem area and there is little need to change the knowledge base interpreter 61 for a particular problem area. A knowledge acquisition and maintenance facility 66 is provided to permit a knowledge engineer 67 to build, modify or augment the knowledge base 60.

The knowledge base 60 is, in effect, a computer program encoded or written in a domain-independent expert system language that is interpreted and executed by the knowledge base interpreter 61 in order to provide a dialog or consultation session with the user 21. The preferred expert system programming language is KS300 which is interpreted by a KS300 expert system tool providing the knowledge base interpreter 61, the user interface 63, the explanation facility 64, and the knowledge acquisition and maintenance facility 65. The KS300 tool is an article of commerce manufactured and sold by Teknowledge, Inc., 525 University Avenue, Palo Alto, Calif. 94301. KS300 is an extension of the EMYCIN system developed from the Stanford University consultant program called MYCIN which diagnoses blood-born bacterial and meningitis infections and recommends appropriate therapy.

The knowledge base 60 stores both factual or declarative knowledge about the problem area and procedural knowledge about how to carry out the dialog with the user 21 and how to solve the user's problem. In addition to the rules 62, the declarative and procedural knowledge in the knowledge base 60 is organized in terms of defined parameters 68 referenced by the rules 62, and defined context types 69 to which the rules and parameters relate and which to some degree control the flow of the consultation or dialog between the user 21 and the knowledge system 20. The parameters 68 represent attributes or characteristics associated with each context. During the consultation or dialog with the user 21, a context or instance of a particular context type can take on values for any of the parameters associated with that context type. The values of parameters for a context measure or quantify the respective attributes or characteristics for that instance of the context type. Parameters, in other words, are somewhat analogous to variables in other programming languages, but the parameters in the KS300 language or EMYCIN language may take on symbolic as well as alpha numeric or numeric values and may be multi-valued. A parameter, for example, can be determined to have a definite symbolic value of "unknown". To avoid ambiguity, when the knowledge system 20 does not know the value of a parameter, it will be said that the parameter is undetermined.

Context types define actual or conceptual entities in the problem area. Typically, a conceptual entity is structural or procedural in nature and represents or is associated with a particular group of tasks to be performed during a consultation.

Typically, the inference rules are in the form of a production rule or IF-THEN statement specifying that an action or set of actions in the conclusion is to be performed when the condition or set of conditions in the premise is true. For ease of rule interpretation, the premise is in the form of a conjunction of logical predicates, each predicate being a logical expression involving the value of one or more parameters. Because the premise clauses of the if-then-rules are defined in terms of parameters, and the parameters are, in turn, associated with particular context types, it is evident that a particular rule applies only to contexts of particular types. The set of context types to which a particular rule applies is the subject of the rule.

Rules may be used to specify both factual knowledge and control knowledge. A rule that encodes control knowledge may, for example, change the selection and ordering of tasks to be performed and the rules to be applied. A rule which encodes factual knowledge about the case under consideration may have an action clause that sets at least one parameter of one context to a predetermined value in response to parameters in the premise clause of the rule taking on certain values.

The knowledge base interpreter 61 includes a rule interpreter which applies a goal-directed backward chaining procedure for finding the value of a goal parameter by applying the rules which include that parameter in their action clauses. If the values of the parameters in the premise clauses of such rules are undetermined, the rule interpreter operates recursively to find other rules which include the parameters in their action clauses or by asking the user. As the values of the parameters 68 become determined during a consultation, the values 70 are stored, for future reference, in a dynamic database 70.

The knowledge acquisition and maintenance facility 66 is used by the knowledge engineer 67 to build the knowledge base 60 and insures that the context types 69, parameters 68, and rules 62 are properly defined in terms of the language interpreted by the knowledge base interpreter 61. The knowledge acquisition and maintenance facility 66 automatically generates indexing information 72 as the context types, parameters, and rules are first defined in the knowledge base 60. This indexing information, for example, keeps track of the subject of each rule 62 and computes lists for each parameter 68 of the rules that update or use the parameter in their action or premise clauses, respectively. Thus, during the process of determining or finding values of a goal parameter these precomputed index lists are referenced for finding the rules to chain together. Due to the recursive nature of the chaining process, the rule-chaining process is easily used for executing control knowledge about how to carry out the consultation as well as for determining the values of parameters. Thus, the actual value of a particular goal parameter for a particular context may be unimportant and may be sought out merely as a means to invoke or apply certain rules containing control information.

The KS300 and EMYCIN domain-independent consultant-building systems or tools contain several features that facilitate communication between the knowledge system 20 and the knowledge engineer 67 or user 21 and which also aid in making the system applicable to solving real-world problems. To permit the knowledge system 20 to use uncertain or incomplete data, both the rules 62 and the values 70 of the parameters 68 may have associated measures of certainty. A measure of certainty is termed the "certainty factor" (CF), which may be zero indicating that the value of the parameter is unknown, and may range from +1.0 indicating that the value is known with certainty, and to −1.0 indicating that the value is known to be certainly false. Whenever the knowledge base interpreter 61 determines a value 70 for a parameter 68, an associated certainty factor 73 is determined and stored in the dynamic database 71 along with its respective value 70.

The explanation facility 64 can answer user questions about the contents of the knowledge base 51 and the dynamic database 58, and can display the line of reasoning recorded in the trace memory 65. Also, the knowledge acquisition and maintenance facility 66 provides a terse, stylized but easily understood language for writing the production rules 62. The knowledge acquisition and maintenance facility 66, as well as the user interface 63, provides extensive checks to catch common user errors such as misspellings. The knowledge acquisition and maintenance facility 66 and the knowledge base interpreter 61 also provide methods for handling all necessary bookkeeping chores for updating the indexing information 72 in the dynamic database 71.

Due to the context-parameter-value-CF format for storing knowledge about objects in the knowledge base 60 and dynamic database 71, the program design 38 (FIG. 1) is efficiently described in this format. The coded computer program 23, however, cannot be described in this format since its format must be executable by the target computer 22. In order to efficiently code the computer program from the program design 38 which is built up in the dynamic database 71 during a consultation, a computer program coder 74 is specifically written for the particular programming language of the target computer 22. The computer program coder 74, for example, is a function written in the LISP programming language in which the KS300 and EMYCIN systems are written. The computer program coder 74 is executed or invoked by the knowledge base interpreter 61 when the knowledge base interpreter interprets the name of the program coder function in a rule or context definition. The name of the program coder function is similar to a parameter, but the function is executed or invoked to determine the value associated with the name of the program coder function.

Figure 3:
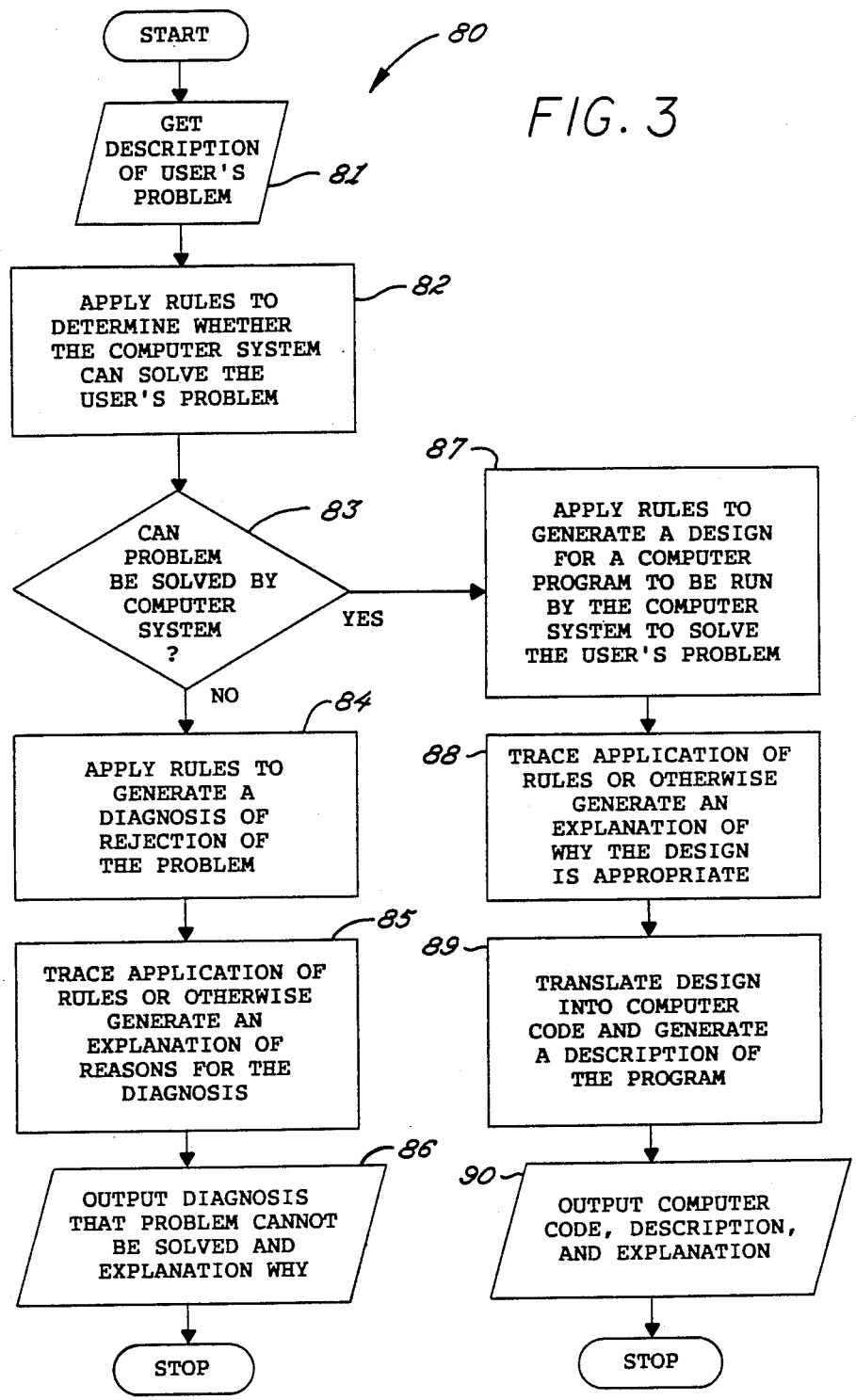
FIG. 3 is a generalized flowchart of the automatic programming procedure performed by the preferred embodiment of the present invention shown in FIG. 1.

As was introduced above, the context type definitions 69, parameter definitions 68, and production rules 62 encode both declarative knowledge specifying the capabilities of the target computer and procedural knowledge about how to obtain relevant information from the user and generate a responsive computer program for using the specified capabilities of the target computer system. Turning now to FIG. 3, there is shown a flowchart generally designated 80 illustrating the procedural knowledge or control sequence for obtaining a problem definition 25 from the user 21, applying the knowledge about the capabilities of the target computer, and generating a responsive computer program for the target computer to solve the user's problem. In the first step 81, the user interface 63 (FIG. 2) obtains a description of the user's problem. Then in step 82, rules are applied to determine whether the computer system can solve the user's problem. During the application of these rules, more particular information about the user's problem may be solicited from the user to obtain a more precise definition of the user's problem. In step 83 control branches depending on whether the problem can be solved using the capabilities of the target computer 22. If it is impractical to solve the user's problem using the capabilities of the target computer, then in step 84 rules are applied to generate a diagnosis characterizing the impracticality of designing a computer program for the target computer system. In step 85, the previous application of the rules is traced to generate an explanation of reasons for the diagnosis. Then, in step 86, a diagnosis that the problem cannot be solved and an explanation why is transmitted to the designated recipient such as the user 21.

If it is decided in step 83 that the problem can be solved by using the capabilities of the target computer, then in step 87 rules are applied to generate a design for a computer program to be run by the target computer system to solve the user's problem. Next in step 88 the application of the rules is traced to generate an explanation of why the design is appropriate. In step 89, the design is translated into computer code and a description of the program is generated. Finally, in step 90, the computer code is transmitted along with a description of the program and an explanation of why the design is appropriate.

The specific embodiment of the present invention as shown in FIGS. 1–3 is particularly useful for solving data processing problems. As shown in FIG. 4, in this situation the software component of the target computer system's data processing capabilities, generally designated 90, is preferably defined in terms of a set of modules 91 which themselves are comprised of ordered lists of programs 92. It should be noted, however, that a particular program may appear more than once in a particular module 91 and different modules may include the same programs. Each module, however, is associated with a particular function or task which could be useful for coding a computer program to solve a problem in the problem area. The function or task performed by a module 91, however, may be further specified or defined by arguments (ARG.) for particular occurrences of programs in the modules 91.

For data processing applications, the control sequence of FIG. 3 is preferably implemented by the more specific steps shown in the flowchart generally designated 93 of FIG. 5. In the first step 94, certain initial information is solicited and accepted from the user about the data to be processed. This initial information includes, for example, how the data was collected and particular observation about the raw data to be processed. Then in step 95 more specific information is selectively solicited in response to the initial information and particular modules are selected for data processing. Then in step 96 a decision is made whether the set of selected modules is sufficient for the processing of the data. If not, then in step 97 a diagnosis is generated of the insufficiency, inconsistency, or error in the information about the data. In step 98, a list is generated of things for the user to check or verify, and suggestions to the user are generated about the problem including explanatory text. Then in step 99 the things to check, suggestions, assumptions, and diagnosis or statement that the data cannot be processed is transmitted.

If it is determined in step 96 that the set of selected modules is sufficient for the processing of the data, then in step 100 the particular kind of data processing is determined and the selected modules are expanded into ordered lists of their component programs. The applicable programs are further selected or their operation is more particularly specified or modified by determining appropriate arguments for each program. Then in step 101 a list is determined of things for the user to check or verify, including explanatory text giving hints, suggestions, or warnings about the sufficiency or consistency of the data. In step 102, the selected programs and arguments are translated into computer code and a natural language description of the code is generated. Finally, in step 103, things check, suggestions, assumptions and card images of the computer code including comments describing the computer code are transmitted.

Figure 6:
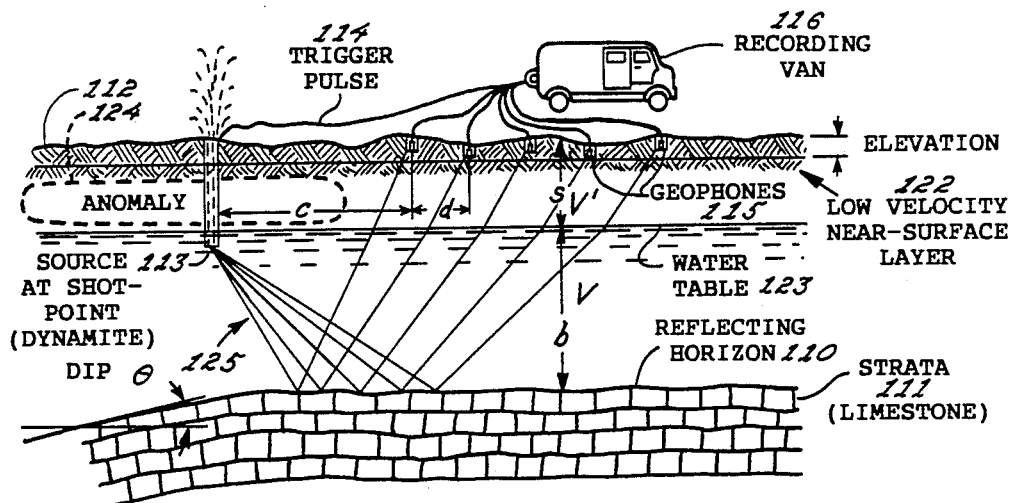
FIG. 6 is a cross-sectional schematic of a simplified application of reflection seismology.

The particular control sequence as shown in FIG. 5 is especially useful for the analysis of seismic data, and in particular for generating a computer program to perform static corrections upon seismic data. Turning now to FIG. 6, there is shown schematically in cross-section a set-up for performing a seismic survey according to a simple—and outdated—method of reflection seismology. This simple method, however, clearly illustrates the kinds of corrections that must be applied to seismic data and the physical factors which affect the data.

The chief purpose of "reflection shooting" is to obtain a subsurface map of the geological structure without the expense of drilling numerous deep holes, wherein exact measurement could be made. A basic assumption underlying seismic surveying is that the subsurface formations have different physical properties, thereby causing reflections and refractions of seismic waves at interfaces between formations. The interfaces are called reflecting horizons or more simply horizons. Shown in FIG. 6, for example, is a reflecting horizon 110 between a limestone strata 111 and overlying earth 112 which extends to the surface.

A more specific assumption underlying reflection shooting is that there is a correspondence between the depths of reflecting horizons and the delay or travel times of artificially induced seismic waves generated at a source or shot-point and received by seismic receivers such as geophones at the surface of the earth. As shown in FIG. 6, the source 113 at the shot-point is a dynamite explosion initiated by a trigger pulse 114, and the receivers are geophones 115 based at regular intervals on the surface of the earth. The particular arrangement shown in FIG. 6 between the geophones 115 and the shot-point 113 is called an off-end or unidirectional spread. The shot-point 113 is spaced a near offset distance (c) from the array of geophones 115, and the geophones are spaced by an offset distance (d). For simplifying data analysis, the near offset distance (c) is typically selected to be a multiple of the offset distance or spacing (d).

The seismic data obtained from the set-up as shown in FIG. 6 consists of information about the set-up of the shot-point and receivers, any known information about the geography or geological structure in the region where the survey was conducted, and the seismic signals indicated by the geophones. In general, the analysis of the seismic data consists of processing of the signals from the geophones 115, which are called traces, based on the other data about how the traces were obtained and the geographical or geological data which may help to interpret the traces. In the field, the traces and the trigger pulse are simultaneously recorded in a recording van 116 to preserve their temporal relationships.

Figure 7:
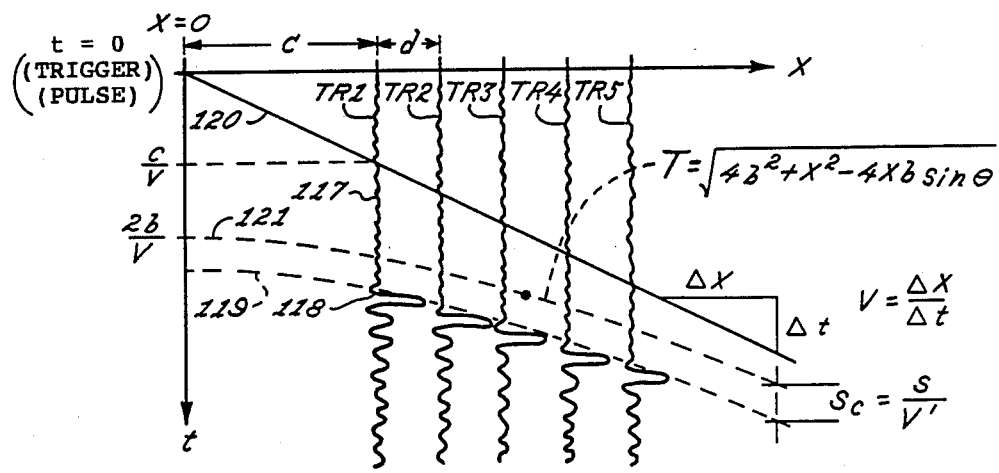
FIG. 7 is a plot of a set of seismic traces corresponding to the simplified example shown in FIG. 6.

Shown in FIG. 7 is a graphical plot of five traces TR1-TR5, such as might be obtained using the set-up as shown in FIG. 6. It should be noted, however, that the diagram in FIG. 6 is highly schematic and in general is out of proportion with respect to the depths and distances shown. In practice, however, traces similar to those shown in FIG. 7 are obtained. The traces are plotted with the distance or (x) direction shown from left to right corresponding to the spread or layout of the geophones 115 in FIG. 6. The zero distance (x=0) position corresponds to the shot-point 113. The time axis (t) however, is shown running from top to bottom corresponding to the direction of depth from the surface of the earth in FIG. 6. The zero time (t=0) position corresponds to the surface of the earth and is defined by the time of the trigger pulse 114 initiating the artificial seismic waves generated by the dynamite source 113.

Each seismic trace TR1-TR5 exhibits a relatively small amount of random noise 117 from the zero time of the trigger pulse up to a "first break" time at which a pronounced reflection 118 is observed. The time at which the first break 118 occurs is roughly proportional to the depth of the reflecting horizon 110 and is inversely proportional to the velocity (V) of the artificial seismic waves traveling through the earth. Therefore, it is evident that a single trace cannot indicate the depth of the reflecting horizon when the velocity (V) is unknown. The collection of traces TR1-TR5, however, does give an indication of the velocity (V) due to the fact that the horizontal distance from the shot point to the receivers is not the same for the various traces. Due to this step-out or move-out of the receivers 115 from the shot-point, the time of the first break 118 increases with the increased horizontal spacing of the geophone 115, and the move-out in time is inversely proportional to the velocity (V). Detailed analysis shows that the time delay (T) from the trigger pulse to the occurrence of the first breaks 118 should be given by the following formula:

$$T = \sqrt{4b^2 + x^2 - 4xb\sin\theta}$$

The locus 119 of the first breaks should be a hyperbola, the asymptote of which 120 indicates velocity (V) and the intercept time (at x=0) being equal to twice the depth of the reflecting horizon (b) divided by the velocity (V).

As is evident in FIGS. 6 and 7, however, there is an additional static correction ($S_c$) which must be applied to all of the traces TR1–TR5 in order for the locus 119 of the first breaks to be the travel time curve 121 given by the square root formula above. The static correction ($S_c$) represents an additional time for the seismic waves to travel through a low velocity near-surface layer 122 having a lower velocity (V) than the velocity (V) of the earth directly above the reflecting horizon 110. The low velocity near-surface layer 122 is sometimes called the "weathering layer" although in some cases, such as the case shown in FIG. 6, the lower extent of the low velocity near-surface layer is correlated with the water table 123. Due to the fact that the low velocity near-surface layer is a relatively good absorber and a relatively poor transmitter of seismic waves, the source 113 is preferably placed just below the low velocity near-surface layer 122. Therefore, the static correction ($S_c$) is approximately equal to the depth (s) of the low velocity near-surface layer 122 divided by the seismic velocity (V') of the low velocity near-surface layer. It should be noted, however, that due to variations in elevation of the geophones 115, the static correction ($S_c$) required for each trace should be a function of the elevation of the respective geophone. Also, the required static correction ($S_c$) may vary substantially from one trace to the next due to variations in the seismic velocity (V') in the near-surface layer 122. Sometimes there are regions or islands 124 in the near-surface layer, called "anomalies," which have anomalous or deviate values of seismic velocity.

After correcting the traces TR1–TR5 for the static correction ($S_c$) they should lie upon the hyperbolic curve 121 from which the seismic velocity (V) and depth (b) of the reflecting horizon 110 may be determined. In all but the most elementary situation as shown in FIG. 6, however, additional steps are required to obtain an estimate of the profile of the reflecting horizon 110. In particular, the precise point on any given trace where the reflection 118 occurs for a particular reflecting horizon may be masked due to seismic waves traveling along paths different from the paths or rays 125 of the seismic waves that are reflected by the horizon 110 and propagate to the geophones 115. These interfering seismic waves could propagate from the source 113 to the geophones 115 by a direct path, by refraction, by ground waves, or by reflection from horizons other than the horizon 110.

A method called stacking of traces has been devised for reducing the effect of interfering seismic waves and accentuating a selected reflection. In brief terms, the stacking operation entails first correcting all of the traces TR1–TR5 by appropriate time shifts so that selected reflections from a particular horizon are aligned, and then adding or summing the traces together. Since the traces will then be aligned in phase only for the selected reflection, the energy or waveforms of the selected reflection will add coherently while the energy or waveforms of the undesired reflections, noise and refracted, direct or ground waves will add incoherently due to partial phase cancellation. When sinusoidal signals are in phase, their amplitudes add directly together. But when two sinusoidal signals having equal amplitudes but a random phase relation to each other are added, the amplitude of the sum is the square root of two rather than twice the individual amplitude. By stacking a number of traces together, the amplitude of a desired reflection is generally accentuated by a factor equal to the square root of the number of traces.

In FIG. 7, after the traces TR1–TR5 are statically corrected by subtraction of the time delay ($S_c$) and lie upon the hyperbola 121, they can be further corrected by what is called a "normal moveout" correction (NMO) so that they are all aligned at the intercept time (2b/V). The normal moveout, in other words, is the difference between the time (T) calculated according to the square root formula above, and the value (2b/V) which results at the position of the shot-point (x=0).

The simple stacking method just described, however, suffers several serious defects. These defects arise from the fact that in the real world the situation is more complex than is shown in FIG. 6. In particular, the seismic velocity (V) is not independent of depth, and also the reflecting horizon 110 may not be horizontal. The angle ($\theta$) with which the reflecting horizon 110 deviates from horizontal is known as the "dip" of the reflecting horizon. When it is suspected that the reflecting horizon 110 is not horizontal, the extent of the dip can be more precisely determined by placing the shot-point 113 at the center of a linear spread of receivers. The linear spread is then known as a "split-spread" and the dip becomes clearly apparent from a corresponding tilting of the hyperbolic locus 119 of the reflections 118 on a plot of the traces for the common shot-point. This technique, however, still assumes that the dip is constant at the numerous points of reflection of the rays 125 off of the reflecting horizon 110.

Figure 8:
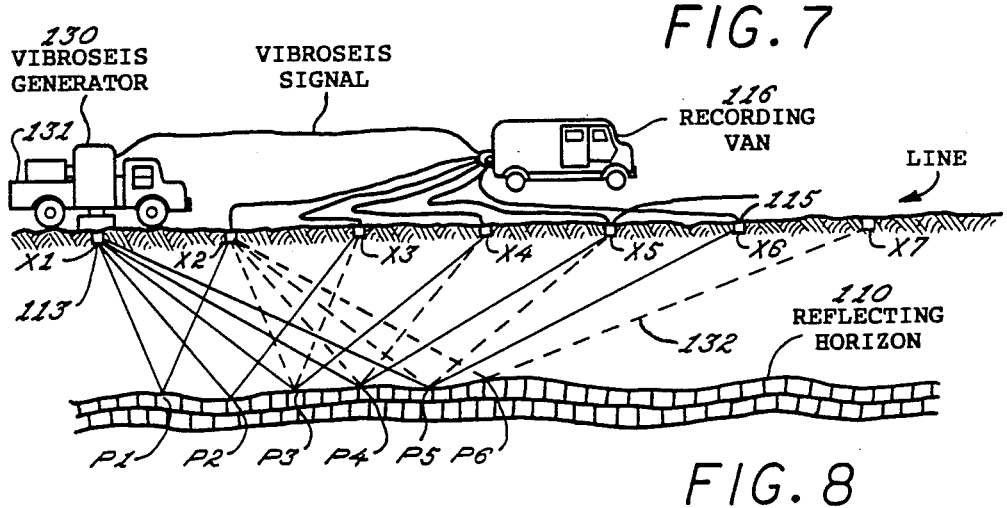
FIG. 8 is a cross-sectional schematic diagram illustrating the standard common depth point (CDP) method of reflection seismology.

For performing reflection surveys and obtaining a seismic cross-section, a standard method called the constant depth point or CDP method is now practically standard. This method stacks traces for a common depth point or common point of reflection so that the effect of dip is eliminated when the seismic velocity (V) is determined, and the traces need not be corrected for dip before they are stacked to emphasize selected reflections. The common depth point method is illustrated in FIG. 8. As is now quite common, the seismic source 113 is shown as a "Vibroseis TM" (trademark) generator 130 carried by a truck 131. The Vibroseis TM generator mechanically induces controlled vibrations in the earth at the "shot-point" in response to a Vibroseis TM signal. The Vibroseis TM signal is, for example, a pseudorandom signal or swept-frequency signal that can be correlated with the signals from the geophones 115 to generate traces as shown in FIG. 7.

After the signals from the geophones 115 are recorded for the set-up shown in FIG. 8, the geophone at the $X_2$ position is moved forward along the line to the $X_7$ position. The truck 131 is then moved so that the next shot-point is located at $X_2$. The geophone signals are recorded for this new position, for which the rays 132 are shown as dashed lines. The points of reflection P3, P4, P5 and P6 all become points of common reflection or common depth points between the signals from the geophones for the first shot vs. the geophones for the second shot. Specifically, the groups of traces for common shots can be rearranged or formatted in terms of groups of traces having common points of reflection or common depth points. These groups of traces can then be stacked together without first correcting for dip of the reflecting horizon 110.

In practice, a seismic survey on land includes a number of steps in addition to those shown in FIG. 8. The CDP technique is basically designed for use in oil and gas exploration where the depths of interest usually fall between about 1000 meters and 10,000 meters. Thus, the first step in the overall procedure usually is to choose a promising area for the survey based on existing wells, geological studies, or other types of prospecting. Moreover, within this area, one or more lines are chosen for the placement of the shot-point and receivers. Permission to perform the survey must be obtained from the land owners.

A surveyor and rod man survey each line and mark the shot-points. Care must be taken to achieve the best possible line with consideration for the topography.

Before recording traces as described above in connection with FIG. 8, a recording is made of seismic noise along each line. Often a few preliminary shots are made, from which noise trends such as first arrivals, ground waves, and air waves are recorded. Horizons of interest are also picked out. On the basis of an analysis of this information, the spread of geophone arrays and the line geometry may be readjusted.

Next, the source of seismic waves is set up and the geophones or groups of geophones are placed along the line and connected to the recording truck by cable for the first shot, and moved when appropriate for subsequent shots as described above in connection with FIG. 8.

Finally, the recorded data are taken to a data processing center for analysis and interpretation. In the field, holes are filled in and other damage is repaired by a clean-up crew.

The seismic surveying procedure described above must be carried out very carefully, as it is quite expensive. Also, due to the expense of collecting the raw data, very sophisticated data processing techniques have been developed for use on large digital computers for enhancing, correcting, and properly interpreting the traces recorded in the field. The correction of the data is extensive and includes corrections for imperfect instrumentation, noise, earth filtering, multiple reflections, and anomalies or deviations from uniformity in physical properties.

Figure 9:
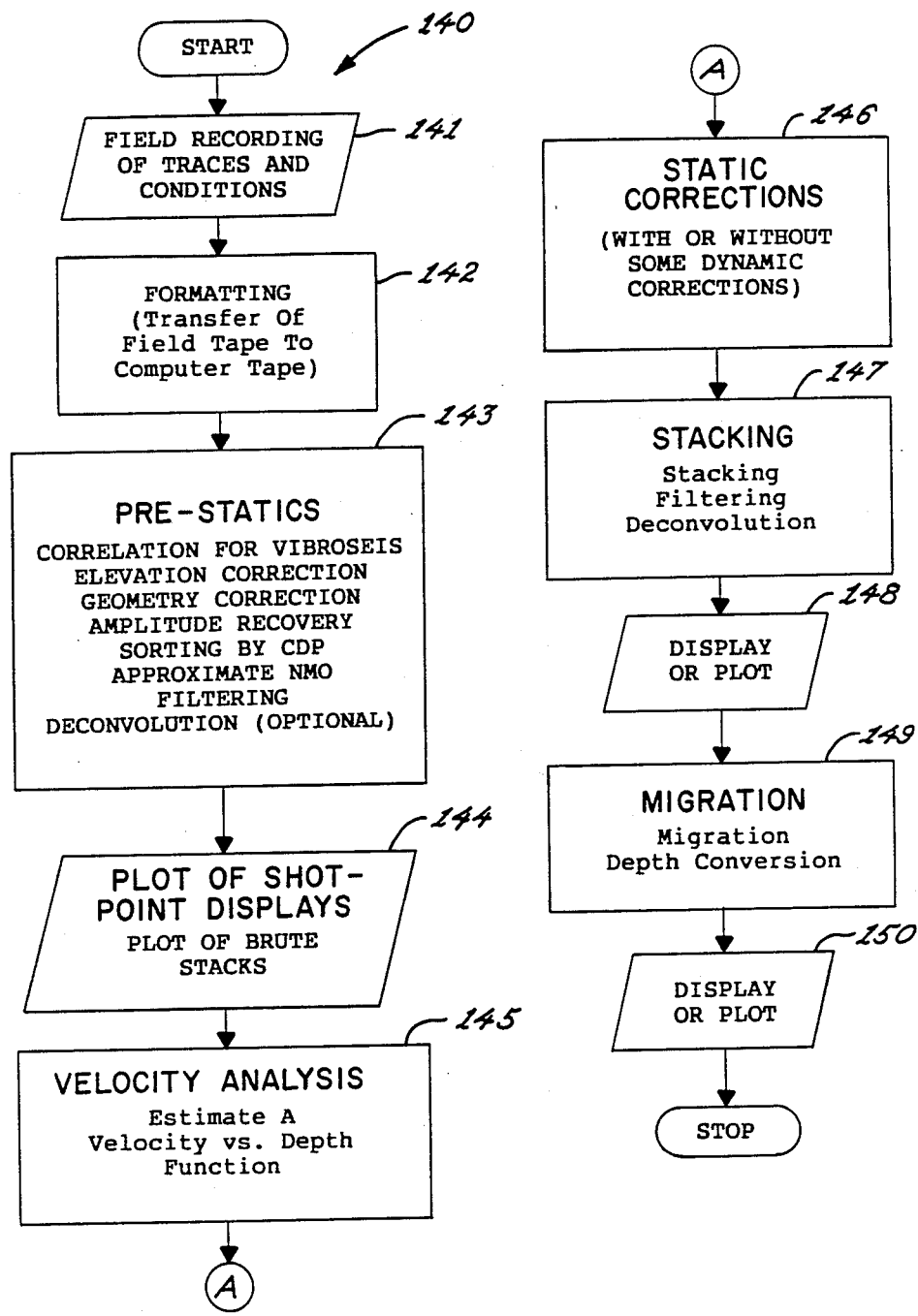
FIG. 9 is a flowchart of the typical procedure for the collection and analysis of seismic data.

Turning now to FIG. 9, there is shown a flowchart generally designated 140 of the typical procedure for the collection and analysis of seismic data. In the first step 141, traces and conditions are recorded in the field as described above. Then in a formatting step 142, the data are transferred from the field tapes to computer tapes and timing, gain information, and record identification information is also recorded for computer processing. At the data processing center, in step 143 a number of pre-static corrections are performed upon the traces. For Vibroseis TM traces, the traces are correlated with the Vibroseis TM signal to obtain traces corresponding to an impulsive source. An elevation correction is applied to correct for any known variations in surface elevation of the seismic receivers. If the line of receivers is not straight, then a geometry correction or slalom line analysis is performed for correcting for CDP scattering caused by the deviation. Amplitude recovery may be performed to compensate for different receiver gain values or to equalize the amplitudes of the seismic reflections indicated in the traces. Traces having a common depth point are identified and sorted, and an approximate normal moveout correction (NMO) applied to the traces in anticipation of stacking the traces which have common depth points. The traces are also filtered to remove noise such as sixty hertz powerline noise and air waves. Moreover, the filtering effect of the earth itself and the seismic receivers may be removed by an optional deconvolution or spiking step.

After one or more of the pre-static operations are performed in step 143, in step 144 the traces are typically plotted as "shot-point displays" and also the traces having common depth points are summed to obtain "brute stacks" which are plotted. Based on inspection of these plots, seismic velocity may be estimated and reflecting horizons may be selected. In step 145 a velocity analysis is performed by examining the brute stacks for coherency and, if necessary, varying the normal moveout of various traces to improve coherency. Variation of the normal moveout of the various traces corresponds to estimating a velocity vs. depth function since the normal moveout for various reflections depends on the seismic velocity at the respective depths of the reflecting horizons.

After performing the pre-static corrections and performing a velocity analysis to estimate a velocity vs. depth function, the common depth point reflections still will not be aligned in time as precisely as possible due to variations in elevation, thickness (s) of the low velocity near-surface layer, and velocity (V') of the seismic waves in the near-surface layer. These corrections are referred to as static corrections because they are assumed to be constant for an entire trace.

In step 146, the static corrections are performed with or without further normal moveout (NMO) or dynamic corrections. In step 147 the traces having been more precisely aligned are again stacked and the results are filtered and spiked. After filtering and deconvolution or spiking, the results are displayed or plotted as a function of time and common depth position analogous to the plot in FIG. 7. The seismic time section, however, may not correspond precisely to the strata in the earth due to migration effects caused by dip, curvature, and anomalies. In step 149, the brute stacks are corrected for these migration effects and the velocity vs. depth function estimated in step 145 is applied so that a seismic depth section is obtained. This seismic depth section is displayed or plotted in step 150.

For further information about the details of the above-described procedure for collecting and processing seismic data, the reader is referred to Kenneth H. Waters, *Reflection Seismology*, John Wiley & Sons, New York (1981).

The step 146 of static corrections is one of the most important to be made but is one of the least successful of all data processing methods. underlying the concept of static corrections is an assumption that appropriate time shifts of individual traces will yield a set of traces which would have been observed if geophones and shots had been located on a flat plane with no low velocity near-surface layer present. This assumption is not strictly true, and a complete solution of the problem requires consideration of other factors.

The information upon which static corrections are based can be directly obtained from uphole shooting data, first breaks, or data-smoothing considerations. Uphole shooting involves the measurement of near-surface travel times, and yields the thickness (s) and velocity (V') of the low velocity near-surface layer at specific locations. Uphole shooting, which requires placement of the source below the low velocity near-surface layer as shown in FIG. 6, is so expensive that in practice near-surface conditions cannot be sampled everywhere along a line. First breaks yield information about the seismic velocity (V') of the near-surface layer. Traces themselves, however, contain more precise information about the propagation of seismic waves through the near-surface layer. This information can be extracted by data smoothing considerations which employ statistical methods such as cross-correlation between the traces. The underlying assumption is that time shifts which minimize irregularities which most events have in common are proper static corrections. The proper time shifts, in other words, are those shifts which maximize cross-correlations between the traces. The cross-correlations, however, are usually different depending upon whether the pairs of traces which are cross-correlated are traces which have common depth points, common sources, common receivers, common offsets, or whether the pairs of traces are first corrected for normal moveout. Moreover, in some situations cross-correlation between traces in a common group will give ambiguous results and human participation may be required for the selection of one result or another.

In practice, a number of computer programs are available for performing static corrections based on a number of these data smoothing methods. Without the aid of an automatic programming system as described above, it is a difficult task to select the appropriate programs, determine in what order the programs should be run, and determine the appropriate arguments or parameters for the programs. Moreover, for a user to select the appropriate programs and arguments, the user must understand both seismic surveying and data analysis.

Shown in Appendix II is a description of a specific set of seismic data processing programs for performing static corrections. In Table 1 are shown program modules for performing static corrections. The modules can be grouped in terms of three different basic approaches to static corrections, including semi-automatic processing, automatic long-wave correction, and automatic short-wave correction. The semi-automatic processing methods require some human participation and judgment. The automatic long-wave correction methods apply if the signal-to-noise ratio in the traces is good or fair and long wavelength anomalies or deformations are present. Some form of automatic short-wave correction for short-wave length anomalies is usually applicable. But generally automatic methods are applied only if the amplitude or extent of the required static correction is small. Semi-automatic methods will handle larger amplitude statics, and manual methods are reserved for particularly bad cases.

In Table 2 of Appendix II there are shown the component program sequences of the program modules. In Table 3 of Appendix II, the individual programs are described.

A specific embodiment of the present invention called "WAVES" automatically programs a target computer to run a seismic data analysis job using selected ones of the programs shown in Appendix II. The WAVES system is intended to be used by a person who can answer questions about how and where the survey was conducted and about the features and quality of the traces, but who does not have an extensive knowledge about how to choose the programs or processing steps to analyze the seismic data. The WAVE system was intended for such a person due to a number of reasons. It was found that such users had to ask experts on a daily basis for assistance in choosing the correct programs and their sequence and arguments. Quite often, the experts were not available to give such assistance. Even though the experts could give some assistance, quite often the users would not choose the correct programs or arguments or would choose to do more processing than would be needed. By providing expert assistance at any time, the WAVES system makes the personnel and equipment more productive and also makes the data processing job easier and less frustrating. In addition to automatic programming, however, the explanation capabilities of the WAVES system provide training of the user so that the user becomes more aware of the actual processing steps performed upon the seismic data. Consequently, the user becomes more confident of the results and more aware of the need for following proper procedures in collecting and processing the seismic data before the static corrections are applied.

The WAVES system is a knowledge system as described above and shown in FIGS. 1, 2 and 5. In order to implement the reasoning strategy shown in FIG. 5, experts knowledgeable in both seismology and the use of the modules and programs shown in Appendix II were consulted to obtain their general approach to selecting the modules and program arguments for particular problem cases.

It was determined that the informal methods used by the experts included a number of steps. First, basic information on the survey including the type of recording, survey size, and geographic environment was gathered along with information on the particular line including the kind of seismic source, the number of seismic receivers, the distance between the receivers, and the signal-to-noise ratio.

Next, the expert would decide what kind of statics were present based on the geographic environment, whether deformations or anomalies existed in the data, and the amplitude or extent of the statics, deformations, or anomalies. The kind of statics were classified in terms of plain-statics, river-statics, mountain-statics, or dune-statics.

Based on this information, the expert would choose between automatic, semi-automatic, or manual processing, and would gather or compute additional information to direct or verify the selection process. The additional information would include, for example, the dominant frequency of the reflection in the zone of interest, the maximum statics or time displacement that could be calculated safely to avoid phase jump, or whether the user was sure that any bad data quality was not due to previous processing steps, muting, field statics, or organized noise.

Unless only semi-automatic or manual processing methods were applicable, an automatic short-wave or long-wave program module was chosen. Additional information was gathered when necessary, including whether a chattering effect was noticed, the maximum amplitude of all short-wave anomalies, whether a strong air wave or other organized noise was present, and the dominant frequency of the first break.

An appropriate sequence of programs and their arguments were determined to perform the desired corrections. To determine the program sequence and arguments, additional information was gathered when necessary, including the trace time for the SATAN program, the number of traces between shot points, the minimum recorded frequency, and whether dynamite was shot in a shot hole.

This informal method practiced by the experts was used in determining a specific reasoning strategy to be performed by the WAVES system. This reasoning stategy is illustrated by the flowchart generally designated 160 in FIG. 10. In the first step 161, a set of static corrections which can be done is determined by selecting one of four predetermined sets, including (1) none, (2) automatic long-wave correctional alone, (3) automatic short-wave correction alone, (4) semi-automatic correction and automatic short-wave correction, or (5) automatic long-wave correction and automatic short-wave correction. Then in step 162 for each static correction in the selected set, the most appropriate program sequence or module is determined for performing the static correction. Next in step 163, each module or program sequence is expanded into an ordered list of the component programs for the respective modules. Finally, in step 164, for each occurrence of a component program in the ordered list, the appropriate arguments are determined by considering the component program, the module or sequence containing the occurrence of the component program, and information about the conditions under which the traces were recorded including the geographical and geological data about the area in which the survey was performed, how the traces were obtained, and information obtained by earlier processing steps performed upon the traces.

Figure 10:
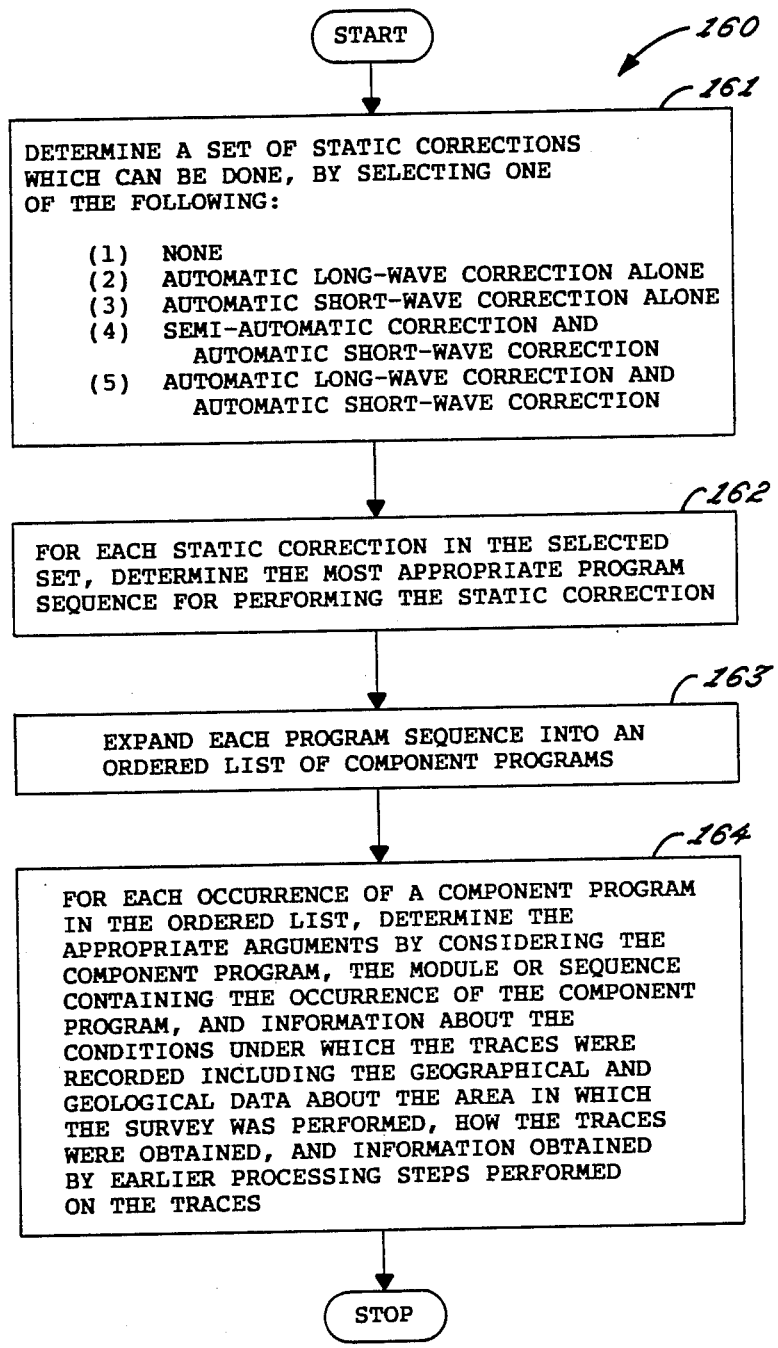
FIG. 10 is a flowchart of the overall reasoning process performed by an EMYCIN-based specific embodiment of the present invention for automatic programming of a target computer system to perform static corrections upon reflection seismic data.
Figure 11:
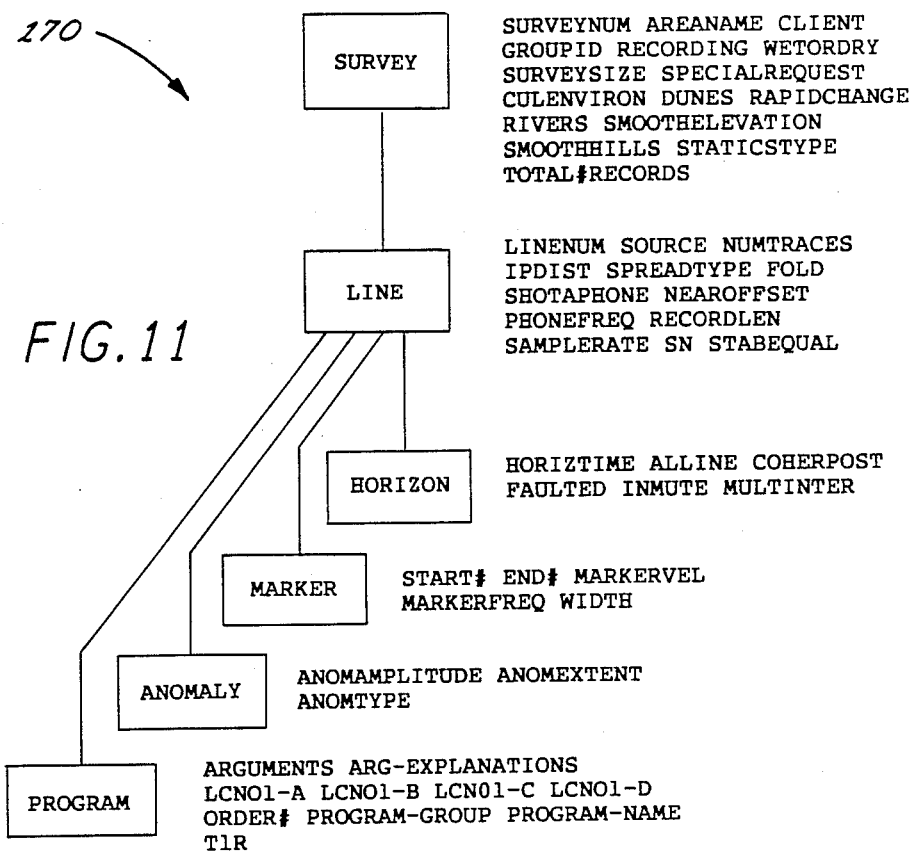
FIG. 11 is a block diagram of a hierarchy of context types used by the EMYCIN-based specific embodiment using the reasoning strategy shown in FIG. 10.

After the inventors determined the reasoning strategy as shown in FIG. 10, the procedure for the consultation or dialog with the user to be conducted by the WAVES system was defined in terms of a hierarchy of context types. Turning to FIG. 11, there is shown a diagram 170 generally called the "tree of context types", illustrating the context types for the WAVES system, their interrelationship and some of their principal parameters. The context types for the WAVES system are specifically defined in Appendix V, and the WAVES parameters are further described in Appendix VI. For a description of all of the properties listed within each context type specification in Appendix V, the reader is referred to pages 22-26 of *The EMYCIN MANUAL* by van Melle et al., Department of Computer Science, Stanford University, Stanford, Ca. 94305 (Report No. STAN-CS-81-885 (1981)).

The context types SURVEY, LINE, HORIZON, MARKER, ANOMALY, and PROGRAM define classes of objects in a typical seismic survey. Each component program included in the target computer program is a context of the PROGRAM context type. These particular contexts were chosen both for control purposes and because a number of important objects needed for implementing the reasoning strategy of FIG. 10 belong to a functionally related class.

As shown in FIG. 11, the context types are arranged in a hierarchical order which determines in part the sequence in which the context types are instantiated during a consultation between the user and the WAVES system. During a consultation, the dialog is focused upon a particular context which is an instance of one of the context types. The dialog, for example, could concern generally the survey itself, a particular line, a particular reflecting horizon, a particular marker for marking traces, a particular anomaly, or a particular program for which arguments are being determined. The specification or definition for each context type as shown in Appendix V determines a sequence or task to be performed when a new respective context is created by instantiating the context type so that the dialog between the user and the WAVES system focuses on the new instance.

In the tree of context types 170, instantiation of the context types starts at the root or main context SURVEY and works "top down". The precise procedure for instantiation will be described below in conjunction with FIG. 14.

The consultation starts with a dialog about the particular survey. Initial data about the survey is solicited and accepted from the user, and then the system tries to determine the values of the parameters that constitute the goals for the SURVEY context. These goal parameters are suggestions about the survey, the processing steps that should have been done before static corrections, the earlier steps that should be checked and possible redone, and the programs to be run.

The WAVES system uses if-then rules to reason from the initial data to obtain values for the goals. When the rules are tried or invoked, many parameters in their premise or "if-" portions will be undetermined. When this occurs, the undetermined parameters become new goals for the system and additional rules are invoked or tried or the user is asked a question in order to determine values for the undetermined parameters. The user may interrupt the consultation at any point and invoke the explanation facility (64 of FIG. 2) in order to ask questions about the system's reasoning or conclusions about the problem, and then return to the consultation to continue from the point of digression.

Each goal corresponds to finding the value of some parameter of the context currently being discussed. When the system sets a new goal in order to evaluate a rule, sometimes the parameter will be associated with a context type different from the type of the current context. In such a case, if there are no contexts of the associated context type, a new context of the associated type will be created. When seeking suggestions about a particular SURVEY, for example, it may become necessary to know information about a particular LINE in the survey. When this occurs, the WAVES system solicits information from the user about a line. Similarly, at particular points in the consultation it may become necessary to obtain information about specific horizons, specific markers, or specific anomalies for the particular line under consideration. In these situations, the WAVES system will focus the dialog upon specific instances of these context types.

At the end of a dialog about a particular LINE, contexts of the PROGRAM context type are created so that the WAVES system will focus its attention on determining appropriate arguments for the program instances and explanations of why the arguments are appropriate.

A complete understanding of the instantiation process used by the WAVES system requires knowledge of the KS300 or EMYCIN languages. Although these languages are very intricate and are fully understood only after considerable study and experience, the basic structural features of the programming languages are precisely defined by the control sequence for the knowledge base interpreter (61 of FIG. 2) which interprets the knowledge base (60 of FIG. 2) written in the KS300 or EMYCIN languages. Both the KS300 and EMYCIN systems are written in the LISP symbolic programming language in order to take advantage of the list handling and recursive features of the LISP language.

Figures 12, 13:
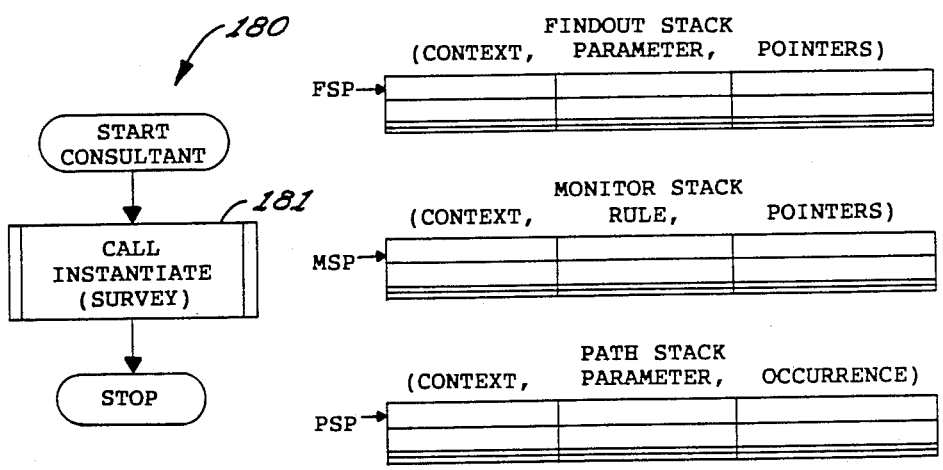
FIG. 12 is a flowchart of the executive procedure in the EMYCIN-based embodiment of the present invention.
FIG. 13 is a schematic diagram of a FINDOUT stack, MONITOR stack, and PATH stack in memory used by the executive procedure of FIG. 12.

The executive procedure for the knowledge base interpreter is shown in the flowchart generally designated 180 of FIG. 12. The executive procedure has a single step 181 consisting of a call to a subroutine INSTANTIATE(SURVEY). In other words, a context of the main or root context type SURVEY is created. Instantiation of the SURVEY context type causes recursive instantiation of the other context types.

By recursive invocation it is meant that a subroutine either directly or indirectly calls itself. A subroutine directly calls itself when it includes a step calling itself. A subroutine indirectly calls itself when it includes a call to a chain of other subroutines, one of which calls the first subroutine before returning. It is evident that for recursive subroutine calls (which are generally permitted in the BASIC language but not in the FORTRAN language) some means are required to preserve or locally define variables used in the subroutine. In other words, a variable set before a recursive subroutine call must retain its original value when execution returns. Recursive subroutine calls are handled by means of variable stacks, and a recursive call pushes a stack pointer down onto the stack in order to make available a new local definition of the variables. A subroutine return, on the other hand, pops up the stack pointer, retoring the previous definitions.

The stack for the INSTANTIATE subroutine includes only a single variable representing the current context type, and the stack at any given time will include the current context type and all of its direct ancestors back up to the root SURVEY context type. The knowledge base interpreter has at least two other recursive subroutines: a FINDOUT subroutine for determining the value of a parameter, and a MONITOR subroutine for applying an inference rule. The FINDOUT subroutine uses a FINDOUT stack consisting of a context element, a parameter element, and a number of pointers to the precomputed lists stored in the indexing information section (72) of the knowledge base 60 (FIG. 2). Associated with the FINDOUT stack is a FINDOUT stack pointer (FSP). Similarly, the MONITOR subroutine uses a MONITOR stack having a context element, a rule element, and pointers to precomputed lists. The MONITOR stacks uses an associated MONITOR stack pointer (MSP). Although it is not associated with a particular subroutine, a PATH stack is used to determine and record how essential parameter values were determined and the actual rules chained together to support the determinations. The PATH stack is part of the trace memory 65 (FIG. 2). The use of these stacks will become clear in conjunction with further description of the knowledge base interpreter 61 (FIG. 2).

Figure 14:
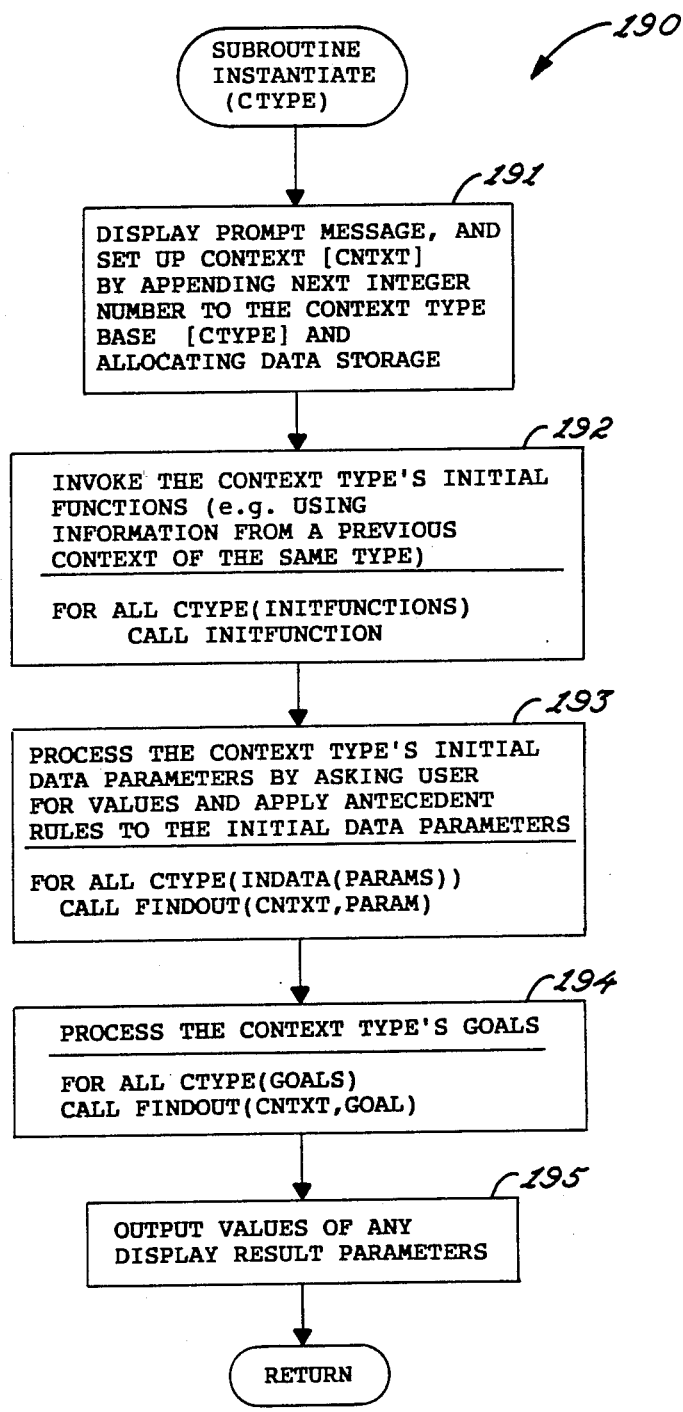
FIG. 14 is a flowchart of an INSTANTIATE subroutine called by the executive procedure of FIG. 12 and by itself.

Shown in FIG. 14 is a flowchart generally designated 190 of the INSTANTIATE subroutine. In the first step 191, a prompt message is displayed if such a message is defined for the context type, and the context is created by appending the next integer number to the name of the context type base and allocating data storage for the new context. The integer number distinguishes the current context from any previous instance of the same context type. The context type base is the context type argument of the INSTANTIATE subroutine. The first context of the root context type SURVEY, for example, is designated "SURVEY-1".

Next, in step 192, any initial functions defined for the context type are invoked. An initial function may, for example, obtain relevant information from a previous context of the same type.

In step 193, any initial data parameters defined for the context type are processed by asking the user for their values for the new context. Any antecedent rules that may use the newly determined values are applied. This will become clear in connection with the description of FIGS. 15-18. The values are obtained by calling the FINDOUT subroutine, described in connection with FIG. 15.

In step 194, any goals defined for the context type are processed. The context type goals are predefined sets of parameters associated with each context of that type that further define the specific task or related group of tasks performed for each context. The processing is performed in step 194 by merely calling the FINDOUT subroutine for each goal.

In step 195, the values for any display result parameters defined for the context type are found and the values are displayed to the user.

Instantiation of offspring context types may occur in step 194 by implicit or explicit instantiation. An implicit instantiation occurs when the value of a parameter is required, but the parameter is only associated with a different context type. An explicit instantiation occurs when a special function is evaluated in the premise or called in the conclusion of an if-then rule. WAVES uses several special LISP functions in connection with explicity making program instances. These functions are further described in Appendix VII.

Figure 15:
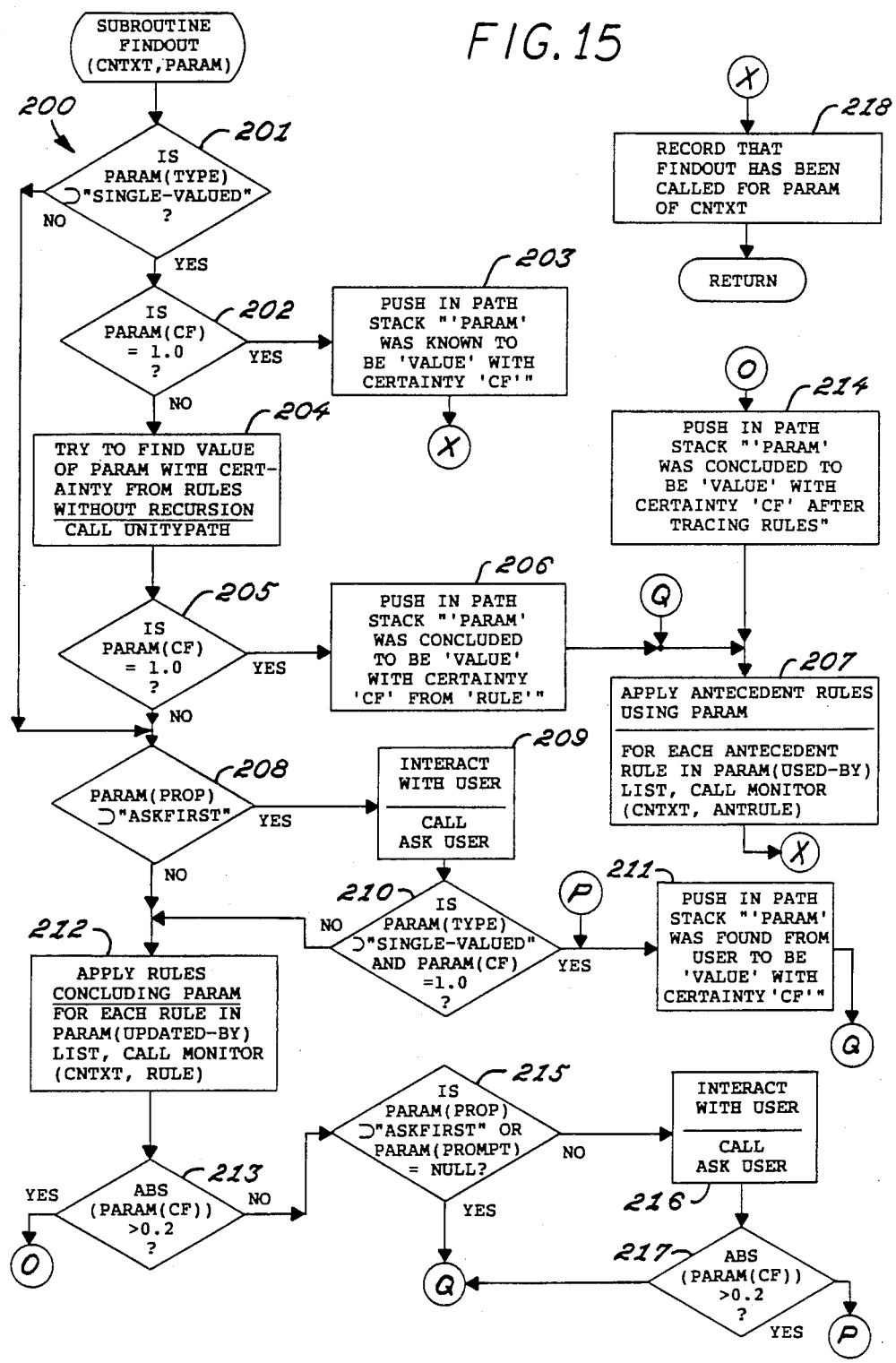
FIG. 15 is a flowchart of a FINDOUT subroutine called by the INSTANTIATE subroutine of FIG. 14.

Turning now to FIG. 15, there is a shown a flowchart generally designated 200 of the FINDOUT subroutine. The FINDOUT subroutine is called for a particular context to determine the value of a desired parameter for the context. In the first step 201, it is found whether the list of types of properties of the parameter includes the type "single-valued." If a parameter is single-valued, then it may have only one definite value at any given time. If it has only one value and that value is known with certainty, then there is no need to determine whether it has any other values. Thus, in step 202, if the parameter is single-valued, the certainty factor is compared to a predetermined upper threshold, shown as 1.0, to decide whether the existing value is known with certainty. (For parameters having the type "YES/NO", however, a certain value is also indicated by a certainty factor equal to −1.0. Such a parameter has a value of "YES" for a certainty factor greater than zero, and a value of "NO" for a certainty factor less than zero. For such parameters, the absolute value of the certainty factor is compared to 1.0 to decide whether the existing value is known with certainty.) If the existing value is known with certainty, then in step 203 that fact is recorded by pushing into the PATH stack a statement that the parameter was known to be a particular value with the particular certainty factor, before the value found for the parameter is returned to the calling program.

If the value of the single-valued parameter is not known with certainty, then in step 204 a subroutine UNITYPATH is called in an attempt to find the value of the parameter with certainty from the rules without applying recursion. Then step 205 determines whether the UNITYPATH subroutine call was successful, and if a value of the parameter is found with certainty, a suitable statement is pushed into the PATH stack in step 206 to record the fact that the desired parameter was concluded to be the particular value with certainty from a particular rule. Since the system has now finished determining the value for the desired parameter, any antecedent rules using that parameter are applied in step 207 before returning the newly found value to the calling program.

Generally, rules are chained in a backward goal-directed fashion. This means that the rules are recursively invoked to conclude the value of a desired parameter in their conclusion or action clauses. Some rules called "antecedent rules" are so important or have a particular relationship with respect to the subject matter that they are applied as soon as the values of the parameters in their premise clauses, or "predicate parameters," are known. As soon as the system has finished trying to determine the value of a predicate parameter, all of the antecedent rules which use that parameter in their premise clauses are evaluated and, if found to be true, the parameters in their action clauses or other special tasks in their action clauses are concluded about or performed, respectively. For each parameter, there is stored in the indexing information 72 (FIG. 2) associated with the knowledge base 60 (FIG. 2) a list of the antecedent rules which use each parameter in their premise clauses. Thus, the antecedent rules using the parameters are applied by calling the subroutine MONITOR for each rule in a used-in list of antecedent rules associated with the parameter.

If the UNITYPATH subroutine called in step 204 fails to find a value for the parameter, or if the parameter is not single-valued, then its value must be determined either by applying rules concluding the parameter in their actions or by asking the user for values. Certain special parameters have the property that they are "ask-first" parameters. The user is first asked for values of such parameters, before any rules concluding the parameter are applied. If such a parameter is single-valued and the user specifies a definite value, however, the rules concluding the parameter are not applied. Thus, in step 208, the FINDOUT subroutine determines whether the parameter is an ask-first parameter. If it is an ask-first parameter, a subroutine ASKUSER is called in step 209 in an attempt to obtain a value for the parameter. In step 210, if the parameter is single-valued, the certainty factor for the parameter is compared to 1.0 to determine whether a value for the particular parameter is certain. If such a certain value does exist, then in step 211 a suitable message is pushed onto the PATH stack, stating that the parameter was found to be a particular value with a particular certainty factor from the user.

If the parameter does not have an ask-first property or if the parameter was single-valued but the user did not supply a certain value, then the rules concluding that parameter are applied in step 212. For each parameter, the indexing information 72 (FIG. 2) associated with the knowledge base 60 (FIG. 2) includes a list of non-antecedent rules which conclude the parameter. In other words, the parameter is updated by each rule in the list. For each rule in the list, the subroutine MONITOR is called to apply the rule. In step 213, the absolute value of the certainty factor of the parameter is compared to a low threshold of 0.2, and if it is greater than 0.2, the rules have concluded the paramter's value. Before returning to the calling program, however, in step 214 it is recorded in the PATH stack that the FINDOUT subroutine was successful in concluding a value for the parameter with a particular certainty factor after applying the rules. Then, in step 207, the antecedent rules using the parameter are tried. If, in step 213, it is found that the rules have not concluded the parameter's value, if the user has already been asked for a value, or if there is no prompt provided for asking the user, as determined in step 215, the FINDOUT subroutine cannot conclude a value for the parameter. Since FINDOUT has finished trying to determine a value, antecedent rules using the parameter are tried in step 207 before execution returns to the calling program.

It should be noted that it is not necessary for the FINDOUT subroutine to be successful in concluding the value of a parameter, because the certainty factor associated with the parameter will indicate that the value of the parameter is currently unknown. Other rules can be conditioned to use uncertain data or unknown data by taking appropriate action if the parameters have specific certainty factors.

If in step 215 the parameter is not an ask-first parameter, and a prompt exists for the parameter, then the ASKUSER subroutine is called in step 216 and attempts to obtain a value from the user. In step 217, the absolute value of the certainty factor of the parameter is compared to the low threshold of 0.2 to determine whether a value was obtained from the user. If a value was not obtained from the user, then the subroutine FINDOUT has failed to find a value for the parameter, and after the antecedent rules using the parameter are tried in step 207, execution may return nevertheless with an unknown value. If, however, a value was obtained for the parameter, then step 211 is performed to push onto the PATH stack a statement that the parameter was found from the user to be a particular value with a particular certainty factor. The antecedent rules using that parameter are then applied in step 207 before returning to the calling program. Before FINDOUT returns control to the calling program, and regardless of whether a value is obtained for the parameter, a final step 218 records that FINDOUT has been called for the parameter and current context. This step prevents FINDOUT from being called again for the same parameter and context if the parameter's value is later needed to test the premise of a rule.

Figures 16, 17:
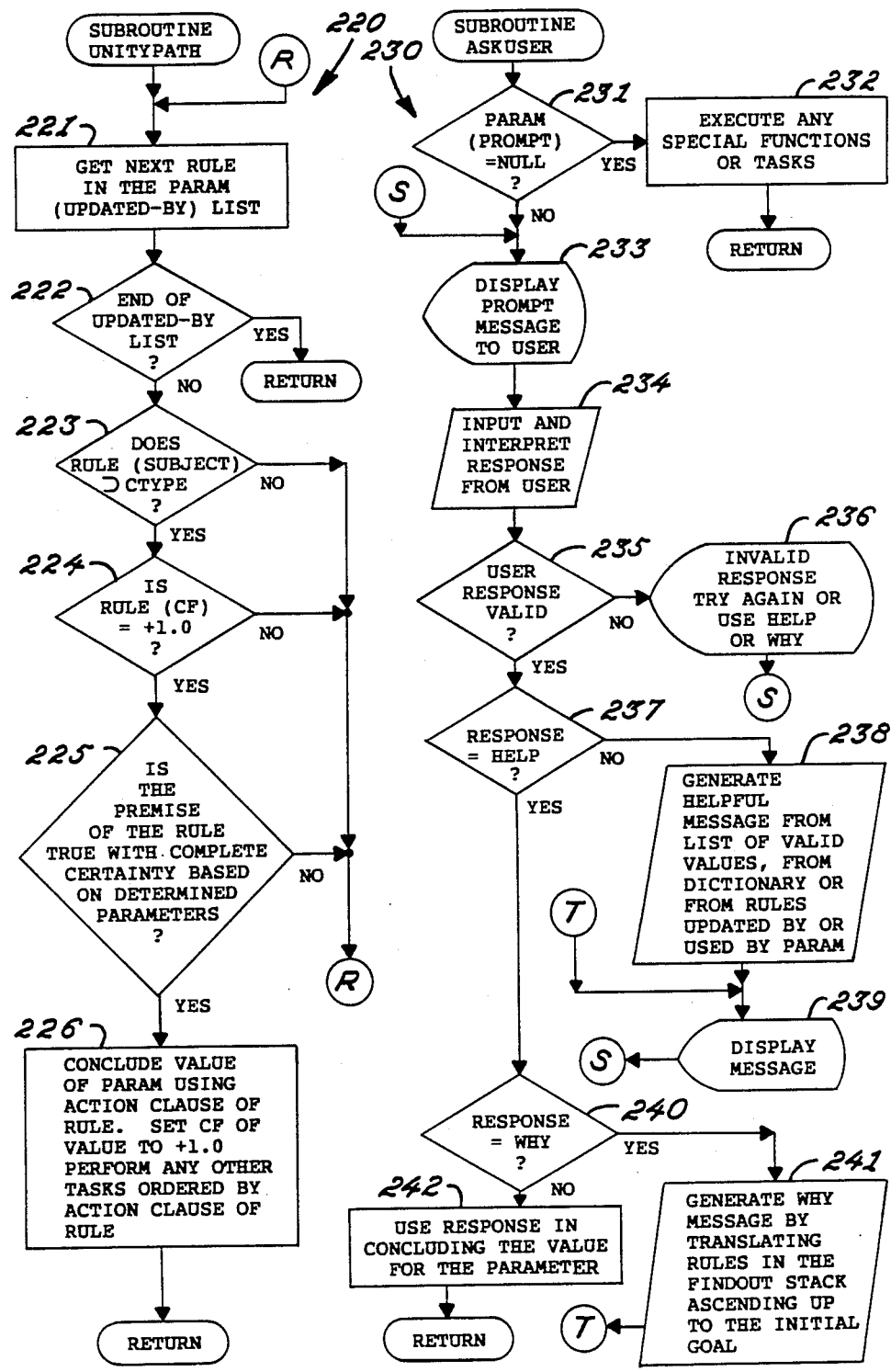
FIG. 16 is a flowchart of a UNITYPATH subroutine called by the FINDOUT subroutine of FIG. 15.
FIG. 17 is a flowchart of an ASKUSER subroutine called by the FINDOUT subroutine of FIG. 15.

Turning now to FIG. 16, there is shown a flowchart generally designated 220 of the UNITYPATH subroutine. In the first step 221, the next rule in the parameter's updated-by list is obtained. If there are no more rules in the list, as tested in step 222, execution returns to the calling FINDOUT subroutine. In step 223 processing of the current rule is terminated if the subject of the rule does not include the context type of the current context or any direct ancestors of the context type of the current context. Ancestry refers to the tree of context types 170 in FIG. 11, and as an example, both HORIZON and MARKER are direct ancestors of the LINE context type.

The UNITYPATH subroutine is successful in concluding the value of a parameter only if the certainty factor of the concluded value is +1.0 (or ±1.0 for YES/NO parameters), indicating that the value is known to be true with complete certainty. The certainty factor concluded by a rule is dependent upon both the certainty factor of the rule and the degree of certainty of the condition in the rule's premise having the least degree of certainty. Hence, in step 224 processing of the current rule is terminated if the rule's certainty factor is not ±1.0, because in such a case the conclusion of the rule cannot be known with complete certainty. In step 225 the terms or predicates in the premise of the rule are successively tested using the values, if any, for the determined parameters in the preidcates. Testing of the current rule by the UNITYPATH subroutine terminates if the premise of the rule cannot be determined, with complete certainty, without calling FINDOUT to determine the predicate parameters. If, however, the premise of the rule is true with complete certainty, then the value of the parameter is concluded in step 226 according to the action clause of the rule. The certainty factor associated with the concluded value is set to +1.0. Finally, any other tasks ordered by the action clause of the rule are performed, and execution returns to the calling program.

Turning next to FIG. 17, there is shown a flow chart generally designated 230 of the ASKUSER subroutine. In the first step 231, the prompt for the parameter is sensed to determine whether it is null. If it is null, or if a prompt is not otherwise constructed using the EMYCIN "TRANS" feature, then the user cannot be prompted. Before returning to the calling subroutine, however, any special functions or tasks are executed in step 232. Thus, certain parameters having the properties "multi-value" and "ask-first" with a null prompt can be used merely for the purpose of providing the name of a special function to be executed any time that the name of the special function appears in the premise clause of a rule.

If the parameter has a prompt, then in step 233 the prompt message is displayed to the user. After receiving the user input in step 234 and interpreting the user's response, the validity of the user's response is checked in step 235. If the response is invalid, a suitable message is displayed to the user in step 236 informing him or her to try again or to use the special HELP or WHY user inputs. If, for example, the user response is HELP as sensed in step 237, a helpful message is generated in step 238 from a predetermined list of valid values for the parameter, from a dictionary or from the rules that update or use the parameter. The helpful message is displayed to the user in step 239, and the user is given a chance to again respond to the prompt message displayed in step 233.

If the user response is WHY as sensed in step 240, then a message is generated in step 241 explaining why a value for the parameter is needed. A suitable message is generated by translating the rules in the FINDOUT stack ascending to an initial goal. The message is displayed in step 239 followed by the prompt message in step 233 so that the user may try again to supply a value for the parameter. If the valid user response is neither HELP nor WHY, then in step 242 the response is used in concluding the value for the parameter, and execution returns to the calling FINDOUT subroutine.

Figure 18:
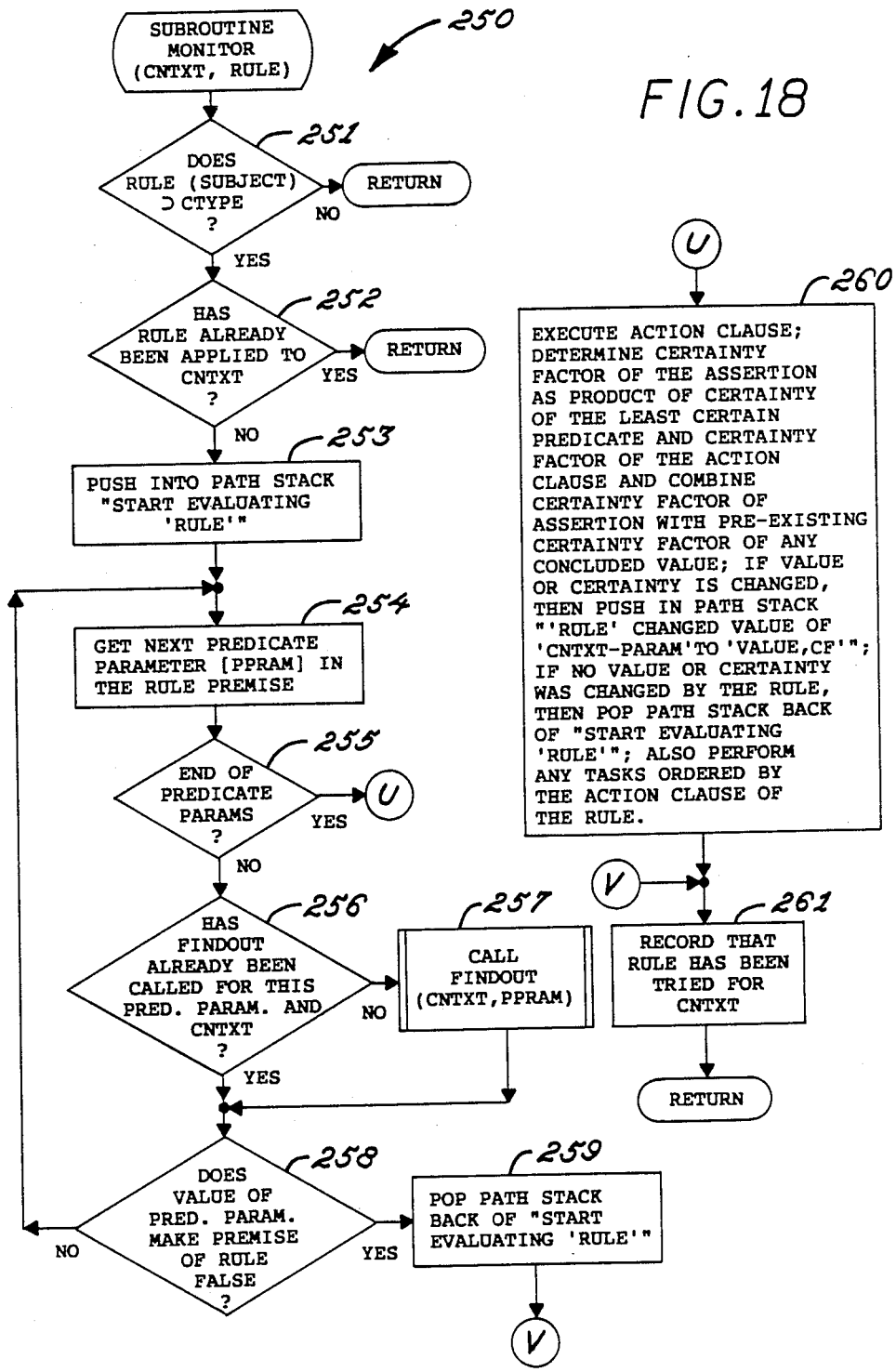
FIG. 18 is a flowchart of a MONITOR subroutine called by the FINDOUT subroutine of FIG. 14.

Turning now to FIG. 18, there is shown a flow chart generally designated 250 of the MONITOR subroutine for applying a rule within the current context. In the first step 251, the current rule cannot be applied unless the context type of the context, or a direct ancestor of the context type, is within the subject of the rule. In such a case, execution immediately returns. In step 252, the system checks whether the current rule has already been applied to the current context. If so, execution immediately returns. Otherwise, in step 253, a message is pushed onto the PATH stack stating that evaluation of the current rule is starting. This message marks the beginning of rule application in case application of the rule fails. The PATH stack is not intended to store a complete trace of all operations performed by the knowledge base interpreter. Rather, the PATH stack is intended to store a trace of the rules that are successfully applied in determining the goals of the consultation. Such an ordered list of rules is easily interpreted as the process or explanation used in concluding the goals. In other words, the PATH stack omits certain rules that were applied in an attempt to find the values of predicate parameters for other rules, but which do not contribute to the conclusion of the goals, because other necessary rules fail at a later time. To account for this possibility, the PATH stack marks the beginning of the application of a rule, and records rules that are applied later until a necessary rule fails. Once the necessary rule fails, the stack is cleared up to the marked position.

Returning to the specific procedure in FIG. 18, after the PATH stack has been marked in step 253, the next predicate parameter in the rule premise is obtained in step 254 from the LISP code for the rule. If there are no more predicate parameters as sensed in step 255, the premise of the rule has been evaluated and found to be satisfied. Otherwise, for each predicate parameter, step 256 checks whether the FINDOUT subroutine has been called for the predicate parameter and the current context. If not, the FINDOUT subroutine is called in step 257 to find the value of the predicate parameter to evaluate the rule premise. If the value of the predicate parameter makes the premise of the rule false, then the rule fails as tested in step 258. If the rule fails, then the PATH stack is popped back of the mark indicating that evaluation of the rule was attempted. It should be noted that the rules that were successfully applied to determine the predicate parameters of a rule which failed, may nonetheless have contributed to the value of an important parameter which is actually used at a later time. Thus, coincident with popping the PATH stack back in step 259, the rules that are being erased from the PATH stack may be recorded in memory as a list associated with the particular parameters which were concluded or updated by such rules.

At the end of processing predicate parameters in step 255, if the rule had not at that time failed through the testing of step 258, the premise of the rule is known to be true. Thus, the action clause of the rule is executed in step 259. A certainty factor associated with the assertion of the concluded value or action to be executed is obtained by multiplying the certainty factor associated with the conclusion or action clause of the rule with the certainty factor of the least certain condition in the premise. Thus, if the certainty factor for the conclusion is 0.8 and the degree of certainty of the premise is 0.5, the certainty factor of the assertion of the concluded value is 0.4. The certainty factor of the assertion of the concluded value factored in or combined with any previous certainty factor (CF) for the concluded value. The precise method of factoring or combining certainty factors is accomplished by a function in EMYCIN called CFCOMBINE, which is defined as:

$$CFCOMBINE(CF_p, CF_n) =$$

$CF_p + CF_n (1 - CF_p)$ if $CF_p$ and $CF_n$ are positive.

$(CF_p + CF_n)/(1 - \min\{|CF_p|, |CF_n|\})$ if $CF_p CF_n < 0$.

$-CFCOMBINE(-CF_p, -CF_n)$ if $CF_p$ and $CF_n$ are negative.

$CF_p$ if $CF_n = 0$ $CF_n$ if $CF_p = 0$

If a parameter value is changed by the action clause of the rule, a message indicating this fact is pushed on the PATH stack. At the end of the action clause execution step 260, any tasks ordered by the action clause of the rule are performed.

Before execution returns to the calling program, step 261 records that the rule has been tried for the current context. This keeps the system from reapplying rules that conclude more than one parameter.

It should be apparent from the above description of the FINDOUT subroutine of FIG. 15 and the MONITOR subroutine in FIG. 18 that alternate and indirect recursions of the FINDOUT subroutine and the MONITOR subroutine may occur in the determination of the parameter. Moreover, by the determination of parameters or goal-directed chaining of rules, control tasks and information acquisition and retrieval tasks are performed.

Turning now to FIG. 19, there is shown a Venn diagram generally designated 270 of the set of rules 62 (FIG.2) in the knowledge base 60 of the WAVES system. The English translation of specific rules are listed in Appendix IV. Rules 271 are applied to determine checks, warnings, and recommendations regarding the survey. These rules are first invoked to determine the main goal SUGGESTIONS regarding the survey. Rules 272 are then applied to find the static analysis type based on information about the geographical area in which the survey was conducted. The statics analysis type is determined to be either RIVER-STATICS, MOUNTAIN-SATICS, PLAIN-STATICS, or DUNE-STATICS. A smaller number of rules 273 determine the type of statics indicated by an anomaly as either LONG-WAVE, SHORT-WAVE, or VERYSMALL.

After the statics analysis type and type of statics indicated by any anomaly are determined, rules 274 are applied to determine whether semiautomatic processing is needed. If so, rules 275 are applied to determine the specific type of semiautomatic processing that should be used. If semiautomatic processing is not needed because automatic processing may be performed, then rules 276 are applied to determine whether automatic long-wave corrections should be done. If automatic long-wave corrections should be done, then rules 277 are applied to determine the type of processing for automatic long-wave corrections. Moreover, if automatic corrections may be performed, rules 278 are applied to determine the type of processing for automatic short-wave corrections which are always applied whenever automatic processing may be performed.

After the type of processing is determined, rules 279 are applied to create an ordered list of programs for the selected types of processing. Then rules 280 are applied to determine arguments for the selected programs. A smaller number of rules 281 are applied to determine arguments for filtering. After the arguments are obtained, rules 282 are applied to determine explainations for why the arguments of the programs were selected.

The set of rules 260 also includes rules 283 to determine probable cause for statics. The probable cause might indicate, for example, that semiautomatic processing must be performed instead of automatic processing. In certain bad cases where a program cannot be coded to perform static corrections and manual methods must be relied on, the rules to determine probable cause for statics may indicate what is wrong with the seismic data.

The rules just described may rely on particular rules in a subset 274 including definitional rules, and rules for performing calculations or otherwise determining values for commonly used parameters.

The operation of the knowledge base interpreter 61 upon the rules 62 and the context type definitions 69 in the knowledge base 60 (FIG. 2) can now be illustrated by way of the specific consultation shown in Appendix III for which the specific rules shown in Appendix IV and the context type definitions in Appendix V are interpreted. After the user loads the knowledge base interpreter and knowledge base into the memory of a general purpose data processor, the executive program of FIG. 12 is executed, and in step 181 the root context type SURVEY is instantiated.

As shown in the typescript of Appendix III, instantiation of the SURVEY context causes a PROMTEVER message, defined for the SURVEY context type as shown in Appendix V, to be displayed, when step 191 of the INSTANTIATE subroutine of FIG. 14 is executed. The message says that the Brute Stack (or a first pass of Residual statistics) and the Shot Point Gather Display will be needed by the user. Also, the SURVEY-1 context instance is set up. In step 192 of FIG. 14 it is found that the SURVEY context type definition of Appendix V does not include any initial functions. In step 193 of FIG. 14 the initial data parameters SURVEYNUM, AREANAME, CLIENT, GROUPID, RECORDING, WETORDRY, SURVEYSIZE, SPECIALREQUEST, and CULENVIRON are processed by calling the FINDOUT subroutine (FIG. 15) for these parameters of SURVEY-1. The FINDOUT subroutine asks the user for this initial data using the prompts (1), (2), (3), (4), (5), (6), (7), and (8) shown in the typescript in Appendix III. Once values for these initial data parameters are obtained from the user, the goals of the survey context are processed according to step 194 of FIG. 14.

The FINDOUT subroutine of FIG. 15 is called for the SUGGESTIONS goal which invokes Rule 8 of Appendix IV. Rule 8, however, applies to shot-point lines, thereby causing an implicit creation of a LINE context. The LINE context type has a PROMTEVER message, whcih is displayed to the user in the typescript of Appendix III. The user is asked to select one line from the current SURVEY context instance SURVEY-1 and use the line to answer the initial data questions. The initial data questions are asked in lines (10)–(22) of the typescript to obtain values for the initial data parameters LINENUM, SOURCE, NUMTRACES, IPDIST, SPREADTYPE, FOLD, SHOTAPHONE, NEAROFFSET, PHONEFREQ, RECORDLEN, SAMPLERATE, SN, and STABLEQUAL.

Once that the LINE-1 context is created, the premise of Rule 8 is tested. Rule 8, however, fails since it is known that premise clause (2) is false. Next Rule 11 is tried which causes the FINDOUT subroutine of FIG.

15 to be called to determine the STATICSTYPE parameter. Rule 1 is consequently invoked, and the first three terms in its premise are satisfied except that the parameters RIVERS and DEFORMATION are undetermined. The RIVERS parameter is defined in the knowledge base as an ASKFIRST parameter so that in line 24 of the typescript the user is asked a predefined question to determine whether there are or were rivers in the area of the survey. The user responds "YES". Therefore, the premise of Rule 1 fails. Next, Rule 9 is invoked in an attempt to determine a value for STATICSTYPE. To test the premise of Rule 9, FINDOUT is called to determine whether a deformation has been found that shows at all depths of a particular CDP range. In an attempt to find a value for the DEFORMATION parameter, Rule 189 is invoked. To test the premise of Rule 189, it must be determined whether there are anomalies in the shot-point line of the survey.

Consequently, the user is asked in line (24) of the typescript to look carefully at the first breaks, and to answer whether there is a surface consistent anomaly. This is the PROMPTFIRST question in the ANOMALY context type definition of Appendix V. Since the user responds "YES", the ANOMALY-1 context is created and values for the initial data parameters ANOMAMPLITUDE and ANOMEXTENT are obtained from the user in lines (25) and (26) of the typescript. After receiving the initial data values, the user is asked the PROMT2ND question in line 27) to determine whether there are any other anomalies. Since the user responds "NO", execution returns to the testing of the premise of Rule 189. The premise succeeds, so that Rule 189 concludes that a deformation has been found that shows at all depths of a particular CDP range. Therefore execution returns to the testing of the premise of Rule 9.

To test the next clause in the premise of Rule 9, the extent of the deformation (DEFORMEXTENT) and the value of the half-spread (HALF-SPREAD) must be determined and compared. Rule 194 is invoked to conclude that the extent of the deformation is the length of ANOMALY-1, or 0.5. Rule 215 is invoked to conclude that the value of the half-spread is 0.25.

Since the extent of the deformation is greater than half the spread length, the premise of Rule 9 fails. Next Rule 10 is invoked in an attempt to determine a value for STATICSTYPE, and the premise of Rule 10 succeeds based on the values of already determined parameters. Rule 10 therefore concludes that the statics analysis type for SURVEY-1 is RIVER-STATICS. The second clause in the premise of Rule 11 requires determination of whether the quality of the signal for the shot-point line is bad. This quality of signal indication is represented by a parameter BADSIGNAL that is different from the signal-to-noise parameter SN. Rule 74 is invoked in an attempt to determine a value for BADSIGNAL but it fails since signal quality is consistent along the shot point line.

Next Rule 81 is invoked. The third clause of the premise of Rule 81 requires determination of whether shot points have been plotted for the shotpoint line. Therefore, in line (28) of the typescript of Appendix III, the user is asked whether some shotpoints have been plotted. The user responds "YES" so that the fourth clause of the premise of Rule 81 is tested, which requires determination of the parameters SWAMPLITUDE and AVEMAXSTAT. For determination of SWAMPLITUDE, Rule 221 is invoked which defines SWAMPLITUDE as the maximum of the parameters CHAMPLITUDE, MAXTIMESHIFT, and MAXSWAMP. Rule 233 is invoked to determine CHAMPLITUDE, which causes the user to be asked in line 29 of the typescript of Appendix III whether any chattering effect was noticed. Since the user responded "YES", the user is asked to estimate the amplitude of the chattering effect in milliseconds. The user responds giving a value of 4 for the parameter CHAMPLITUDE.

To determine a value for the MAXTIMESHIFT, the user is asked in line (31) of the typescript to estimate the residual maximum time shift from one shot-point to another after application of field statics. The user gives a value of zero for MAXTIMESHIFT. In an attempt to determine a value for MAXSWAMP, Rule 219 is invoked, which in turn causes Rule 37 to be tried. Rule 37 succeeds, concluding that the type of statistics indicated by ANOMALY-1 is long-wave. Therefore, Rule 219 fails, and MAXSWAMP is determined to be unknown. Rule 221 concludes that SWAMPLITUDE is 4, being the maximum of the known values for CHAMPLITUDE=4 and MAXTIMESHIFT=0.

For the determination of AVEMAXSTAT, the average frequency of data in the zone of interest, Rule 12 is tried. Clause (1) of the premise of Rule 12 succeeds, so that clause, (2) must be evaluated. The value of AVFREQ is determined by asking the user on line (32) of the typescript of Appendix III. The user is asked "what is the dominant frequency of the reflection in the zone of interest" and the user responds 30. Rule 12 therefore succeeds, and the action clause of Rule 12 computes AVEMAXSTAT of LINE-1 to be 16. Consequently, Rule 81 succeeds, concluding that the quality of the signal is not bad. Therefore Rule 11 fails, and other rules must be tried to determine suggestions about the survey.

Rule 22 fails due to clause (4) in its premise. Next Rule 106 is applied, and evaluation of its premise requires determination of SHORTWAVE, an important goal being the type of short-wave processing, if any, to be done for LINE-1. In an attempt to determine SHORTWAVE, Rule 21 is tried, which calls FINDOUT to determine an important goal SEMIAUTOMATIC, representing whether semi-automatic processing is needed for LINE-1. Rule 24 is tried but it fails due to clause (2) in its premise. Next Rule 31 is tried. To evaluate clause (7) of Rule 31, the user is asked in line (33) of the typescipt of Appendix III whether the user would like to process the long wave statics. The user responds "YES", so that clause (7) of Rule 31 is satisfied.

To evaluate clause (8) of Rule 31, information about the horizons of the shot-point line are required. Therefore, implicit instantiation of the HORIZON context type occurs. Because of the PROMT1ST definition for the HORIZON context type as shown in Appendix V, the user is asked in line (34) of the typescript of Appendix III whether there are any horizons of LINE-1 that have any of six certain conditions, including existence along the part of the line in question, absence of multiple interference, absence of faults, whether the horizon is out of the mute zone (or shows on enough trace that the time correction delta-t is significant), and whether the horizon is a very coherent event. The user responds "YES", thereby confirming the existence of a relevant horizon and insuring that a context type HORIZON will be created. The context HORIZON-1 is created and the user is prompted for the value of the initial data parameter HORIZTIME in line (35) of the typescript of Appendix III. In response to the question "what is the beginning time (in msec) for HORIZON-1?" the user responds 900.

To evaluate parts A, B, C, D, and E of clause (8) of Rule 31, the user is asked in lines (36), (37), (38), (39) and (40) about the horizon's coherence, extent, multiples interference, faults, and insignificance of delta-T due to extension into the mute zone. Due to the horizon's coherency, extent, and insignificance of delta-T due to extension into the mute zone, and the absence of multiples interference and faults, Rule 31 concludes that semi-automatic processing is needed for the shot-point line. Consequently, Rule 21 fails due to its clause 2). Therefore other rules are tried to determine whether there are any other types of automatic short-wave processing that can be used. Rule 21 is tried but it fails due to its clause (2). Rule 26 is also tried but fails due to its clause (3). Next Rule 29 is tried, but it fails due to its clause (3).

When Rule 195 is tried, FINDOUT is called to determine SEMI-PROC, an important goal of what type of semi-automatic processing is needed for the line. To determine SEMI-PROC, Rule 142 is tried, which in turn requires determination of PROBCAUSE, the probable cause for the statics found in the line. Rule 77 is first tried, but it fails due to its clause (2). Next, Rule 87 is tried, but it also fails due to its clause (2). Finally, Rule 98 is tried. To evaluate clause (4) of Rule 98, the user is asked in line (41) of the typescript of Appendix III whether there are any reflections visible in the shot-point display. The user responds "YES", so that Rule 98 succeeds, concluding that the probable cause of the statics for LINE-1 is MEDIUM-STATICS. But therefore Rule 142 fails.

Other rules are tried in order to determine the type of semi-automatic processing that is needed. Rule 143 fails due to its clause (4). When Rule 144 is tried and its clause (4) is evaluated, the user is asked in line (42) of the typescipt of Appendix III whether a good marker can be found. The user responds "YES", so that clause (4) is unsatisfied and Rule 144 fails. Next Rule 145 is tried but it also fails due to its clause (4). Finally Rule 199 is tried. To evaluate clause (5) of Rule 199, the user is asked in line (43) of the typescript whether structural position of the data need be preserved. The user responds "YES", so that clause (5) of Rule 199 is satisfied. To evaluate clause (6) of Rule 199, the user is asked in line (44) of the typescript, "do you have calibration points (WZ)?" The user responds "NO", so that Rule 199 succeeds and concludes that the semi-automatic processing module for LINE-1 is DROMO. Consequently, Rule 195 currently under consideration also succeeds, concluding that the processing for automatic short-wave correction is SATAN.

Recall that Rule 106 is still under consideration and the evaluation of its premise required determination of the type of processing for automatic short-wave correction. Rule 106, however, fails due to its clause (1). Therefore, other rules are tried to determine the suggestions regarding the survey. Rule 168 is tried and succeeds, and a suggestion is generated saying "the maximum statics that can be calculated safely (i.e. avoiding phase jump) is 16 msec."

Since the top-level goal SUGGESTIONS is multivalued, all of the other rules concluding SUGGESTIONS are tried in an attepmt to find more values. Rule 235 is tried but it fails due to its clause, (2). Finally, Rule 254 is tried but it also fails due to its clause (2).

Now that all of the rules concluding SUGGESTIONS have been tried, step 194 of FIG. 14 calls FINDOUT of FIG. 15 to determine the next initial goal TOCHECK of the root context type SURVEY. In other words, the WAVES system focuses its attention on whether the user should check any data processing steps. First Rule 17 is tried and it succeeds, concluding that velocities should be checked. Since TOCHECK is multivalued, all of the other rules concluding TOCHECK are tried. Rule 18 is tried but it fails due to its clause (2). Then Rule 19 is tried but it also fails due to its clause (2). Finally, Rule 20 is tried but it also fails due to its clause (2), and determination of the initial goal TOCHECK is completed.

The next goal of the SURVEY context type is PAST-PROCESSING, requiring a determination of the data processing steps that should have already been run on the seismic data. Rule 15 is tried but it fails due to its clause (1). No other rules conclude PAST-PROCESSING so that determination of PAST-PROCESSING is finished.

The final goal of the SURVEY context type is PROCESSING. The PROCESSING goal is determined in order to code a seismic data processing job for the target computer 22 (FIG. 1). Rule 23 is first tried, and evaluation of its premise requires determination of a parameter LONGWAVE representing whether automatic long-wave connections should be done. Rule 2 is tried but it fails due to its clause (3). The only other rules concluding LONGWAVE is Rule 169, but Rule 169 fails due to its clause (1). LONGWAVE is therefore determined to be unknown. Consequently, Rule 23 fails due to its clause (1). Next Rule 66 is tried, but it also fails due to its clause (1).

Finally Rule 67 is tried and it succeeds. The first action clause of Rule 67 expands the SATANFPDT module (Appendix II) into its component program (SATAN). The "Create a program" language in the action clauses of Rule 67 is an English translation of a call to the MAKEINSTANCE function of Appendix VII.

The first action clause of Rule 67 creates a first program context, PROGRAM-1, having the parameter ORDER# set to 43, the parameter PROGRAM-GROUP set to a value of SATANFPDT and the parameter PROGRAM-NAME set to velocity analysis. The value of ORDER# parameter is used to specify the order of the program in the job deck. The first goal parameter, ARGUMENTS, is determined to find the arguments for the first program. All of the rules concluding arguments are tried but they all fail. Therefore, the second and last goal, ARG-EXPLANATIONS, is next determined by trying all of the rules concluding or generating argument explanations, but they all fail. Hence, processing for the first program context is finished.

Next the second action clause of Rule 67 creates a second program context, PROGRAM-2. The order number parameter, ORDER#, is set to 52. The first goal ARGUMENTS is determined by trying the rules. Rule 132 succeeds concluding that an argument of the program is NBF70.

ARGUMENTS is a multivalued parameter so that the rest of the rules concluding ARGUMENTS are tried. Rule 134 is tried and it succeeds concluding that another argument for PROGRAM-2 is COEF1, and also concluding an ARG-EXPLANATIONS or comment that "COEF may be increased to further enhance continuity." Rule 135 is tried, but clause (2) of its premise requires determination of the trace interval, TIR, the trace interval for PROGRAM-2. Rule 136 is tried in order to determine TIR, and Rule 136 succeeds concluding that the trace interval for PROGRAM-2 is 97. For further evaluation of the premise of Rule 135, the number of traces between shot-points for the line must be determined to test clause (5). To determine a value for NUMBETWEEN for the context LINE-1, Rule 115 is tried and it succeeds, concluding that the number of traces between shot-points for the line is the number of traces per shot-point (96, from line 12 of the typescript of Appendix III) divided by twice the number of traces per CPD (24, from line 15 of the typescript). The calculation is performed when the conclusion is asserted, resulting in a value of 2 for the number of traces between shot-points for the line. Consequently, Rule 135 also succeeds concluding that the arguments for PROGRAM-2 include NSP 49, TIR 97, NGE 98, and CMX 24. Still more rules are tried to determine arguments for PROGRAM-2. Rule 176 is tried, but its premise clause (3) requires the nyquist of the line. Rule 114 defines the nyquist as 250 divided by the sampling rate of recording for the shot-point line, and concludes that the nyquist is 125. Consequently, Rule 176 succeeds and concludes that another argument for PROGRAM-1 is LCN01. Still more rules are tried, and Rule 190 succeeds, concluding an argument NT12. Finally, the last rule concluding ARGUMENTS, Rule 257, is tried and succeeds, also concluding an argument NT12, but it is recognized that ARGUMENTS already has the value NT12, so that Rule 257 has no effect.

Now that ARGUMENTS, the first goal of the PROGRAM context type, has been determined, WAVES directs its attention to determining the second and last goal ARG-EXPLANATIONS. Rule 134 already was applied to the PROGRAM 2 context. All of the other rules concluding ARG-EXPLANATIONS fail for PROGRAM-2.

Recall that the WAVES system is currently searching for values of the PROCESSING goal of the root context type, SURVEY. Since PROCESSING is a multivalued parameter, the rest of the rules concluding PROCESSING are tried. Rule 171 is tried and succeeds, creating a third program context, PROGRAM-3, with LIBRI CN 01 for the name of the program, SATAN for the group of programs, and 7 for the order number. To determine the arguments for PROGRAM-3, all of the rules concluding ARGUMENTS are tried. To test the premise of Rule 216, the value of the first argument for the filter, LCN01-A, is needed. To determine LCN01-A, Rule 133 is tried, which in turn needs a value for the minimum recorded frequency of the line, MINRECFREQ. To determine MINRECFREQ, Rule 119 is tried which in turn requires a value for the minimum sweep frequency of the line, MINISWEEP. Rule 118 defines the minimum sweep frequency as the minimum of the beginning sweep frequency and the end sweep frequency. (Note that the sweep frequency refers to the frequency of the Vibroseis TM excitation signal (FIG. 8), which is presumed to be frequency-swept and not pseudorandom.) These frequencies are determined by asking the user in lines (45) and (46) of the typescript of Appendix III. The user specifies 15 for the beginning sweep frequency and 90 for the ending sweep frequency. Therefore, Rule 118 concludes that the minimum sweep frequency of the line is 15.

Rule 119 also needs to know whether there is a strong ground roll (i.e., seismic ground wave). The user is asked this question in line (47) of the typescript and responds "NO." Consequently, Rule 119 fails due to its clause (4).

Next Rule 180 is tried in order to find a value for MINRECFREQ. Rule 180 succeeds, concluding that the minimum recorded frequency is 15, the maximum of the geophone frequency (10 hertz) and the minimum sweep frequency (15 hertz). Consequently, Rule 133 concludes that the first filter argument LCN01-A is 15, the second filter argument LNC01-B is 21, the third filter argument LNC01-C is 62, and the fourth filter argument LCN01-D is 72. Rule 133 also concludes an argument explanation that "LCN filter from geophone frequency to one-half nyquist."

Rule 216 currently under consideration also succeeds due to the value of 15 for LNC01-A, and concludes that L300,B(15,21,62,72),NR18, SI2 are arguments for the third program, LIBRI CN 01. Other rules are tried to determine more arguments and argument explanations, but they all fail, and consideration of the PROGRAM-3 context is finished.

To find more values for the PROCESSING goal currently being determined, more rules are tried. Rule 242 succeeds and includes thirty separate action clauses for successively creating program contexts for the DROMO module. In other words, Rule 242 expands the DROMO module into an ordered list of its component programs. A separate program context is created by the MAKEINSTANCE function of Appendix VIII for each component program in order to apply the rules concluding the ARGUMENTS and ARG-EXPLANATIONS goals of the PROGRAM context type to the particular conditions or requirements of each program.

A PROGRAM context, PROGRAM-4, is created for the "DEFIN 4 2000" program and Rule 157 concludes arguments EA, EB, and ED.

A PROGRAM context, PROGRAM-5, is created for the "DEFIN 2 2000" program and Rule 172 concludes the argument ES.

A PROGRAM context, PROGRAM-6, is created for the "LIBRI TR 01" program, but the rules fail to provide particular arguments or explanations.

PROGRAM-7 is created for the "LIBRI BD 01" program but the rules fail to provide arguments or explanations.

PROGRAM-8 is created for the "LIBRI SC 01" program, but again the rules fail to provide arguments or explanations.

PROGRAM-9 is created for the "LIBRI MU 01" program, but the rules still fail to provide arguments or explanations.

PROGRAM-10 is created for the "LIBRI CN 02" program. The rules fail to provide arguments or explanations.

PROGRAM-11 is created for the "LIBRI CT 01" program. The rules fail to provide arguments or explanations.

PROGRAM 12 is created for the "BOUCL 1" program. When the rules are tried, Rule 245 succeeds and concludes that Dl, MX . . . , and NSP . . . are arguments for the "BOUCL 1" program. No other arguments and no explanations are concluded by the rules.

PROGRAM-13 is created for the "INPTR ES" program and the rules fail to provide any arguments or explanations.

PROGRAM-14 is created for the "FILTR EB EA" program. Rule 175 succeeds and provides the argument LCN2. No other arguments and no explanations are concluded by the rules.

PROGRAM-15 is created for the "MUTES EA EB" program. Rule 234 succeeds and provides the argument LMU1.

PROGRAM-16 is created for the "EDITE EB EA" program. Rule 243 succeeds and provides the argument LSC1.

PROGRAM-17 is created for the "DYNQU EA EB" program. The rules, however, fail to provide any arguments or explanations.

PROGRAM-18 is created for the "FBPIK NP E ED" program. The rules fail to provide any arguments or explanations.

PROGRAM-19 is created for the "FINBO" program. Again, no arguments or explanations are concluded.

PROGRAM-20 is created for the "BOUCL 2" program. Still no arguments or explanations are concluded.

PROGRAM-21 is created for the "OUTBD ED" program. No arguments or explanations are concluded.

PROGRAM-22 is created for the "FINBO" program. No arguments or explanations are concluded.

PROGRAM-23 is created for the "PROCS" program. Rule 23 succeeds and provides the arguments X(B1). No additional arguments and no explanations are concluded.

PROGRAM-24 is created for the "BREAK EA EB" program. Rule 246 provides the arguments DISC..., NSP..., NTR..., INTTR..., and DXM.... No explanations are concluded.

PROGRAM-25 is created for the "DEFIN 2000" program. No arguments or explanations are concluded.

PROGRAM-26 is created for the "LIBR1 TR 01" program. No arguments or explanations are concluded.

PROGRAM-27 is created for the "LIBR1 E1 01" program. No arguments or explanations are concluded.

PROGRAM-28 is created for the "LIBR1 H 01" program. No arguments or explanations are concluded.

PROGRAM-29 is created for the "BOUCL EA" program. No arguments or explanations are concluded.

PROGRAM-30 is created for the "INPTR ES" program. No arguments or explanations are concluded.

PROGRAM-31 is created for the "DROMO EA" program. Rule 27 succeeds and provides the arguments DISC..., TIR..., LIE1, DI..., SA..., SB..., DF... No explanations are concluded.

PROGRAM-32 is created for the "FINBO" program. No arguments or explanations are concluded.

PROGRAM-33 is created for the "PROCS" program. No arguments or explanations are concluded.

The action clause's of Rule 171 have all been executed, so that application of Rule 171 is finished. No other rules concluding PROCESSING succeed, so that the PROCESSING goal is satisfied.

Now that all of the goals of the root context type SURVEY have been determined, the values of the DISPLAYRESULT parameters are displayed to the user. Suggestions regarding the survey, things to check, and past processing steps that should be done are listed. PRINTPROCESSING, however, is a function so that it is evaluated or applied when WAVES tries to find out its value. As shown in Appendix VIII, PRINTPROCESSING is a user-defined LISP function. If WAVES cannot solve the user's seismic data analysis problem, the PRINTPROCESSING function displays a message saying that no conclusions could be made regarding the survey. Otherwise, as shown near the end of the typescript of Appendix III, the job deck for the survey is listed including the programs to be run and the arguments for the programs. The argument explanations are included in the job deck as comments. At the end of application of the PRINTPROCESSING function, the consultation regarding the survey is finished.

In view of the above, an automatic programming system has been described which enables the user to solve a problem within a certain problem area by efficiently and effectively applying the capabilities of the target computer system. The knowledge base of the system includes a large number of rules encoding expertise on how to solve problems and in particular on how to best employ the capabilities of the target computer system. By obtaining a sufficient number of rules from a human expert, loading the rules into the knowledge base, and running a sufficient number of test cases, the system will display an expert level of proficiency in solving problems within a the problem area. The system increases productivity by providing more efficient use of the user's time and computer system resources. Once the system achieves an expert level of performance, better solutions to the user's problems are obtained and the expertise in the domain is preserved in the knowledge base in a maintainable form. The rules can be edited and new rules can be added to updpate or expand the knowledge base. The rules can be copied and loaded into a number of knowledge systems to distribute the expertise to other interested users. By using the explanation facility of the knowledge system, a nonexpert user can learn what kinds of information are relevant to the solution of problems within the problem area, what plans are effective and efficient for soliving such problems, and how to accomplish desired results using the available capabilities of the target computer system.

For solving data processing problems such as seismic data analysis for obtaining a seismic cross-section, inexperienced users can prepare job decks including a large number of programs in proper sequences and having arguments selected to suit particular conditions. The user is prompted for relevant information and is told suggestions, things to check, and pre-processing steps that should already have been done, in order to insure that all relevant information possessed by the user is considered in the design of the computer program and to insure that the data to be processed is properly collected and formatted. Problems that cannot be solved by the available data processing capabilities are identified so that the capabilities can be enhanced to better suit the legitimate needs of the user.

| APPENDICES I–VIII TABLE OF CONTENTS | |
|---|---|
| APPENDIX I | GLOSSARY |
| APPENDIX II | DESCRIPTION OF SEISMIC DATA PROCESSING PROGRAMS |
| APPENDIX III | TYPESCRIPT OF A WAVES CONSULTATION INCLUDING PROGRAM FOR DATA PROCESSING JOB |
| APPENDIX IV | WAVES RULES |
| APPENDIX V | WAVES CONTEXT TYPE DEFINITIONS |
| APPENDIX VI | WAVES PARAMETERS |
| APPENDIX VII | WAVES LISP FUNCTIONS USED IN CONNECTION WITH MAKING PROGRAM CONTEXTS |
| APPENDIX VIII | WAVES LISP FUNCTION FOR GENERATING A SEISMIC DATA |

| -continued |
|---|
| APPENDICES I-VIII TABLE OF CONTENTS |
| PROCESSING JOB |

APPENDIX I

GLOSSARY

Amplitude recovery

Adjusting a trace by a multiplicative gain control factor. Typically the gain control factor is selected for scaling the trace to constant signal energy over a portion of the trace that is stacked.

Anomaly

A deviation in uniformity in the physical properties (e.g. seismic velocity or density) of the earth.

Argument

A parameter or variable passed to a computer program, subroutine or function to specify or affect the operation or result of the computer program, subroutine or function.

Backward chaining

An inference method wherein the value for a goal is solved by searching backward in the knowledge base for a rule which concludes the goal, and then finding values for the parameters in the premise of the rule, and so on, until a chain of inference is established concluding the goal.

Brute stack

The sum of traces resulting from stacking.

Capabilities of a computer system

Functions that the system can perform upon request.

CDP (Constant Depth Point) method

A standard method of obtaining and processing traces so that traces corresponding to reflections from common depth points are stacked, thereby eliminating the need for a dip correction prior to stacking.

Certainty, cf, confidence

A number that expresses how likely it is that a parameter has its associated value. The number may range, for example, from 1.0 (certainty) to 0.0 (unknown) to −1.0 (definitely not).

Computer system

Any system of information processing capabilities stored and executed in hardware or software.

Conclusion

The action part of an if-then rule which is asserted when the rule is invoked and the premise of the rule is found to be true.

Consultation

A question and answer session between a user and a knowledge system wherein the user may access knowledge stored in the knowledge base of the knowledge system.

Context

A particular instance of a context type.

Context type

A class or type of objects.

Correlation

A preliminary processing step performed on a Vibroseis TM trace which generates a new trace, each point of which represents the integrated value of the product of the original trace and a time shifted version of the Vibroseis TM excitation signal. Rather than perform multiplication and integrations, however, an equivalent result is obtained by performing a complex multiplication between the complex Fourier transforms of the trace and the Vibroseis TM excitation signal, and obtaining the inverse Fourier transform of the complex product.

Deconvolution

An operation performed upon a seismic trace to sharpen or spike indications of reflections by applying an inverse filter selected to remove the filtering effect of signal transmission from the source of artificial seismic waves to the output of the receiver (geophone or hydrophone). The trace is in effect correlated with the expected response of the signal transmission path, but usually the correlation is performed in the frequency domain by a multiplication or division upon the complex spectrum of the trace. (See correlation).

Design

A prescription for behavior which generally omits some minor details but which specifies the program to enough detail so that the filling-in of final details required by a specific recipient is straightforward.

Dip

The angle that a reflecting horizon or strata makes with a horizontal plane. The angle is measured in a plane normal to the "strike" or line of intersection between the plane of the reflecting horizon or strata and the horizontal plane.

Effective

Getting the right answer in problem-solving.

Efficient

Solving a problem quickly or with few resources.

Elevation

A time-shift correction made to a trace to compensate for the relative elevation of the corresponding seismic receiver (geophone or hydrophone).

Encode

Filling in missing details in a design and expressing the result in a representation system suitable for reading by the intended recipient.

Expert

Someone who knows how to solve problems more efficiently or effectively than average people, usually by dint of special methods or facts derived from experience.

Expert system

A knowledge system which can demonstrate an expert level of proficiency in a particular subject or domain.

Expertise

Facts, procedures, and heuristic rules that simplify, improve or m:ake more efficient problem-solving activities.

Explanation

Answering questicns about problem-solving activities by translating goals, inferences, and reasons into expressions that are easy to understand.

Filtering

The attenuation of selected frequencies in a trace. In general, the optimum degree of attenuation at a particular frequency should be proportional to the ratio of the amplitude of the noise component to the amplitude of the artificial seismic wave component at the particular frequency.

First breaks

The first seismic signals from the shot-point which are recorded on the trace.

Fold

The number of traces which are stacked for a common depth point.

Geometry

A correction for deviation of the arrangement of shot-point and receivers from the ideal or specified split or off-end spreads.

Goal

A parameter for which a value is being sought.

Horizon (reflecting)

A reflecting plain for artificial seismic waves.

If-then rule

A rule that takes the form:
if <PREMISE≦ then <CONCLUSION≦.

Intelligent assistant

A knowledge-based expert system (knowledge system) that interacts with a user to help solve problems, often by combining knowledge about solving specific kinds of problems with knowledge about usage protocols for employing the available capabilities (e.g., programs) of a computer system.

Invoke

The testing of a rule to determine whether the rule is true in a particular instance; if so, the conclusion or action specified by the rule is asserted.

Knowledge base

A collection of rules or other statements of machine readable knowledge in maintainable form about a particular subject or domain.

Knowledge engineer

A person who creates or maintains a knowledge base.

Knowledge system

A system that stores fragments of problem-solving know-how in a knowledge base and that solves problems by using an inference engine to select, interpret and apply knowledge base elements to the goal problem and derived subproblems. Unlike traditional systems, knowledge systems generally accept, store and manipulate knowledge in an intelligible formalism and can explain their reasoning by translating their knowledge and intermediate results into easily understood forms.

Line

The line of a linear spread. See split spread and off-end spread.

Long-wave correction

Static correction of a trace to compensate for a long wavelength anomaly.

Low velocity near-surface layer

The upper layer of the earth's crust which has an exceptionally low seismic velocity due to weathering, oxidation and dehydration effects. Although it is sometimes referred to as the "weathered" layer, in many cases it is closely associated with the water table.

Maintainable knowledge

Representations of facts, heuristics and procedures that are easy to understand and modify, such as the highly modular and english-like formalism of if-then rules used in many knowledge systems.

Marker

An indication of a first break on a trace.

Migration

Corrections for dip, curvature, and anomalies so that a seismic time section is properly converted to a seismic depth section.

Module

A specific set of computer programs which are functionally related.

Near Offset

The spacing between the shot-point and the closest receiver for an off-end spread.

Near-surface layer

See low velocity layer.

NMO (Normal Moveout)

A correction made by time shifting a trace to compensate for the normal or geometrical increase in reflection time due to offset of the respective receiver (geophone or hydrophone) from the source of artificial seismic waves. The NMO correction is applied before combining or stacking traces, and in contrast to the static correction for near-surface delays, a separate NMO correction is required for each reflecting horizon and applies to only the part of the trace including the respective reflection.

Object

A context, i.e., a specific instance of a context type.

Off-end (unidirectional) spread

A geometrical layout of the seismic receivers (geophones or hydrophones) with respect to the shot-point wherein the shot-point and receivers are collinear, the receivers are equally spaced from each other, and all of the receivers are to one side of the shot-point.

Parameter

A quantity that takes on a value describing an attribute or characteristic of an object.

Problem

A discrepancy between a user's goal and a user's current situation.

Problem-solving methods

Procedures, algorithms, or tactics for trying to achieve a goal.

Program

A specification of behavior for a computer system.

Reason

The justification of why a fact is true, for example, by the rule or rules invoked to conclude the fact or by the information obtained from the user upon which the conclusion is based.

Semi-automatic processing

Static correction of a trace that requires some human evaluation of the trace such as handpicking of first breaks.

Short-wave correction

Static correction of a trace to compensate for short wavelength anomalies.

Split spread

A geometrical layout of the seismic receivers (geophones or hydrophones) with respect to the shot-point point wherein the shot-point and receivers are equally spaced on the same line and the shot-point occupies a central position.

Shot-point

Location of the source of artificial seismic waves for a particular set of traces.

Spread

The relative positions of the seismic receivers (geophones or hydrophones) and the shot-point. See split spread and off-end spread.

Stacking

A method of summing together a number of traces that have been aligned along the time axis for reflections at a particular horizon, so that the reflections add coherently and are emphasized in relation to noise, direct waves, ground waves, refracted waves, and undesired reflections which add incoherently.

Static correction

A correction that is assumed to be constant for an entire trace and is made by time shifting the trace. The stataic correction is associated primarily with near-surface delays in the transmission of the artificial seismic waves.

Target computer system

The computer system that provides the capabilities for processing information that is employed in solving a problem.

Trace

A time variant signal from a particular seismic receiver (geophone or hydrophone) at a certain location obtained in response to an artificial seismic wave generated by a source at another certain location.

TABLE 1

APPENDIX II
SEISMIC DATA PROCESSING PROGRAMS
PROGRAM MODULES

| | |
|---|---|
| Semi-automatic processing: | COMPSATAN, DROMO, MITAN, STACKDROMO |
| Automatic long-wave correction: | SATLW |
| Automatic short-wave correction: | LISTA-1, LISTA-2, SATAN, SATAN-2, SATANFPDT |

TABLE 2

COMPONENT PROGRAMS OF THE PROGRAM MODULES

| | |
|---|---|
| Program sequence: | COMPSATAN |
| Correction Type: | Semi-automatic |
| Component Programs: | MODET with PL option |
| | SPSTA |
| | FINBO |
| | BOUCL |
| | MODET |
| | OUTBD |
| | DECON |
| | STACK |
| Program Sequence: | DROMO |
| Correction Type: | Semi-automatic |
| Component Programs: | DEFIN |
| | LIBRI TR |
| | LIBRI BD |
| | LIBRI SC |
| | LIBRI MU |
| | LIBRI CN |
| | LIBRI CT |
| | BOUCL |
| | INPTR |
| | FILTR |
| | MUTES |
| | EDITE |
| | DYNQU |
| | FBPIK |
| | FINBO |
| | BOUCL |
| | OUTBD |
| | FINBO |
| | PROCS |
| | BREAK |
| | DEFIN |
| | LIBRI TR |
| | LIBRI EL |
| | LIBRI HB |
| | BOUCL |
| | INPTR |
| | DROMO |
| | FINBO |
| | PROCS |
| Program Sequence: | LISTA-1 |
| Correction Type: | Automatic, short-wave |
| Component Programs: | LISTA |
| | LISAR |
| Additional Notes: | Do Velocity Analysis before running this job. |
| Program Sequence: | LISTA-2 |
| Correction Type: | Automatic, Short-wave |

TABLE 2-continued
COMPONENT PROGRAMS OF THE PROGRAM MODULES

| | |
|---|---|
| Component Programs: | LIBRI CN |
| | SATAN |
| | LISTA |
| Additional Notes: | Do Velocity Analysis before running this job. |
| Program Sequence: | MITAN |
| Correction Type: | Semi-automatic |
| Component Programs: | BOUCL |
| | INPTR |
| | DYNQU |
| | HISTA |
| | FANMO |
| | MITAN |
| | FINBO |
| | PROCS |
| Program Sequence: | SATAN |
| Correction Type: | Automatic, short-wave |
| Component Programs: | LIBRI CN |
| | SATAN |
| Additional Notes: | Do Velocity Analysis before running this job. |
| Program Sequence: | SATAN-2 |
| Correction Type: | Automatic, short-wave |
| Component Programs: | LIBRI CN |
| | SATAN |
| Additional Notes: | Do Velocity Analysis before running this job. Run one pass of SATAN, then redo the velocity analysis and run SATAN a second time. |
| Program Sequence: | SATANFPDT |
| Correction Type: | Automatic, short-wave |
| Component Programs: | SATAN with FP option |
| Additional Notes: | Do Velocity Analysis before running this job. |
| Program Sequence: | SATLW |
| Correction Type: | Automatic, long-wave |
| Component Programs: | SATLW |
| Program Sequence: | STACKDROMO |
| Correction Type: | Semi-automatic |
| Component Programs: | LIBRI CN |
| | BOUCL |
| | INPTR |
| | MODET |
| | HISTA |
| | FILTR |
| | OUTST |
| | OUTST |
| | FINBO |
| | BOUCL |
| | YDRIV |
| | INDIC |
| | STACK with DI option |
| | INDIC |
| | STACK with RV option |
| | FINBO |
| | BOUCL |
| | TRACO |
| | RAGOU |
| | FINBO |
| | BOUCL |
| | TRACO |
| | RAGOU |
| | FINBO |
| | PROCS |

TABLE 3
DESCRIPTION OF INDIVIDUAL PROGRAMS

BOUCL—the beginning of user controlled loop.

BREAK—working in conjunction with FBPIK, this program constructs a first break ploy on a calcomp tape or a disc that can then be plotted on the GOULD or SERCEL TNR, as required, by the program CALCOMP.

DECON—a standard spiking deconvolution program.

DEFIN—used to define the number, the dimension, and the residence of the buffers used during a job.

DROMO—computes static corrections from the picking times of the first breaks. The picking is done by FBPIK and can be corrected through LIBRI RU. Sorting and gathering of this picking allow construction of intercept curves which are handled according to Gardner's method for refraction studies.

DYNQU—applies an equalization function to the traces.

EDITE—scales or edits a trace according to the parameters defined in the scaling library LIBRI SC.

FANMO—applies normal moveout corrections defined in a velocity library (LIBRI VI) and optionally muted with or without water bottom reference.

FBPIK—automatically picks first breaks or accepts handpicked values and arranges the selected values in a form suitable for application of BREAK (graphic display of first breaks) and DROMO (calculation of static corrections).

FILTR—applies the filter operator stored in one or more convolution libraries and performs a spatial interpolation between libraries as a function of CDP numbers.

FINBO—the end of user controlled loop.

HISTA—applies various types of static corrections.

INDIC—sets the index of a multi trace buffer.

INPTR—reads the traces defined in LIBRI TR and automatically transfor;s the input format into Control Data 60 bit internal format.

LIBRI BD (i.e., program LIBRI with BD option)—used to specify the output reel numbers.

LIBRI CN (i.e., program LIBRI with CN option)—used to calculate and store one or more filter operators.

LIBRI CT (i.e., program LIBRI with CT option)—used to store additional static corrections which will be applied by HISTA. It can also be used to enter handpicked values from first breaks for correction by FBPIK and DROMO.

LIBRI EL (i.e., program LIBRI with EL option)—stores ground level and weathering layer base elevation in a table.

LIBRI HB (i.e., program LIBRI with HB option) allows the user to establish a standard label for the various plotter displays.

LIBRI MU (i.e., program LIBRI with MU option)—specifies mute functions which may be applied or used by several application programs.

LIBRI SC (i.e., program LIBRI with SC option)—defines the traces to be scaled, the zone to be scaled on these traces and the scaling coefficient.

LIBRI TR (i.e., program LIBRI with TR option)—defines the tapes, files, and trace numbers to be read by the input program INPTR.

LISAR—harmonized program of residual static corrections that distributes additional statics between the geophone positions and shot-points and makes them surface consistent.

LISTA—a program of static correction smoothing, and an option allows the flattening of a horizon.

MITAN—calculates static corrections by correlation from station to station.

MODET—used to modify one or several parameters contained in the trace header. PL option allows unlimited calculation sequences.

MUTES—applies mutes defined in the mute library LIBRI MU, as a function of offset distances and CDP numbers.

OUTBD—writes single or multiple traces onto nine track tapes at 800, 1600 or 6250 bpi density depending on the format specified by the user.

OUTST—selects traces according to any of their trace header words, and/or sorts them with or without connection to another loop for processing.

PROCS—used to control the execution of the processing sequence.

RAGOU—displays seismic traces on a GOULD electrostatic plotter.

SATAN—automatic residual static corrections program. With FP option, the REMI picking is in a window centered on one specific horizon.

SATLW—residual static correction program that attempts to correct long wavelength anomalies.

SPSTA—performs special stacks by summing traces selected according to one or two header words.

STACK—performs traces addition, mainly used to stack CDP traces. With DI option, stacks only direct shots. With RV option, stacks only reverse shots.

TRACO—utility program which stores several traces in the same buffer.

YDRIV—reads the file transmitted by OUTST.

---

APPENDIX III
TYPESCRIPT OF A WAVES CONSULTATION
INCLUDING PROGRAM FOR DATA PROCESSING JOB

---

Rules, Parms, Go, ect.: Go
Previous case number, NEW, or carriage return for next case:
** 130
Loading <SEISMIC.STATICS.CASES>SURVEY.130.1...
Consultation options for survey 130 (type ? for help):
**
16-Nov-84 14:16:53
[consultation of 13-Dec-82 1:07 PM]
For the following consultation you will need the Brute Stack (or a first pass of Residual Statics) and the Shot Point Gather Display.

SURVEY-130
(1) What is the number of this survey?
** 9990006
(2) What area was SURVEY-130 done in?
** SW KANSAS
(3) Who is the client that ordered SURVEY-130?
** CGG
(4) What is your group ID?
** 212
(5) Was this a 2D, 3D, SLALOM line or WLP survey?
** 2D
(6) Was this a land or marine survey?
** LAND
(7) What is the size of SURVEY-130 (in miles)?
** 10
(8) Do you have a special request to study total statics from refraction data for SURVEY-130?
** NO
(9) What is the cultural environment of SURVEY-130 (e.g., plains, mountains, etc.)?
** PLAINS
Select one line from SURVEY-130 and use it to answer the following questions.

LINE-1
(10) What is the number of this line?
** 6
(11) What was the source used for Line 6?
** VIBROSEIS ™

---

-continued
APPENDIX III
TYPESCRIPT OF A WAVES CONSULTATION
INCLUDING PROGRAM FOR DATA PROCESSING JOB

---

(12) How many traces per shot point are there?
** 96
(13) What is the distance between traces?
** 110
(14) What type of spread was used for Line 6?
** SPLIT
(15) What was the fold (number of traces per CDP) for Line 6?
** 24
(16) Were the shots done at geophone locations?
** NO
(17) What is the near offset (in feet) for Line 6?
** 275
(18) What is the geophone frequency?
** 10
(19) What is the length of recording for processing?
** 3
(20) What is the sample rate used for processing (in msec)?
** 2
(21) What is the quality of the signal-to-noise ratio?
** FAIR
(22) Is the quality of the signal consistent along Line 6?
** YES
(23) Are there (or were there) rivers in the area of SURVEY-130?
** YES
(24) Look carefully at the first breaks. Can you see a surface-consistent anomaly (i.e. some anomaly at a geophone location for any SP number)?
** YES ANOMALY-1
(25) What is the amplitude of ANOMALY-1 in msecs?
** 30
(26) What is the length of the anomaly with respect to the total spread length?
** .5
(27) Are there any other types of surface-consistent anomalies?
** NO
(28) Do you have some shot points plotted?
** YES
(29) Do you notice any chattering effect?
** YES
(30) Please estimate the amplitude of this chattering effect (in msecs):
** 4
(31) Enter your estimate of the residual maximum time shift from one shot point to another after application of field statics:
** 0
(32) What is the dominant frequency of the reflection in the zone of interest?
** 30
(33) Do you want to process the long wave statics?
** YES
(34) Are there any horizons of Line 6 that have any the following characteristics?
   1. it exists all along the line (or the part of the line in question),
   2. there is no multiple interference,
   3. it is not faulted,
   4. it is not in the mute zone (or shows on enough trace that the delta-t is significant),
   5. it is a very coherent event.
If so, choose the horizon with the most of these characteristics and enter information about this horizon only.
** YES HORIZON-1
(35) What is the beginning time (in msec) for HORIZON-1?
** 900
(36) Do you think that the horizon at 900 milliseconds is a coherent enough event to calculate automatic continuous velocity horizon after using SATAN?
** YES

APPENDIX III
TYPESCRIPT OF A WAVES CONSULTATION INCLUDING PROGRAM FOR DATA PROCESSING JOB
-continued

(37) Does the horizon at 900 milliseconds exist all along the line?
** YES
(38) Is there multiples interference in the horizon at 900 milliseconds?
** NO
(39) Is the horizon at 900 milliseconds faulted?
** NO
(40) Is the delta-T of the horizon at 900 milliseconds insignificant because of its extent into the mute zone?
** YES
(41) Look again at the shot point display. Can you see reflections?
** YES
(42) Can you find a good marker?
** YES
(43) Do you need to preserve the structural position?
** YES
(44) Do you have calibration points (WZ)?
** NO
(45) What is the beginning sweep frequency?
** 15
(46) What is the ending sweep frequency?
** 90
(47) Is there a strong ground roll?
** NO The data analysis steps to check are as follows:
Velocities.
The suggestions regarding SURVEY-130 are as follows:
The maximum statics that can be calculated safely
(i.e. avoiding phase jump) is 16 msec.
The programs to run for SURVEY-130 are as follows:

```
*   LIBRI CN 01              L300,B(15,21,62,72),
                             NR18, SI2
*C        LCN filer from geophone frequency to ½ Nyquist.
*   DEFIN       4       2000  „
*   DEFIN       2       2000  ES
*   LIBRI TR 01
*   LIBRI BD 01
*   LIBRI SC 01
*   LIBRI MU 01
*   LIBRI CN 02
*   LIBRI CT 01
*   BOUCL       1             D1,MTX...,NSP...
*   INPTR               ES
*   FILTR       EB      EA    LCN2
*   MUTES       EA      EB
*   EDITE       EB      EA    LSC1
*   DYNQU       EA      EB
*   FBPIK   NP  EB      ED
*   FINBO
*   BOUCL       2
*   OUTBD       ED
*   FINBO
*   PROCS                     X(B1)
*   BREAK       EA      EB
DISC...,NSP...,NTR...,INTTR...,DXM...
*   DEFIN                     2000
*   LIBRI TR 01
*   LIBRI EI 01
*   LIBRI HB 01
*   BOUCL               EA
*   INPTR               ES
*   DROMO       EA
B2234,TIR...,LIE1,DI...,SA...,SB...,DF...
*   FINBO
*   PROCS
*   Velocity Analysis
*   SATAN
NBF70,COEF12,NSP49,TIR97,NGE98,CMX24,LCN01,NT12
*C  COEF may be increased to further enhance continuity
```

APPENDIX IV
WAVES RULES

RULE 001

[This rule applies to shot point lines, and is tried in order to find out about the static analysis type for the survey]

If:
(1) The type of recording done on the survey is 2d,
(2) The type of the survey is land,
(3) The cultural environment of the survey is plains,
(4) Rivers do not exist in the area of the survey, and
(5) A deformation has not been found that shows at all depths of a particular CDP range Then: It is definite (1.0) that the static analysis type for the survey is plain-statics

RULE 002

[This rule applies to shot point lines, and is tried in order to find out about whether automatic long-wave correction should be done]

If:
(1) The quality of the signal/noise for the shot point line is one of: good fair,
(2) A deformation has been found that shows at all depths of a particular CDP range, and
(3) The extent of the deformation with respect to the spread length for the shot point line is greater than or equal to twice the geophone spread length Then: It is definite (1.0) that automatic long-wave correction should not be done

RULE 003

[This rule applies to programs, and is tried in order to find out about the arguments for the program]

If:
(1) The name of the program is satan,
(2) The static analysis type for the survey is plain-statics,
(3) The quality of the signal/noise for the shot point line is good,
(4) Dynamite is one of the seismic sources for the shot point line,
(5) The dynamite was shot in a shothole, and
(6) The geometry is not regular for the shot point line Then: It is definite (1.0) that the following is one of the arguments for the program: MOT100

RULE 008

[This rule applies to shot point lines, and is tried in order to ind out about the suggestions regarding the survey]

If:
(1) The static analysis type for the survey is one of: plain-statics river-statics,
(2) The quality of the signal/noise for the shot point line is bad,
(3) Processing for the shot point line has been checked and statics are apparently the problem,
(4) This is not thought to be a statics problem,
(5) The user's certainty that this is not a statics problem is greater than or equal to 30, and
(6) Shot points have not been plotted for the shot point line Then: It is definite (1.0) that the following is one of the suggestions regarding the survey: Plot some shot points. Use filter 12–40 and equalization L600 (every 5 of 10 shot points).

RULE 009

[This rule applies to shot point lines, and is tried in order to find out about the static analysis type for the survey]

If:
- (1) The type of recording done on the survey is 2d,
- (2) The type of the survey is land,
- (3) The cultural environment of the survey is plains,
- (4) A deformation has been found that shows at all depths of a particular CDP range, and
- (5) The extent of the deformation with respect to the spread length for the shot point line is less than half the geophone spread length Then: It is definite (1.0) that the static analysis type for the survey is plain-statics

RULE 010

[This rule applies to surveys, and is tried in order to find out about the static analysis type for the survey]

If:
- (1) The type of recording done on the survey is 2d,
- (2) The type of the survey is land,
- (3) The cultural environment of the survey is plains, and
- (4) Rivers do exist in the area of the survey It is definite (1.0) that the static analysis type for the survey is river-statics

RULE 011

[This rule applies to shot point lines, and is tried in order to find out about the data analysis steps to check or the suggestions regarding the survey]

If:
- (1) The static analysis type for the survey is one of: plain-statics river-statics,
- (2) The quality of the signal for the shot point line is bad,
- (3) Shot points have been plotted for the shot point line,
- (4) You have examined anomalies in the shot point line of the survey, and have found one for which
  - A: The amplitude of this anomaly is less than 3 milliseconds, or
  - B: Length of anomaly with respect to geophone spread length is greater than or equal to half the geophone spread length,
- (5) Reflections are seen in the shot point display for the shot point line,
- (6) The quality of the reflections in the shot point line is fair, and
- (7) The continuity of the reflections for the shot point line is broken Then:
- (1) It is definite (1.0) that the following is one of the data analysis steps to check: Velocities, and
- (2) It is definite (1.0) that the following is one of the suggestions regarding the survey: Velocities may improve, but velocity difficult to interpret.

RULE 012

[This rule applies to shot point lines, and is tried in order to find out about the maximum statics that can be calculated safely (avoiding phase jump)]

If:
- (1) The static analysis type for the survey is one of: plain-statics river-statics, and
- (2) The average frequency of data in the zone of interest is known Then: It is definite (1.0) that the maximum statics that can be calculated safely (avoiding phase jump) is 1000 divided [2 times the average frequency of data in the zone of interest]

RULE 015

[This rule applies to shot point lines, and is tried in order to find out about the processing steps that should already have been run]

If: Semi-automatic processing is not needed for the shot point line

Then:
- (1) It is definite (1.0) that NMO is one of the processing steps that should already have been run,
- (2) It is definite (1.0) that Deconvolution is one of the processing steps that should already have been run,
- (3) It is definite (1.0) that Field Statics is one of the processing steps that should already have been run,
- (4) It is definite (1.0) that Amplitude Recovery is one of the processing steps that should already have been run,
- (5) It is definite (1.0) that Geometry is one of the processing steps that should already have been run, and
- (6) It is definite (1.0) that Formatting is one of the processing steps that should already have been run

RULE 017

[This rule applies to shot point lines, and is tried in order to find out about the data analysis steps to check]

If:
- (1) The static analysis type for the survey is river-statics,
- (2) The quality of the signal/noise for the shot point line is fair, and
- (3) The quality is consistent along the shot point line Then: It is definite (1.0) that the following is one of the data analysis steps to check: Velocities

RULE 018

[This rule applies to shot point lines, and is tried in order to find out about the data analysis steps to check]

If:
- (1) The static analysis type for the survey is one of: plain-statics river-statics,
- (2) The quality of the signal/noise for the shot point line is bad, and
- (3) The quality is consistent along the shot point line Then:
- (1) It is definite (1.0) that the following is one of the data analysis steps to check: Velocity Analysis,
- (2) It is definite (1.0) that the following is one of the data analysis steps to check: First breaks, and
- (3) It is definite (1.0) that the following is one of the data analysis steps to check: Geometry

RULE 019

[This rule applies to shot point lines, and is tried in order to find out about the data analysis steps to check]

If:
- (1) The static analysis type for the survey is river-statics,
- (2) The quality of the signal/noise for the shot point line is good, and
- (3) The quality is not consistent along the shot point line Then:
(1) It is definite (1.0) that the following is one of the data analysis steps to check: Field Statics,
(2) It is definite (1.0) that the following is one of the data analysis steps to check: Geometry, and
(3) It is definite (1.0) that the following is one of the data analysis steps to check: Velocity Analysis

RULE 020

[This rule applies to shot point lines, and is tried in order to find out about the data analysis steps to check]

If:
(1) The static analysis type for the survey is river-statics,
(2) The quality of the signal/noise for the shot point line is good,
(3) The quality is not consistent along the shot point line,
(4) There are anomalies in the shot point line of the survey, and
(5) The quality of the anomalies for the shot point line is bad Then: It is definite (1.0) that the following is one of the data analysis steps to check: First breaks

RULE 021

[This rule applies to shot point lines, and is tried in order to find out about the processing for automatic short-wave correction]

If:
(1) The static analysis type for the survey is one of: plain-statics river-statics,
(2) Semi-automatic processing is not needed for the shot point line,
(3) Automatic long-wave correction should not be done, and
(4) The quality of the signal/noise for the shot point line is fair Then: It is definite (1.0) that the processing for automatic short-wave correction is SATAN

RULE 022

[This rule applies to shot point lines, and is tried in order to find out about the suggestions regarding the survey]

If:
(1) The static analysis type for the survey is river-statics,
(2) The quality of the signal/noise for the shot point line is one of: good fair,
(3) A deformation has been found that shows at all depths of a particular CDP range,
(4) The extent of the deformation with respect to the spread length for the shot point line is greater than or equal to twice the geophone spread length, and
(5) The user does not want to process the long wave statics Then: It is definite (1.0) that the following is one of the suggestions regarding the survey: If you decide later to process the long wave statics, you may do so using FBPIK-DROMO.

RULE 023

[This rule applies to shot point lines, and is tried in order to find out about the programs to include in the job deck]

If: Automatic long-wave correction should be done

Then: Create a program with SATLW for the name of the program, SATLW for the group of programs that the program belongs to and 58 for the program order of the program

RULE 024

[This rule applies to shot point lines, and is tried in order to find out about whether semi-automatic processing is needed for the shot point line]

If:
(1) The static analysis type for the survey is river-statics,
(2) The quality of the signal/noise for the shot point line is good,
(3) A deformation has been found that shows at all depths of a particular CDP range,
(4) The extent of the deformation with respect to the spread length for the shot point line is less than twice the geophone spread length,
(5) The extent of the deformation with respect to the spread length for the shot point line is greater than or equal to half the geophone spread length,
(6) The user does want to process the long wave statics, and
(7) You have examined the horizons of the shot point line of the survey, and have found one for which
A: This horizon does not exist all along the line, or
B: Multiples interference does appear in this horizon Then: It is definite (1.0) that semi-automatic processing is needed for the shot point line

RULE 026

[This rule applies to shot point lines, and is tried in order to find out about the processing for automatic short-wave correction or whether automatic long-wave correction should be done]

If:
(1) The static analysis type for the survey is river-statics,
(2) Refraction analysis for the survey has not been requested specifically,
(3) The quality of the signal/noise for the shot point line is good,
(4) The quality is consistent along the shot point line,
(5) A deformation has been found that shows at all depths of a particular CDP range,
(6) The extent of the deformation with respect to the spread length for the shot point line is less than twice the geophone spread length,
(7) The extent of the deformation with respect to the spread length for the shot point line is greater than or equal to half the geophone spread length,
(8) The user does want to process the long wave statics,
(9) The long wave anomaly is isolated, and
(10) You have examined the horizons of the shot point line of the survey, and have found one for which
A: This horizon does exist all along the line,
B: Multiples interference does not appear in this horizon,
C: This horizon is not faulted,
D: This horizon is not in the mute zone, and
E: This horizon is a quite coherent event Then:
(1) It is definite (1.0) that the processing for automatic short-wave correction is SATANFPDT, and (2) It is definite (1.0) that automatic long-wave correction should be done

RULE 027

[This rule applies to shot point lines, and is tried in order to find out about the processing for automatic short-wave correction, whether automatic long-wave correction should be done or the suggestions regarding the survey]

If:
- (1) The static analysis type for the survey is river-statics,
- (2) Refraction analysis for the survey has not been requested specifically,
- (3) The quality of the signal/noise for the shot point line is good,
- (4) The quality is consistent along the shot point line,
- (5) A deformation has been found that shows at all depths of a particular CDP range,
- (6) The extent of the deformation with respect to the spread length for the shot point line is less than twice the geophone spread length,
- (7) The extent of the deformation with respect to the spread length for the shot point line is greater than or equal to half the geophone spread length,
- (8) The user does want to process the long wave statics,
- (9) The long wave anomaly is isolated, and
- (10) You have examined the horizons of the shot point line of the survey, and have found one for which
  - A: This horizon does exist all along the line,
  - B: Multiples interference does not appear in this horizon,
  - C: This horizon is not faulted,
  - D: This horizon is not in the mute zone, and
  - E: This horizon is not a quite coherent event Then:
- (1) It is definite (1.0) that the processing for automatic short-wave correction is SATAN,
- (2) It is definite (1.0) that automatic long-wave correction should not be done, and
- (3) It is definite (1.0) that the following is one of the suggestions regarding the survey: If this horizon at <horiztime [foundvar]> is coherent after running SATAN, run SATAN FP, DT and SATLW on the resulting data. Otherwise, you will have to hand pick.

RULE 029

[This rule applies to shot point lines, and is tried in order to find out about the processing for automatic short-wave correction or whether automatic long-wave correction should be done]

If:
- (1) The static analysis type for the survey is river-statics,
- (2) Refraction analysis for the survey has not been requested specifically,
- (3) The quality of the signal/noise for the shot point line is good,
- (4) The quality is consistent along the shot point line,
- (5) A deformation has been found that shows at all depths of a particular CDP range,
- (6) The extent of the deformation with respect to the spread length for the shot point line is less than twice the geophone spread length,
- (7) The extent of the deformation with respect to the spread length for the shot point line is greater than or equal to half the geophone spread length,
- (8) The user does want to process the long wave statics,
- (9) The long wave anomaly is isolated, and
- (10) You have examined the horizons of the shot point line of the survey, and have found one for which
  - A: This horizon does exist all along the line,
  - B: Multiples interference does not appear in this horizon, and
  - C: This horizon is faulted Then:
- (1) It is definite (1.0) that the processing for automatic short-wave correction is SATAN, and
- (2) It is definite (1.0) that automatic long-wave correction should be done

RULE 031

[This rule applies to shot point lines, and is tried in order to find out about whether semi-automatic processing is needed for the shot point line]

If:
- (1) The static analysis type for the survey is river-statics,
- (2) The quality of the signal/noise for the shot point line is fair,
- (3) The quality is consistent along the shot point line,
- (4) A deformation has been found that shows at all depths of a particular CDP range,
- (5) The extent of the deformation with respect to the spread length for the shot point line is less than twice the geophone spread length,
- (6) The extent of the deformation with respect to the spread length for the shot point line is greater than or equal to half the geophone spread length,
- (7) The user does want to process the long wave statics, and
- (8) You have examined the horizons of the shot point line of the survey, and have found one for which
  - A: This horizon is a coherent enough event to calculate automatic continuous velocity horizon after SATAN,
  - B: This horizon does exist all along the line,
  - C: Multiples interference does not appear in this horizon,
  - D: This horizon is not faulted, and
  - E: This horizon is in the mute zone Then: It is definite (1.0) that semi-automatic processing is needed for the shot point line

RULE 033

[This rule applies to shot point lines, and is tried in order to find out about whether semi-automatic processing is needed for the shot point line]

If:
- (1) The static analysis type for the survey is river-statics,
- (2) The quality of the signal/noise for the shot point line is fair,
- (3) The quality is consistent along the shot point line,
- (4) A deformation has been found that shows at all depths of a particular CDP range,
- (5) The extent of the deformation with respect to the spread length for the shot point line is less than twice the geophone spread length, (6) The extent of the deformation with respect to the spread length for the shot point line is greater than or equal to half the geophone spread length,
(7) The user does want to process the long wave statics, and
(8) You have examined the horizons of the shot point line of the survey, and have found one for which
   A: This horizon is not a coherent enough event to calculate automatic continuous velocity horizon after SATAN,
   B: This horizon does not exist all along the line, or
   C: Multiples interference does appear in this horizon
Then: It is definite (1.0) that semi-automatic processing is needed for the shot point line

RULE 037

[This rule applies to anomalies, and is tried in order to find out about the type of statics indicated by the anomaly]
If:
(1) Length of anomaly with respect to geophone spread length is greater than or equal to half the geophone spread length, and
(2) The amplitude of the anomaly is greater than or equal to 3 milliseconds
Then: It is definite (1.0) that the type of statics indicated by the anomaly is long-wave

RULE 038

[This rule applies to anomalies, and is tried in order to find out about the type of statics indicated by the anomaly]
If:
(1) The amplitude of the anomaly is greater than or equal to 3 milliseconds, and
(2) Length of anomaly with respect to geophone spread length is less than half the geophone spread length
Then: It is definite (1.0) that the type of statics indicated by the anomaly is short-wave

RULE 040

[This rule applies to shot point lines, and is tried in order to find out about whether semi-automatic processing is needed for the shot point line]
If: (1) The static analysis type for the survey is one of: plain-statics river-statics,
(2) The quality of the signal for the shot point line is bad,
(3) Shot points have been plotted for the shot point line, and
(4) You have examined anomalies in the shot point line of the survey, and have found one for which
   A: The amplitude of this anomaly is greater than or equal to 3 milliseconds, and
   B: Length of anomaly with respect to geophone spread length is greater than or equal to twice the geophone spread length
Then: It is definite (1.0) that semi-automatic processing is needed for the shot point line

RULE 054

[This rule applies to surveys, and is tried in order to find out about the static analysis type for the survey]
If: (1) The type of recording done on the survey is 2d,
(2) The type of the survey is land, and
(3) The cultural environment of the survey is mountains
Then: It is definite (1.0) that the static analysis type for the survey is mountain-statics

RULE 066

[This rule applies to shot point lines, and is tried in order to find out about the program to include in the job deck]
If: The processing for automatic short-wave correction is SATANFPDT
Then:
(1) Create a program with Velocity Analysis for the name of the program, SATANFPDT for the group of programs that the program belongs to and 43 for the program order of the program, and
(2) Create a program with SATAN FP for the name of the program, SATANFPDT for the group of programs that the program belongs to and 57 for the program order of the program

RULE 067

[This rule applies to shot point lines, and is tried in order to find out about the programs to include in the job deck]
If: The processing for automatic short-wave correction is SATAN
Then:
(1) Create a program with Velocity Analysis for the name of the program, SATAN for the group of programs that the program belongs to and 43 for the program order of the program, and
(2) Create a program with SATAN for the name of the program, SATAN for the group of programs that the program belongs to and 52 for the program order of the program

RULE 072

[This rule is definitional, applies to shot point lines, and is tried when information is received about the quality of the signal/noise for the shot point line]
If: The quality of the signal/noise for the shot point line is good
Then: It is definite (1.0) that the quality of the signal for the shot point line is not bad

RULE 074

[This rule applies to shot point lines, and is tried in order to find out about whether the quality of the signal for the shot point line is bad]
If:
(1) The quality of the signal/noise for the shot point line is fair, and
(2) The quality is not consistent along the shot point line
Then: It is definite (1.0) that the quality of the signal for the shot point line is bad

RULE 075

[This rule applies to programs, and is tried in order to find out about the explanation of the arguments to the program]
If:
(1) The name of the program is satan,
(2) The static analysis type for the survey is mountain-statics,
(3) Refraction analysis for the survey has not been requested specifically, and (4) The survey is not an area of smooth elevations Then: It is definite (1.0) that the following is one of the explanation of the arguments to the program: Before running SATAN, the field statics should be applied from a flat datum because of fast variation in elevation.

RULE 077

[This rule applies to shot point lines, and is tried in order to find out about the probable causes for the statics found in the shot point line]

If:
  (1) The static analysis type for the survey is one of: plain-statics river-statics,
  (2) The quality of the signal/noise for the shot point line is bad,
  (3) Processing for the shot point line has been checked and statics are apparently the problem,
  (4) This should be considered a statics problem,
  (5) Shot points have been plotted for the shot point line, and
  (6) The maximum amplitude of all shortwave anomalies, chattering, and timeshift is greater than or equal to the maximum statics that can be calculated safely (avoiding phase jump)

Then: It is definite (1.0) that very-large-statics is one of the probable causes for the statics found in the shot point line

RULE 078

[This rule applies to anomalies, and is tried in order to find out about the type of statics indicated by the anomaly]

If: The amplitude of the anomaly is less than 3 milliseconds

Then: It is definite (1.0) that the type of statics indicated by the anomaly is verysmall

RULE 081

[This rule applies to shot point lines, and is tried in order to find out about whether the quality of the signal for the shot point line is bad]

If:
  (1) The quality of the signal/noise for the shot point line is fair,
  (2) The quality is consistent along the shot point line,
  (3) Shot points have been plotted for the shot point line, and
  (4) The maximum amplitude of all shortwave anomalies, chattering, and timeshift is less than the maximum statics that can be calculated safely (avoiding phase jump)

Then: It is definite (1.0) that the quality of the signal for the shot point line is not bad

RULE 087

[This rule applies to shot point lines, and is tried in order to find out about the data analysis steps to check or the probable causes for the statics found in the shot point line]

If:
  (1) The static analysis type for the survey is one of: plain-statics river-statics,
  (2) The quality of the signal/noise for the shot point line is bad,
  (3) Processing for the shot point line has been checked and statics are apparently the problem,
  (4) Shot points have been plotted for the shot point line,
  (5) Reflections are not seen in the shot point display for the shot point line,
  (6) There is not strong interference caused by either an air wave or organized noise, and
  (7) There are spiked or clipped samples for the shot point line Then:
  (1) It is definite (1.0) that the following is one of the data analysis steps to check: Formatting, and
  (2) It is definite (1.0) that Formatting is one of the probable causes for the statics found in the shot point line

RULE 098

[This rule applies to shot point lines, and is tried in order to find out about the probable causes for the statics found in the shot point line]

If: (1) The static analysis type for the survey is one of: plain-statics river-statics,
  (2)
    A:
      (1) The quality of the signal/noise for the shot point line is bad, and
      (2) Processing for the shot point line has been checked and statics are apparently the problem,
    or
    B: The quality of the signal/noise for the shot point line is fair,
  (3) Shot points have been plotted for the shot point line,
  (4) Reflections are seen in the shot point display for the shot point line,
  (5) A chattering effect has been noticed, and
  (6) The estimated amplitude of the chattering effect is known Then: It is definite (1.0) that medium-statics is one of the probable causes for the statics found in the shot point line

RULE 106

[This rule applies to shot point lines, and is tried in order to find out about the programs to include in the job deck or the suggestions regarding the survey]

If: The processing for automatic short-wave correction is 2SATAN

Then:
  (1) Create a program with Velocity Analysis for the name of the program, 2SATAN for the group of programs that e program belongs to and 43 for the program order of the program,
  (2) Create a program with SATAN for the name of the program, 2SATAN for the group of programs that the program belongs to and 52 for the program order of the program, and
  (3) It is definite (1.0) that the following is one of the suggestions regarding the survey: After running the first pass of SATAN you will probably need to redo the velocity analysis and run SATAN a second time.

RULE 114

[This rule applies to shot point lines, and is tried in order to find out about the nyquist of the shot point line]

If: The sample rate of recording for the shot point line is known

Then: It is definite (1.0) that the nyquist of the shot point line is 250 divided by the sample rate of recording for the shot point line

RULE 115

[This rule applies to shot point lines, and is tried in order to find out about the number of traces between shot points]

If:
(1) The number of traces per shot point for the shot point line is known, and
(2) The number of traces per CDP in the shot point line is known Then: It is definite (1.0) that the number of traces between shot points is the number of traces per shot point for the shot point line divided [2 times the number of traces per CDP in the shot point line]

RULE 118

[This rule applies to shot point lines, and is tried in order to find out about the minimum sweep frequency]

If:
(1) Vibroseis TM is one of the seismic sources for the shot point line,
(2) The beginning sweep frequency is known, and
(3) The end sweep frequency is known Then: It is definite (1.0) that the minimum sweep frequency is the minimum of
(1) The end sweep frequency, and
(2) The beginning sweep frequency

RULE 119

[This rule applies to shot point lines, and is tried in order to find out about the minimum recorded frequency]

If:
(1) Vibroseis TM is one of the seismic sources for the shot point line,
(2) The frequency of signal at the phones is known,
(3) The minimum sweep frequency is known, and
(4) There is a strong ground roll Then: It is definite (1.0) that the minimum recorded frequency is the maximum of
(1) The frequency of signal at the phones, and
(2) The minimum sweep frequency plus 5

RULE 128

[This rule applies to surveys, and is tried in order to find out about the static analysis type for the survey]

If:
(1) The type of recording done on the survey is 2d,
(2) The type of the survey is land,
(3) The cultural environment of the survey is desert, and
(4) Dunes do exist in the area of the survey Then: It is definite (1.0) that the static analysis type or the survey is dune-statics

RULE 131

[This rule applies to programs, and is tried in order to find out about the arguments for the program]

If
(1) The name of the program is satan,
(2) A deformation has been found that shows at all depths of a particular CDP range,
(3) The extent of the deformation with respect to the spread length for the shot point line is less than half the geophone spread length,
(4)
A: The length of the recording is greater than 3 seconds,
B: The sample rate of recording for the shot point line is greater than 2 milliseconds,
C: The distance between traces for the shot point line is greater than or equal to 60 feet, or
D:
(1) The sample rate of recording for the shot point line is greater than or equal to 2 milliseconds, and
(2) High resolution analysis should not be done for the shot point line,
(5) Semi-automatic processing is not needed for the shot point line,
(6) The number of cdps along which the deformation extends is known, and
(7) The dip is stable over the number of CDPs of the extent of the deformation Then: It is definite (1.0) that the following is one of the arguments for the program: NT <the maximum of
(1) 12, and
(2) Numcdp >

RULE 132

[This rule applies to programs, and is tried in order to find out about the arguments for the program]

If:
(1) The name of the program is satan, and
(2)
A: The length of the recording is greater than 3 seconds,
B: The sample rate of recording for the shot point line is greater than 2 milliseconds,
C: The distance between traces for the shot point line is greater than or equal to 60 feet, or
D:
(1) The sample rate of recording for the shot point line is greater than or equal to 2 milliseconds, and
(2) High resolution analysis should not be done for the shot point line Then: It is definite (1.0) that the following is one of the arguments for the program: NBF70

RULE 133

[This rule applies to programs, and is tried in order to find out about the first argument of the filter, the second argument of the filter, the third argument for the filter, the fourth argument of the filter or the explanation of the arguments to the program]

If:
(1) The name of the program is libri cn 01,
(2) The minimum recorded frequency is known,
(3) The nyquist of the shot point line is known,
(4) The minimum recorded frequency plus 6 is less than or equal to the nyquist of the shot point line divided 2,
(5) A deformation has been found that shows at all depths of a particular CDP range,
(6) The extent of the deformation with respect to the spread length for the shot point line is greater than or equal to half the geophone spread length, and
(7) A: The length of the recording is greater than 3 seconds,
B: The sample rate of recording for the shot point line is greater than 2 milliseconds,
C: The distance between traces for the shot point line is greater than or equal to 60 feet, or
D:

(1) The sample rate of recording for the shot point line is greater than or equal to 2 milliseconds, and
(2) High resolution analysis should not be done for the shot point line Then:
(1) It is definite (1.0) that the first argument of the filter is the minimum recorded frequency,
(2) It is definite (1.0) that the second argument of the filter is the minimum recorded frequency plus 6,
(3) It is definite (1.0) that the third argument for the filter is the nyquist of the shot point line divided 2,
(4) It is definite (1.0) that the fourth argument of the filter is [the nyquist of the shot point line divided 2] plus 10, and
(5) It is definite (1.0) that the following is one of the explanation of the arguments to the program: LCN filer from geophone frequency to ½ Nyquist.

RULE 134

[This rule applies to programs, and is tried in order to find out about the explanation of the arguments to the program or the arguments for the program]

If:
(1) The name of the program is satan, and
(2)
A: The length of the recording is greater than 3 seconds,
B: The sample rate of recording for the shot point line is greater than 2 milliseconds,
C: The distance between traces for the shot point line is greater than or equal to 60 feet, or
D:
(1) The sample rate of recording for the shot point line is greater than or equal to 2 milliseconds, and
(2) High resolution analysis should not be done for the shot point line Then:
(1) It is definite (1.0) that the following is one of the explanation of the arguments to the program: COEF may be increased to further enhance continuity., and
(2) It is definite (1.0) that the following is one of the arguments for the program: COEF12

RULE 135

[This rule applies to programs, and is tried in order to find out about the arguments for the program]

If:
(1) The name of the program is satan,
(2) The type of semi-automatic processing needed for the shot point line is not COMPSATAN,
(3) The trace interval is known,
(4) The number of traces per CDP in the shot point line is known, and
(5) The number of traces between shot points is known Then:
(1) It is definite (1.0) that the following is one of the arguments for the program: NSP <tir / numbetween+1>,
(2) It is definite (1.0) that the following is one of the arguments for the program: TIR <tir>,
(3) It is definite (1.0) that the following is one of the arguments for the program: NGE <tir+1>, and
(4) It is definite (1.0) that the following is one of the arguments for the program: CMX <fold>

RULE 136

[This rule applies to programs, and is tried in order to find out bout the trace interval]

If:
(1) The name of the program is satan,
(2) The number of traces per shot point for the shot point line is known,
(3) The near offset of the shot point line is known, and
(4) The distance between traces for the shot point line is known Then: It is definite (1.0) that the trace interval is [[[the number of traces per shot point for the shot point line minus 1] times the distance between traces for the shot point line] plus the near offset of the shot point line] divided the distance between traces for the shot point line

RULE 142

[This rule applies to shot point lines, and is tried in order to find out about the type of semi-automatic processing needed for the shot point line]

If:
(1) Semi-automatic processing is needed for the shot point line,
(2) Refraction analysis for the survey has not been requested specifically,
(3) Geometry is one of the probable causes for the statics found in the shot point line,
(4) A good marker has been found for the shot point line,
(5) The value for the first break frequency has been confirmed,
(6) The dominant frequency of the firstbreak is known, and
(7) The maximum amplitude of all shortwave anomalies, chattering, and timeshift is less than 1000 divided by the dominant frequency of the firstbreak Then: It is definite (1.0) that the type of semi-automatic processing needed for the shot point line is STACK-DROMO

RULE 143

[This rule applies to shot point lines, and is tried in order to find out about the type of semi-automatic processing needed for the shot point line]

If:
(1) Semi-automatic processing is needed for the shot point line,
(2) Refraction analysis for the survey has not been requested specifically,
(3) The type of semi-automatic processing needed for the shot point line is not COMPSATAN,
(4) Geometry is one of the probable causes for the statics found in the shot point line,
(5) A good marker has been found for the shot point line,
(6) The value for the first break frequency has been confirmed,
(7) The dominant frequency of the firstbreak is known, and
(8) The maximum amplitude of all shortwave anomalies, chattering, and timeshift is greater than or equal to 1000 divided by the dominant frequency of the firstbreak Then: It is definite (1.0) that the type of semi-automatic processing needed for the shot point line is DROMO

RULE 144

[This rule applies to shot point lines, and is tried in order to find out about the type of semi-automatic processing needed for the shot point line]

If:
(1) Semi-automatic processing is needed for the shot point line,
(2) Refraction analysis for the survey has not been requested specifically,
(3) The type of semi-automatic processing needed for the shot point line is not COMPSATAN,
(4) A good marker has not been found for the shot point line,
(5) Reflections are seen in the shot point display for the shot point line, and
(6) The S/N ratio for the reflection is bad Then: It is definite (1.0) that the type of semi-automatic processing needed for the shot point line is MITAN

RULE 145

[This rule applies to shot point lines, and is tried in order to find out about the type of semi-automatic processing needed for the shot point line or the suggestions regarding the survey]

If:
(1) Semi-automatic processing is needed for the shot point line,
(2) Refraction analysis for the survey has not been requested specifically,
(3) The type of semi-automatic processing needed for the shot point line is not COMPSATAN,
(4) A good marker has not been found for the shot point line,
(5) Reflections are seen in the shot point display for the shot point line, and
(6) The S/N ratio for the reflection is fair Then:
(1) It is definite (1.0) that the type of semi-automatic processing needed for the shot point line is STACKDROMO, and
(2) It is definite (1.0) that the following is one of the suggestions regarding the survey: Even though the quality of the reflection is only FAIR, MITAN could be used instead of STACK DROMO if you feel confident of the data.

RULE 157

[This rule applies to programs, and is tried in order to find out out the arguments for the program]

If:
(1) The name of the program is DEFIN 4 2000,
(2) The group of programs that the program belongs to is dromo, and
(3) The program order of the program is 10

Then:
(1) It is definite (1.0) that the following is one of the arguments for the program: EA,
(2) It is definite (1.0) that the following is one of the arguments for the program:, EB, and
(3) It is definite (1.0) that the following is one of the arguments for the program: ED

RULE 168

[This rule applies to shot point lines, and is tried in order to find out about the suggestions regarding the survey]

If: The maximum statics that can be calculated safely (avoiding phase jump) is known Then: It is definite (1.0) that the following is one of the suggestions regarding the survey: The maximum statics that can be calculated safely (i.e. avoiding phase jump) is <avemaxstat> msec.

RULE 169

[This rule applies to shot point lines, and is tried in order to find out about whether automatic long-wave correction should be done]

If: The quality of the signal for the shot point line is bad

Then: It is definite (1.0) that automatic long-wave correction should not be done

RULE 171

[This rule applies to shot point lines, and is tried in order to find out about the programs to include in the job deck]

If: The processing for automatic short-wave correction is one of: 21ista 2satan satan Then: Create a program with LIBRI CN 01 for the name of the program, SATAN for the group of programs that the program belongs to and 7 for the program order of the program

RULE 172

[This rule applies to programs, and is tried in order to find out about the arguments for the program]

If:
(1) The group of programs that the program belongs to is dromo, and
(2) The program order of the program is 11

Then: It is definite (1.0) that the following is one of the arguments for the program: ES

RULE 173

[This rule applies to programs, and is tried in order to find out about the first argument of the filter, the second argument of the filter, the third argument for the filter, the fourth argument of the filter or the explanation of the arguments to the program]

If:
(1) The name of the program is libri cn 01,
(2) Semi-automatic processing is not needed for the shot point line,
(3) The minimum recorded frequency is known,
(4) The minimum recorded frequency plus 6 is less than or equal to the minimum recorded frequency times 3,
(5) A deformation has been found that shows at all depths of a particular CDP range, and
(6) The extent of the deformation with respect to the spread length for the shot point line is less than half the geophone spread length Then:
(1) It is definite (1.0) that the first argument of the filter is the minimum recorded frequency,
(2) It is definite (1.0) that the second argument of the filter is the minimum recorded frequency plus 6,
(3) It is definite (1.0) that the third argument for the filter is 3 times the minimum recorded frequency,
(4) It is definite (1.0) that the fourth argument of the filter is [3 times the minimum recorded frequency] plus 10, and
(5) It is definite (1.0) that the following is one of the explanation of the arguments to the program: LCN filter should be from minimum recorded frequency to three times the minimum recorded frequency.

RULE 175

[This rule applies to programs, and is tried in order to find out about the arguments for the program]

If:
(1) The group of programs that the program belongs to is dromo, and
(2) The program order of the program is 20

Then: It is definite (1.0) that the following is one of the arguments for the program: LCN2

RULE 176

[This rule applies to programs, and is tried in order to find out about the arguments for the program]

If:
(1) The name of the program is satan,
(2) The frequency of signal at the phones is known,
(3) The nyquist of the shot point line is known,
(4) The sample rate of recording for the shot point line is known,
(5) A deformation has been found that shows at all depths of a particular CDP range,
(6) The extent of the deformation with respect to the spread length for the shot point line is greater than or equal to half the geophone spread length, and
(7)
  A: The length of the recording is greater than 3 seconds,
  B: The sample rate of recording for the shot point line is greater than 2 milliseconds,
  C: The distance between traces for the shot point line is greater than or equal to 60 feet, or
  D:
    (1) The sample rate of recording for the shot point line is greater than or equal to 2 milliseconds, and
    (2) High resolution analysis should not be done for the shot point line Then: It is definite (1.0) that the following is one of the arguments for the program: LCN01

RULE 180

[This rule applies to shot point lines, and is tried in order to find out about the minimum recorded frequency]

If:
(1) Vibroseis TM is one of the seismic sources for the shot point line,
(2) The frequency of signal at the phones is known, and
(3) The minimum sweep frequency is known Then: It is definite (1.0) that the minimum recorded frequency is the maximum of
(1) The frequency of signal at the phones, and
(2) The minimum sweep frequency

RULE 189

[This rule applies to shot point lines, and is tried in order to find out about whether a deformation has been found that shows at all depths of a particular CDP range]

If: There are anomalies in the shot point line of the survey

Then: It is definite (1.0) that a deformation has been found that shows at all depths of a particular CDP range

RULE 190

[This rule applies to programs, and is tried in order to find out about the arguments for the program]

If:
(1) The name of the program is satan,
(2) Semi-automatic processing is needed for the shot point line,
(3) The type of semi-automatic processing needed for the shot point line is not COMPSATAN, and
(4) A: The length of the recording is greater than 3 seconds,
  B: The sample rate of recording for the shot point line is greater than 2 milliseconds,
  C: The distance between traces for the shot point line is greater than or equal to 60 feet, or
  D:
    (1) The sample rate of recording for the shot point line is greater than or equal to 2 milliseconds, and
    (2) High resolution analysis should not be done for the shot point line Then: It is definite (1.0) that the following is one of the arguments for the program: NT12

RULE 194

[This rule applies to shot point lines, and is tried in order to find out about the extent of the deformation with respect to the spread length for the shot point line]

If: You have examined the anomalies in the shot point line of the survey for which length of anomaly with respect to geophone spread length is known, and have selected the it having the maximum value for length of anomaly with respect to geophone spread length Then: It is definite (1.0) that the extent of the deformation with respect to the spread length for the shot point line is this maximum value

RULE 195

[This rule applies to shot point lines, and is tried in order to find out about the processing for automatic short-wave correction]

If: The type of semi-automatic processing needed for the shot point line is known Then: It is definite (1.0) that the processing for automatic short-wave correction is SATAN

RULE 199

[This rule applies to shot point lines, and is tried in order to find out about the type of semi-automatic processing needed for the shot point line]

If
(1) Semi-automatic processing is needed for the shot point line,
(2) The type of semi-automatic processing needed for the shot point line is not COMPSATAN,
(3) You have examined anomalies in the shot point line of the survey, and have found one for which the type of statics indicated by this anomaly is long-wave,
(4) The user does want to process the long wave statics,
(5) The user does need to preserve the structural position of the data, and
(6) The user does not have calibration points Then: It is definite (1.0) that the type of semi-automatic processing needed for the shot point line is DROMO

RULE 215

[This rule applies to shot point lines, and is tried in order to find out about the spread length, twice the geophone spread length or half the geophone spread length]

If: The type of spread for the shot point line is split

Then:
(1) It is definite (1.0) that the spread length is 0.5,
(2) It is definite (1.0) that twice the geophone spread length is 1, and
(3) It is definite (1.0) that half the geophone spread length is 0.25

RULE 216

[This rule applies to programs, and is tried in order to find out about the arguments for the program]

If:
(1) The name of the program is libri cn 01,
(2) The first argument of the filter is known,
(3) The second argument of the filter is known,
(4) The third argument for the filter is known,
(5) The fourth argument of the filter is known, and
(6) The sample rate of recording for the shot point line is known Then: It is definite (1.0) that the following is one of the arguments for the program: L300,B(<lcn01-a><,><lcn01-b><,><lcn01-c><,><lcn01-d>),NR18, SI <samplerate>

RULE 219

[This rule applies to shot point lines, and is tried in order to find out about the maximum amplitude of the short wave anomalies]

If: You have examined the anomalies in the shot point line of the survey for which the type of statics indicated by this anomaly is short-wave, and have selected the it having the maximum value for the amplitude of this anomaly Then: It is definite (1.0) that the maximum amplitude of the short wave anomalies is this maximum value

RULE 221

[This rule applies to shot point lines, and is tried in order to find out about the maximum amplitude of all short-wave anomalies, chattering, and timeshift]

If: You have computed the maximum of the estimated amplitude of the chattering effect, the estimated maximum time shift between shot points and the maximum amplitude of the short wave anomalies Then: It is definite (1.0) that the maximum amplitude of all shortwave anomalies, chattering, and timeshift is this maximum value

RULE 226

[This rule applies to shot point lines, and is tried in order to find out about the programs to include in the job deck]

If: The type of semi-automatic processing needed for the shot point line is STACKDROMO Then:
(1) Create a program with LIBRI CN 02 for the name of the program, STACKDROMO for the group of programs that the program belongs to and 8 for the program order of the program,
(2) Create a program with BOUCL 1 for the name of the program, STACKDROMO for the group of programs that the program belongs to and 19 for the program order of the program,
(3) Create a program with INPTR for the name of the program, STACKDROMO for the group of programs that the program belongs to and 20 for the program order of the program,
(4) Create a program with MODET for the name of the program, STACKDROMO for the group of programs that the program belongs to and 21 for the program order of the program,
(5) Create a program with HISTA for the name of the the program, STACKDROMO for the group of programs that the program belongs to and 22 for the program order of the program,
(6) Create a program with FILTR for the name of the program, STACKDROMO for the group of programs that the program belongs to and 23 for the program order of the program,
(7) Create a program with OUTST for the name of the program, STACKDROMO for the group of programs that the program belongs to and 24 for the program order of the program,
(8) Create a program with OUTST for the name of the program, STACKDROMO for the group of programs that the program belongs to and 25 for the program order of the program,
(9) Create a program with FINBO for the name of the program, STACKDROMO for the group of programs that the program belongs to and 26 for the program order of the program,
(10) Create a program with BOUCL 2 for the name of the program, STACKDROMO for the group of programs that the program belongs to and 27 for the program order of the program,
(11) Create a program with YDRIV for the name of the program, STACKDROMO for the group of programs that the program belongs to and 28 for the program order of the program,
(12) Create a program with INDIC for the name of the program, STACKDROMO for the group of programs that the program belongs to and 29 for the program order of the program,
(13) Create a program with STACK DI for the name of the program, STACKDROMO for the group of programs that the program belongs to and 30 for the program order of the program,
(14) Create program with INDIC for the name of the program, STACKDROMO for the group of programs that the program belongs to and 31 for the program order of the program,
(15) Create a program with STACK RV for the name of the program, STACKDROMO for the group of programs that the program belongs to and 32 for the program order of the program,
(16) Create a program with FINBO for the name of the program, STACKDROMO for the group of programs that the program belongs to and 33 for the program order of the program,
(17) Create a program with BOUCL 3 for the name of the program, STACKDROMO for the group of programs that the program belongs to and 34 for the program order of the program,
(18) Create a program with TRACO for the name of the program, STACKDROMO for the group of programs that the program belongs to and 35 for the program order of the program,
(19) Create a program with RAGOU for the name of the program, STACKDROMO for the group of programs that the program belongs to and 36 for the program order of the program,

(20) Create a program with FINBO for the name of the program, STACKDROMO for the group of programs that the program belongs to and 37 for the program order of the program,

(21) Create a program with BOUCL 4 for the name of the program, STACKDROMO for the group of programs that the program belongs to and 38 for the program order of the program,

(22) Create a program with TRACO for the name of the program, STACKDROMO for the group of programs that the program belongs to and 39 for the program order of the program,

(23) Create a program with RAGOU for the name of the program, STACKDROMO for the group of programs that the program belongs to and 40 for the program order of the program,

(24) Create a program with FINBO for the name of the program, STACKDROMO for the group of programs that the program belongs to and 41 for the program order of the program, and

(25) Create a program with PROCS for the name of the program, STACKDROMO for the group of programs that the program belongs to and 42 for the program order of the program

RULE 233

[This rule applies to shot point lines, and is tried in order to find out about the estimated amplitude of the chattering effect]
If: A chattering effect has not been noticed
Then: Don't ask about the estimated amplitude of the chattering effect

RULE 234

[This rule applies to programs, and is tried in order to find out about the arguments for the program]
If:
(1) The group of programs that the program belongs to is dromo, and
(2) The program order of the program is 21
Then: It is definite (1.0) that the following is one of the arguments for the program: LMU1

RULE 235

[This rule applies to shot point lines, and is tried in order to find out about the type of semi-automatic processing needed for the shot point line or the suggestions regarding the survey]
If:
(1) Semi-automatic processing is needed for the shot point line,
(2) Refraction analysis for the survey has not been requested specifically,
(3) The type of semi-automatic processing needed for the shot point line is not COMPSATAN,
(4) A: Field-statics is one of the probable causes for the statics found in the shot point line, or
B: Very-large-statics is one of the probable causes for the statics found in the shot point line,
(5) A good marker has been found for the shot point line,
(6) The value for the first break frequency has been confirmed,
(7) The dominant frequency of the firstbreak is known,
(8) The maximum amplitude of all shortwave anomalies, chattering, and timeshift is less than 1000 divided by the dominant frequency of the firstbreak, and
(9) The user is confident of the velocity control for X/V correction of the first break
Then
(1) It is definite (1.0) that the type of semi-automatic processing needed for the shot point line is MITAN, and
(2) It is definite (1.0) that the following is one of the suggestions regarding the survey: Run MITAN on first breaks.

RULE 236

[This rule applies to shot point lines, and is tried in order to find out about the programs to include in the job deck]
If: The type of semi-automatic processing needed for the shot point line is MITAN
Then:
(1) Create a program with BOUCL 1 for the name of the program, MITAN for the group of programs that the program belongs to and 10 for the program order of the program,
(2) Create a program with DYNQU for the name of the program, MITAN for the group of programs that the program belongs to and 11 for the program order of the program,
(3) Create a program with DYNQU for the name of the program, MITAN for the group of programs that the program belongs to and 12 for the program order of the program,
(4) Create a program with HISTA for the name of the program, MITAN for the group of programs that the program belongs to and 13 for the program order of the program,
(5) Create a program with FANMO for the name of the program, MITAN for the group of programs that the program belongs to and 14 for the program order of the program,
(6) Create a program with MITAN for the name of the program, MITAN for the group of programs that the program belongs to and 15 for the program order of the program,
(7) Create a program with FINBO for the name of the program, MITAN for the group of programs that the program belongs to and 16 for the program order of the program, and
(8) Create a program with PROCS for the name of the program, MITAN for the group of programs that the program belongs to and 17 for the program order of the program

RULE 242

[This rule applies to shot point lines, and is tried in order to find out about the programs to include in the job deck]
If: The type of semi-automatic processing needed for the shot point line is DROMO
Then:
(1) Create a program with DEFIN 4 2000 for the name of the program, DROMO for the group of programs that the program belongs to and 10 for the program order of the program,
(2) Create a program with DEFIN 2 2000 for the name of the program, DROMO for the group of programs that the program belongs to and 11 for the program order of the program, (3) Create a program with LIBRI TR 01 for the name of the program, DROMO for the group of programs that the program belongs to and 12 for the program order of the program, (4) Create a program with LIBRI BD 01 for the name of the program, DROMO for the group of programs that the program belongs to and 13 for the program order of the program, (5) Create a program with LIBRI SC 01 for the name of the program, DROMO for the group of programs that the program belongs to and 14 for the program order of the program, (6) Create a program with LIBRI MU 01 for the name of the program, DROMO for the group of programs that the program belongs to and 15 for the program order of the program, (7) Create a program with LIBRI CN 02 for the name of the program, DROMO for the group of programs that the program belongs to and 16 for the program order of the program, (8) Create a program with LIBRI CT 01 for the name of the program, DROMO for the group of programs that the program belongs to and 17 for the program order of the program, (9) Create a program with BOUCL 1 for the name of the program, DROMO for the group of programs that the program belongs to and 18 for the program order of the program,

(10) Create a program with INPTR ES for the name of the program, DROMO for the group of programs that the program belongs to and 19 for the program order of the program,

(11) Create a program with FILTR EB EA for the name of the program, DROMO for the group of programs that the program belongs to and 20 for the program order of the program,

(12) Create a program with MUTES EA EB for the name of the program, DROMO for the group of programs that the program belongs to and 21 for the program order of the program,

(13) Create a program with EDITE EB EA for the name of the program, DROMO for the group of programs that the program belongs to and 22 for the program order of the program,

(14) Create a program with DYNQU EA EB for the name of the program, DROMO for the group of programs that the program belongs to and 23 for the program order of the program,

(15) Create a program with FBPIK NP EB ED for the name of the program, DROMO for the group of programs that the program belongs to and 24 for the program order of the program,

(16) Create a program with FINBO for the name of the program, DROMO for the group of programs that the program belongs to and 25 for the program order of the program,

(17) Create a program with BOUCL 2 for the name of the program, DROMO for the group of programs that the program belongs to and 26 for the program order of the program,

(18) Create a program with OUTBD ED for the name of the program, DROMO for the group of programs that the program belongs to and 27 for the program order of the program,

(19) Create a program with FINBO for the name of the program, DROMO for the group of programs that the program belongs to and 28 for the program order of the program,

(20) Create a program with PROCS for the name of the program, DROMO for the group of programs that the program, belongs to and 29 for the program order of the program,

(21) Create a program with BREAK EA EB for the name of the program, DROMO for the group of programs that the program belongs to and 30 for the program order of the program,

(22) Create a program with DEFIN 2000 for the name of the program, DROMO for the group of programs that the program belongs to and 31 for the program order of the program

(23) Create a program with LIBRI TR 01 for the name of the program, DROMO for the group of programs that the program belongs to and 32 for the program order of the program,

(24) Create a program with LIBRI EI 01 for the name of the program, DROMO for the group of programs that the program belongs to and 33 for the program order of the program,

(25) Create a program with LIBRI HB 01 for the name of the program, DROMO for the group of programs that the program belongs to and 34 for the program order of the program,

(26) Create a program with BOUCL EA for the name of the program, DROMO for the group of programs that the program belongs to and 35 for the program order of the program,

(27) Create a program with INPTR ES for the name of the program, DROMO for the group of programs that the program belongs to and 36 for the program order of the program,

(28) Create a program with DROMO EA for the name of the program, DROMO for the group of programs that the program belongs to and 37 for the program order of the program,

(29) Create a program with FINBO for the name of the program, DROMO for the group of programs that the program belongs to and 38 for the program order of the program, and

(30) Create a program with PROCS for the name of the program, DROMO for the group of programs that the program belongs to and 39 for the program order of the program

RULE 245

[This rule applies to programs, and is tried in order to find out about the arguments for the program]

If:
(1) The group of programs that the program belongs to is dromo, and
(2) The program order of the program is 18

Then:
(1) It is definite (1.0) that the following is one of the arguments for the program: D1,
(2) It is definite (1.0) that the following is one of the arguments for the program: MTX . . . , and
(3) It is definite (1.0) that the following is one of the arguments for the program: NSP . . .

RULE 246

[This rule applies to programs, and is tried in order to find out about the arguments for the program]

If:
(1) The group of programs that the program belongs to is dromo, and (2) The program order of the program is 30

Then:
  (1) It is definite (1.0) that the following is one of the arguments for the program: DISC . . . ,
  (2) It is definite (1.0) that the following is one of the arguments for the program: NSP . . . ,
  (3) It is definite (1.0) that the following is one of the arguments for the program: NTR . . . ,
  (4) It is definite (1.0) that the following is one of the arguments for the program: INTTR . . . , and
  (5) It is definite (1.0) that the following is one of the arguments for the program: DXM . . .

RULE 254

[This rule applies to shot point lines, and is tried in order to find out about the suggestions regarding the survey]

If:
  (1) Semi-automatic processing is needed for the shot point line,
  (2) A good marker has not been found for the shot point line, and
  (3) Reflections are not seen in the shot point display for the shot point line Then: It is definite (1.0) that the following is one of the suggestions regarding the survey: There is no good marker or reflections. You should run frequency analysis in order to make sure that there is no marker or reflection.

RULE 257

[This rule applies to programs, and is tried in order to find out about the arguments for the program]

If:
  (1) The name of the program is satan,
  (2) A deformation has been found that shows at all depths of a particular CDP range, and
  (3) The extent of the deformation with respect to the spread length for the shot point line is greater than or equal to half the geophone spread length Then: It is definite (1.0) that the following is one of the arguments for the program: NT12

APPENDIX V

WAVES CONTEXT TYPE DEFINITIONS

SURVEY

PARMGROUP: SURVEY-PARMS
PRINTID: SURVEY-
INITIALDATA: (SURVEYNUM AREANAME CLIENT GROUPID RECORDING WETORDRY SURVEYSIZE SPECIALREQUEST CULENVIRON)
GOALS: (SUGGESTIONS TOCHECK PAST-PROCESSING PROCESSING)
DISPLAYRESULTS: (TOCHECK SUGGESTIONS PAST-PROCESSING (PRINTPROCESSING))
SYN:
  (((SURVEYNUM)
  (Survey SURVEYNUM)))
UNIQUE: T
OFFSPRING: (LINE)
PROMPTEVER: ("For the following consultation you will need the Brute Stack (or a first pass of Residual Statics) and the Shot Point Gather Display.")
CNTXTSUMMARY:
  [(SURVEYNUM RECORDING WETORDRY CULENVIRON)
  (((SURVEYNUM RECORDING WETORDRY SURVEYSIZE AREANAME CULENVIRON)
  (Survey SURVEYNUM is a RECORDING WETORDRY survey covering SURVEYSIZE of AREANAME in a region of CULENVIRON %.))
  ((SURVEYNUM RECORDING WETORDRY SURVEYSIZE CULENVIRON)
  (Survey SURVEYNUM is a recording WETORDRY survey covering SURVEYSIZE in a region of CULENVIRON %.))
  ((SURVEYNUM RECORDING WETORDRY AREANAME CULENVIRON)
  (Survey SURVEYNUM is a RECORDING WETORDRY survey of AREANAME in a region of CULENVIRON %.))
  ((SURVEYNUM RECORDING WETORDRY CULENVIRON)
  (Survey SURVEYNUM is a RECORDING WETORDRY survey in a region of CULENVIRON %.))
  (NIL DUNES SMOOTHILLS RIVERS RAPIDCHANGE)
  (((CLIENT GROUPID)
  (The survey was orded by CLIENT and is being processed by group GROUPID %.]
RULETYPES: (SURVEYRULES)

LINE

ASSOCWITH: (SURVEY)
PROMPTEVER: ("Select one line from" * "and use it to answer the following questions.")
PARMGROUP: LINE-PARMS
PRINTID: LINE-
INITIALDATA: (LINENUM SOURCE NUMTRACES IPDIST SPREADTYPE FOLD SHOTAPHONE NEAROFFSET PHONEFREQ RECORDLEN SAMPLERATE SN STABLEQUAL)
SYN:
  (((LINENUM)
  (Line LINENUM)))
UNIQUE: MAYBE
OFFSPRING: (HORIZON MARKER ANOMALY PROGRAM)
CNTXTSUMMARY: ((LINENUM)
  (((LINENUM)
  (The line being analyzed is LINENUM %.)))
  ("Seismic source:" SOURCE SHOTHOLE SHOTAPHONE NEAROFFSET)
  ("Recording:" NUMTRACES IPDIST STREADTYPE FOLD PHONEFREQ RECORDLEN SAMPLERATE)
  ("Signal quality:" SN STABLEQUAL REALLYBAD ISTAT? NOTSTAT REALLYSTAT))
RULETYPES: (LINERULES)
TRANS: (the "shot point line of"*)

HORIZON

ASSOCWITH: (LINE SURVEY)
PARMGROUP: HORIZON-PARMS
PRINTID: HORIZON-
INITIALDATA: (HORIZTIME)
SYN: (((HORIZTIME)
  (the horizon at HORIZTIME)))
UNIQUE: MAYBE
PROMPT1ST: ("Are there any horizons of"* "that have any the following characteristics?"

"1. it exists all along the line (or the part of the line in question),"
"2. there is no multiple interference,"
"3. it is not faulted,"
"4. it is not in the mute zone (or shows on enough trace that the delta-t is significant),"
"5. it is a very coherent event."
"If so, choose the horizon with the most of these characteristics and enter information about this horizon only.")
RULETYPES: (HORIZONRULES)
TRANS: (the "horizons of"*)

MARKER

ASSOCWITH: (LINE SURVEY)
PROMPT1ST: (Look carefully at the first breaks. Do you see any markers which exist everywhere on the line?)
PROMPT2ND: (Do you see any other markers which exist everywhere on the line?)
PARMGROUP: MARKER PARMS
PRINTID: MARKER-
INITIALDATA: (START#END#MARKERVEL MARKERFREQ)
SYN: (((START#) (START#)))
UNIQUE: MAYBE
RULETYPES: (MARKERRULES)
TRANS: (the first "break marker of"*)

ANOMALY

ASSOCWITH: (LINE SURVEY)
PROMPT1ST: ("Look carefully at the first breaks. Can you see a surface-consistent anomaly (i.e., some anomaly at a geophone location for any SP number)?")
PROMPT2ND: ("Are there any other types of surface-consistent anomalies?")
PARMGROUP: ANOMALY-PARMS
PRINTID: ANOMALY-
INITIALDATA: (ANOMAMPLITUDE ANOMEXTENT)
SYN:
 (((ANOMTYPE)
 (ANOMTYPE)))
RULETYPES: (ANOMALYRULES)
TRANS: ("anomalies in"*)

PROGRAM

ASSOCWITH: (LINE SURVEY)
PARMGROUP: PROGRAM-PARMS
PRINTID: PROGRAM-
GOALS:
(ARGUMENTS ARG-EXPLANATIONS)
SYN:
 (((PROGRAM-NAME)
 (PROGRAM-NAME)))
PROMPT2ND: T
TYPETRANS: program
RULETYPES: (PROGRAMRULES)
TRANS: (the "programs to run for"*)

APPENDIX VI

WAVES PARAMETERS

SURVEY PARAMETERS

Initialdata Parameters:
 SURVEYNUM: the reference number for the survey
 AREANAME: the area in which the survey was done
 CLIENT: the client that ordered the survey
 GROUPID: the group processing the survey
 RECORDING: the type of recording done for the survey
 WETORDRY: whether the survey is a land or marine survey
 SURVEYSIZE: the size in miles of the survey
 SPECIALREQUEST: if refraction analysis has been requested
 CULENVIRON: the cultural environment of the survey
Goal Parameters:
 SUGGESTIONS: the suggestions regarding the survey
 TOCHECK: the analysis steps to check regarding the survey
 PAST-PROCESSING: the processing steps which should already have been done
 PROCESSING: the recommended processing steps for the survey
Other Parameters:
 24TRACEMILE: the number of records in the 24 trace/mile data
 DUNES: if there are dunes in the area
 RAPIDCHANGE: if there is a rapid weathering elevation change under the area
 RIVERS: if there are rivers in the area
 SMOOTHELEVATION: if there are smooth weathering elevations under the area
 SMOOTHHILLS: if there are smooth hills in the area
 STATICSTYPE: the static analysis type (PLAIN-, RIVER-, MOUNTAIN-, or DUNE-STATICS)
 TOTAL#RECORDS: the total number of records for the area

LINE PARAMETERS

Initialdata Parameters:
 LINENUM: the reference number of the line
 SOURCE: the seismic sources for the line
 NUMTRACES: the number of traces per shot point for the line
 IPDIST: the distance between traces for the line
 SPREADTYPE: the type of spread used for the line
 FOLD: the number of traces per common-depth-point
 SHOTATPHONE: if the locations of the shots were at geophone locations
 NEAROFFSET: the near offset of the line
 PHONEFREQ: the frequency of the geophone used to record the line
 RECORDLEN: the length in seconds of the recording for the line
 SAMPLERATE: the sample rate of recording for the line
 SN: the signal to noise ratio for the line
 STABLEQUAL: if the quality of the signal is stable along the line
Goal Parameters:
 none
Other Parameters:
 ANOMQUAL: the quality of the anomalies for the line
 AVE#CDP: the average number of CDPs over which the dips are stable AVEFREQ: the average frequency of data in the zone of interest
AVEMAXSTAT: the maximum statics that can be calculated safely avoiding phase jump
AVEPERIOD: the average period for the line
BADSIGNAL: if the quality of the signal for the line is bad
BEGINSWEEP: the beginning sweep frequency
CALIBPOINT: if the user has calibration points
CFHORIZ: if a lightly structured horizon is seen
CHAMPLITUDE: the estimated amplitude of the chattering effect
CHATOKAY: if the user feels chattering is not bad enough to edit before processing
CHATTERING: if a chattering effect has been noticed
COMBAMP the maximum amplitude of all anomalies, chattering, and time-shift
CONTINUITY: the continuity of the reflections for the line
CRMARKER: if there is a constant reflection marker everywhere on the line
DATUMCHANGE: if there is an abrupt change in elevation in the floating datum
DDT: the delta-delta-T for the estimated vs. used near trace time
DEFBELOW: if deformations have been noticed below valleys
DEFORMATION: if deformations or loss of continuity show at all depths for a CDP range
DEFORMEXTENT: the extent of the deformation with respect to the spread length
DIPSIZESMALL: if the dip size is less than the average maximum statics over the CDPs
DIPSTABLE: if the dip is stable over the CDPs of the extent of the deformation
ENDSWEEP: the end sweep frequency
ESTVNEAR: the estimated velocity used at this time in velocity analysis
FARTIME: the time in which the reflection occurs in the far trace
FARTRACE: the far trace number for this reflection
FAULTSEXIST: if the data is faulted for the line
FB-X/VOKAY: if the user is confident of the velocity control for X/V correction of the first break
FBFREQ: the dominant frequency of the firstbreak
FBFREQCONFIRMED: if the value for the firstbreak frequency has been confirmed
FBFREQOKAY: if the value for the firstbreak frequency has been confirmed
GOODBREAKS: if the firstbreaks are good for the line
GOODHORIZ: if there is a good horizon on the brute stack or shot points
GOODMARKER: if a good marker has been found for the line
GOODREFLECT: if the reflection curvature decreases with depth and no reflections cross
HALF-SPREAD: half the geophone spread length
HIGHRES: if high resolution analysis should be done for the line
ISTAT?: if this is thought to be a statics problem
ITDIST: the inter-trace distance for the chosen reflection
LONGWAVE: if automatic long-wave correction should be done
LWISOLATED: if the long wave anomaly is isolated
LWPROCESS: if the user wants to process the long wave statics
MAXANOMAMP: the maximum amplitude of all anomalies
MAXOFFSET: the maximum offset
MAXSTAT: the maximum statics allowable
MAXSWAMP: the maximum amplitude of the short wave anomalies
MAXTIMESHIFT: the estimated maximum time shift between shot points
MF: the number of traces per fold
MINRECFREQ: the minimum recorded frequency
MINSWEEP: the minimum sweep frequency
MONOFREQ: if the noise has a narrow amplitude spectrum
NEARESTMARKER: the line nearest to the shot
NEARTIME: the time that the near trace for this reflection occurred
NEARTRACE: the near trace number for the chosen reflection (horizon)
NOSTAT: the user's certainty that this is not a statics problem
NUMBETWEEN: the number of traces between shot points
NUMCDP: the number of CDPs along which the deformation extends
NYQUIST: the nyquist of the line
ONCE-SPREAD: the spread length
PERCENTREVPOL: the percentage of traces with reverse polarity
PRESERVESTRUCPOS: if the user needs to preserve the structural position
PROBCAUSE: the probable causes for the statics found in the line
PROCLONGWAVE: if the user wants to process the long wave statics
REALLYBAD: if processing has been checked and statics are apparently the problem
REALLYSTAT: the certainty that this is really a statics problem
RECORDER: the types of recorder used for the line
REFLECTIONSN: the S/N ratio for the reflection
REFSNVERY: the S/N ratio for a reflection is very bad
REGEOM: if the geometry is regular for the line
RELEVENTS: if there are reliable events
REVPOL: if traces with reverse polarity have been noticed
SEMI-PROC: the type of semi-automatic processing needed
SEMIAUTOMATIC: if semi-automatic processing is needed for the line
SHALLOWNOISE: if bad S/N ratio is noticed below the mute
SHORTWAVE: the processing for automatic short-wave correction
SHOTHOLE: if dynamite was shot in a shothole
SPANOM: if surface consistent anomalies are seen in the shot point gather
SPDISPLAY: if there is a display of all shot points for the line
SPIKED: if there are spiked or clipped samples for the line
SPMULT: if multiple interference is seen in the shot point display
SPPLOT: if shot points have been plotted for the line
SPREFLECT: if reflections are seen in the shot point display for the line SPREFQUAL: the quality of the reflections in the line
STATPROB: if this should be considered a statics problem
STOP: if the consultation should stop at this point
STRONGINT: if strong interference caused by air wave or organized noise is noticed
STRONGROLL: if there is a strong ground roll
SWAMPLITUDE: the maximum amplitude of all shortwave anomalies, chattering, and time-shifts
TIMESHIFT: if a time shift from one shot point to another is apparent
TWICE-SPREAD: twice the geophone spread length
UPHOLE: if uphole data was collected
VELCOMPAT: if calculated velocities are consistent with estimated velocities
VLDEFORM: if there is a very large deformation of the first breaks
VNEAR: the velocity at the near trace of the reflection

HORIZON PARAMETERS

Initialdata Parameters:
  HORIZTIME the beginning time of the horizon
Goal Parameters:
  none
Other Parameters:
  ALLINE: if the horizon exists all along the line
  COHERENT: if the horizon is a quite coherent event
  COHERPOST: if the horizon is coherent enough to calculate automatic continuous velocity horizon after SATAN
  FAULTED: if the horizon is faulted
  IMMUTE: if the delta-T of the Horizon is insignificant because of its extent into the mute zone
  MULTINTER: if there is multiples interference in the horizon

ANOMALY PARMETERS

Initialdata Parameters:
  ANOMAMPLITUDE: the amplitude of the anomaly (in msec)
  ANOMEXTENT: the length of the anomaly with respect to geophone spread length
Goal Parameters:
  none
Other Parameters:
  ANOMTYPE: the type of statics indicated by the horizon

MARKER PARAMETERS

Initialdata Parameters:
  START#: the trace number where the marker starts
  END#: the trace number where the marker ends
  MARKERVEL: the velocity of the marker
  MARKERFREQ: the frequency of the marker
Goal Parameters:
  none
Other Parameters:
  WIDTH: the width of the marker

PROGRAM PARAMETERS

Initialdata Paremeters:
  none
Goal Parameters:
  ARGUMENTS: the arguments for the program
  ARG-EXPLANATIONS: the explanation fo the arguments
Other Parameters:
  LCN01-A: the first argument for a filter
  LCN01-B: the second argument for a filter
  LCN01-C: the third argument for a filter
  LCN01-D: the fourth argument for a filter
  ORDER#: the program order
  PROGRAM-GROUP: the group of programs to which this program belongs
  PROGRAM-NAME: the name of the program
  TIR: the trace interval for a SATAN program

---

APPENDIX VII
WAVES LISP FUNCTIONS USED IN
MAKING PROGRAM CONTEXTS

---

```
(FINDUNIQUECNTXT
    [LAMBDA (BELOW TYPE)
        (PROG (LOWER)
            (SETQ LOWER (GETP BELOW TYPE))
            (*LOWER is the list of contexts of type TYPE
            which are under context BELOW in the context
            tree. Each element of LOWER is a pair (context
            1000))
            (COND
                ((AND LOWER (NULL (CDR LOWER)))     (*There is
                                                    a single
                                                    context;
                                                    return it.)
                        (RETURN (CAAR LOWER])
(MAKEINSTANCE
    [LAMBDA (CNTXT CTYPE PAIRS)
        (VALIST CNTXT CTYPE NIL T T NIL (for PAIR in PAIRS
                        join (LIST (CAR PAIR)
                                    (LIST (LIST
                                        (CADR PAIR)
                                        1000])
(MAKEINSTRANS
    [LAMBDA (CNTXT TYPE PAIRS)
        (CONS "Create a"
            (CONS (PARMGET TYPE 'TYPETRANS)
                (CONS "with" (JOINCLAUSES
                    (CADR PAIRS)
                    (FUNCTION (LAMBDA (PAIR)
```

-continued

APPENDIX VII
WAVES LISP FUNCTIONS USED IN
MAKING PROGRAM CONTEXTS

```
                (CONS (CADR PAIR)
                      (CONS "for" (CPTRANS CNTXT
                      (CAR PAIR])
(MAKECNTXT
    [LAMBDA (CNTXT PARM ALIST EXPL QUIET)
        (PROG (DONTRACE (CONSULTINDENT 0))
            (*Rebind DONTRACE so that se can trace the GOALS
            of the contexts that get set up. Set CONSULTINDENT
            to 0 so that we don't indent for these invisible
            contexts.)
            (for V in (VALYEW (SUBVAL CNTXT PARM)
                        PARM)
                bind (THISTYPE_(GETP CNTXT 'CRE8))
                    CLST PARENT CTYPE
                when (SETQ CTYPE (CDR (FASSOC (CAR V)
                            ALIST)))
                do (COND
                    ([EQ THISTYPE (CAR (SETQ CLST (GETP CTYPE
                    'ASSOCWITH]
            (*THISTYPE is the context type of CNTXT.
            CTYPE is directly below THISTYPE in the tree of
            context types.)
                    (SETQ PARENT CNTXT))
                    [(FMEMB THISTYPE CLST)
            (*CTYPE is below THISTYPE in the tree of context
            types. Set PARENT to the descendant of CNTXT under
            which the new context should be created.)
                    (SETQ PARENT CNTXT)
                    (for C in (CDR (FMEMB THISTYPE (REVERSE
                    CLST)))
                        do (COND
                            ((NULL (SETQ PARENT (FINDUNIQUECNTXT
                            PARENT C))) (*we are unable to find a
                            unique context of type C)
                                (RETURN]
                    (T
            (*A context of type CTYPE cannot hang below a
            context of type THISTYPE. Since there's no where
            to put this context; do nothing.)
                    (SETQ PARENT)))
            (COND
                (PARENT     (*Create a new context of
                            type CTYPE as a descendant
                            of PARENT.)
                    (VALIST PARENT CTYPE NIL T QUIET])
```

APPENDIX VIII
WAVES LISP FUNCTIONS FOR GENERATING A
SEISMIC DATA PROCESSING JOB

```
(PRINTPROCESSING
    [LAMBDA NIL
        (DECLARE (SPECVARS LABEL.ORDER))
        (RESETLST
            (PROG ((VALUES (GETALL PROGRAM T)))
                (RESETSAVE (GCGAG))
                (TERPRI)
                (COND
                    ((NOT VALUES)
                        (SPRINTT (CONS
                            "I was unable to make any conclusions
                            regarding" (NCONC1 (CPTRANS CNTXT
                            'PROGRAM) '%.))
                                0 5))
                    (T
                    (SPRINTT (NCONC (CAPITALIZE (CPTRANS CNTXT
                    'PROGRAM))
                            (LIST "are as follows:"))
                    0 5)
                    (TERPRI)
                    [COND
                    ((CDR VALUES)
                        (SORT VALUES (FUNCTION (LAMBDA (X Y)
                            (LESSP* (VAL1 (CAR X)
                                            'ORDER#)
                                    (VAL1 (CAR Y)
```

APPENDIX VIII
WAVES LISP FUNCTIONS FOR GENERATING A SEISMIC DATA PROCESSING JOB

```
                          'ORDER#]
(RESETSAVE (LINELENGTH 80))
(for PAIR in VALUES bind LEN STRING
  do [SETQ STRING (CONCAT "* " (VAL1 (CAR PAIR)
                                 'PROGRAM-NAME]
     (SETQ LEN (NCHARS STRING))
     (COND
       [(SETQ ARGS (VALYEW (CAR PAIR)
                           'ARGUMENTS))
         (for I from LEN to 29
           do (SETQ LEN (ADD1 LEN))
              (SETQ STRING (CONCAT STRING " ")))
         (for TAIL on ARGS as ARG is (CAR TAIL)
           bind PIECE PLEN NEWLEN
           do [SETQ PIECE
                  (COND
                    ((EQ (CAR (LISTP (CAR ARG)))
                         'TEXT)
                     (PACK (CDDAR ARG)))
                    (T (CAR ARG])
              (SETQ PLEN (NCHARS PIECE))
              (SETQ NEWLEN (IPLUS LEN PLEN 1))
              (COND
                [(NULL (CDR TAIL))
                  (COND
                    ((ILESSP NEWLEN 81)
                     (WRITE (CONCAT STRING PIECE)))
                    (T (WRITE STRING)
                       (WRITE (CONCAT "   "
                                      PIECE]
                ((IGREATERP NEWLEN 80)
                 (WRITE STRING)
                 (SETQ STRING (CONCAT "   "
                                      PIECE ","))
                 (T SETQ LEN (IPLUS PLEN 31))))
                (T (SETQ STRING (CONCAT STRING PIECE ",")))
                   (SETQ LEN NEWLEN])
         (T (WRITE STRING)))
     (COND
       ((SETQ ARGS (VALYEW (CAR PAIR)
                           'ARG-EXPLANATIONS))
         (*This assumes that explanation of the program
           arguments is the first GOAL of the context type.)
         (TERPRI)
         (for VAL in ARGS
           do (PRIN1 "*C")
              (SPRINTT (COND
                         ((EQ (CAR (LISTP (CAR VAL)))
                              'TEXT)
                          (CDDAR VAL))
                         (T (CAR VAL)))
                       8 15 15))
     (TERPRI])
```

What is claimed is:

1. A computer system comprising, in combination,
means for receiving a specification of a problem from a user,
a memory having stored therein predefined knowledge about methods of solving problems relating to a certain problem area including knowledge about methods of employing certain capabilities of a target computer system to solve problems relating to said problem area, and
means for using said predefined knowledge to determine whether it is impractical to design a computer program for said target computer system that uses said capabilities of said target computer system to solve the problem specified by said user, so that said problem specified by said user is rejected as inappropriate when it is impractical to design a computer program for using the capabilities of said target computer system to solve said problem.

2. The system as claimed in claim 1, further comprising means for generating a diagnosis characterizing the impracticality of designing a computer program for said target computer system when said means for using said predefined knowledge determines that it is impractical to design a computer program for said target computer system that uses said capabilities of said target computer system to solve the problem specified by said user.

3. The system as claimed in claim 2, further comprising means for conveying said diagnosis to a designated recipient.

4. The system as claimed in claim 2, further comprising means for conveying said diagnosis to said user.

5. The system as claimed in claim 2, further comprising means for generating an explanation of reasons for said diagnosis.

6. The system as claimed in claim 1, further comprising means for generating a design for a program for using said capabilities of said target computer system to solve said problem when said means for using said predefined knowledge does not determine that it is impractical to design a computer program for said target computer system that uses said capabilities of said target computer system to solve the problem specified by said user.

7. The system as claimed in claim 6, further comprising means for storing and retrieving said design in and from memory.

8. The system as claimed in claim 6, further comprising means for generating an explanation of reasons why said design is appropriate for using said capabilities of said target computer system to solve said problem.

9. The system as claimed in claim 6, further comprising means for coding a computer program according to said design for execution on said target computer system.

10. The system as claimed in 9, further comprising means for generating a description of said coded computer program.

11. The system as claimed in claim 10, wherein said means for coding incorporate at least a portion of said description into said computer program as comments.

12. The system as claimed in claim 1, wherein said means for receiving a specification of a problem from a user include means for accepting initial information in response to presenting to the user predetermined initial inquiries, and means for soliciting and accepting information selected in response to the initial information accepted from the user.

13. The system as claimed in claim 1, wherein the capabilities of said computer system include software capabilities defined by a set of predefined programs having respective arguments which specify the operation of the programs, and a set of predetermined modules defining particular sequences of certain ones of the programs for solving certain kinds of problems in said problem area.

14. The system as claimed in claim 13, wherein said modules perform static corrections upon traces of seismic data.

15. The system as claimed in claim 14, wherein said set of modules includes modules for semi-automatic corrections, automatic long-wave corrections, and automatic short-wave corrections.

16. The system as claimed in claim 1, wherein the target computer system capabilities perform data analysis.

17. The system as claimed in claim 16, wherein said data analysis includes analysis of seismic data.

18. The system as claimed in claim 1, wherein said predefined knowledge about methods of solving problems relating to said problem area is stored in the form of distinct rules and wherein said means for using said predefined knowledge include an interpreter having an inference engine for applying said rules to said specification received from said user.

19. The system as claimed in claim 18, wherein said predefined knowledge about methods of solving problems relating to said problem area is stored in a format including if-then rules operating upon the values of predefined parameters, and the control sequence of applying the rules is determined in part by the instantiation of contexts in a predefined context hierarchy.

20. A system comprising, in combination,
means for receiving a specification of a problem from a user,
a memory having stored therein predefined knowledge about methods of solving problems relating to a certain problem area including knowledge about methods of employing certain capabilities of a target computer system to solve problems relating to said problem area, and
means for generating a design for a program for using said capabilities of said target computer system to solve said problem.

21. The system as claimed in claim 20, further comprising means for storing and retrieving said design in and from memory.

22. The system as claimed in claim 20, further comprising means for generating an explanation of reasons why said design is appropriate for using said capabilities of said target computer system to solve said problem.

23. The system as claimed in claim 20, further comprising means for coding a computer program according to said design for execution on said target computer system.

24. The system as claimed in 23, further comprising means for generating a description of said coded computer program.

25. The system as claimed in claim 24, wherein said means for coding incorporate at least a portion of said description into said computer program as comments.

26. The system as claimed in claim 20, wherein said means for receiving a specification of a problem from a user include means for accepting initial information in response to presenting to the user predetermined initial inquiries, and means for soliciting and accepting information selected in response to the initial information accepted from the user.

27. The system as claimed in claim 20, wherein the capabilities of said computer system include software capabilities defined by a set of predefined programs having respective arguments which specify the operation of the programs, and a set of predetermined modules defining particular sequences of certain ones of the programs for solving certain kinds of problems in said problem area.

28. The system as claimed in claim 27, wherein said modules perform static corrections upon traces of seismic data.

29. The system as claimed in claim 28, wherein said set of modules includes modules for semi-automatic corrections, automatic long-wave corrections, and automatic short-wave corrections.

30. The system as claimed in claim 20, wherein the target computer system capabilities perform data analysis.

31. The system as claimed in claim 30, wherein said data analysis includes analysis of seismic data.

32. The system as claimed in claim 20, wherein said predefined knowledge about methods of solving problems relating to said problem area is stored in the form of distinct rules and wherein said means for using said predefined knowledge include an interpreter having an inference engine for applying said rules to said specification received from said user.

33. The system as claimed in claim 32, wherein said predefined knowledge about methods of solving problems relating to said problem area is stored in a format including if-then-rules operating upon the values of predefined parameters, and the control sequence of applying the rules is determined in part by the instantiation of context types in a predefined hierarchy of context types.

34. A computer system comprising, in combination,
a memory having stored therein predefined knowledge about methods of solving problems relating to a certain problem area including knowledge about methods of employing certain capabilities of a target computer system to solve problems relating to said problem area,
means for storing and retrieving a design for a computer program for said target computer system that uses said capabilities of said target computer system to solve a problem relating to said problem area, and
means for applying said knowledge stored in said memory to generate an explanation of reasons why said design is appropriate for using said capabilities of said target computer system to solve said problem.

35. The system as claimed in claim 34, further comprising means for coding a computer program according to said design for execution on said target computer system.

36. The system as claimed in claim 35, further comprising means for generating a description of said coded computer program.

37. The system as claimed in claim 36, wherein said means for coding incorporate at least a portion of said description into said computer program as comments.

38. An automatic programming system for designing a computer program for a target computer system having certain capabilities, said automatic programming system comprising, in combination,
means for receiving a specification of a problem,
a memory having stored therein predefined knowledge about methods of solving problems relating to a certain problem area including knowledge about methods of employing said capabilities of said target computer system to solve problems relating to said problem area,
means for using said predefined knowledge to determine whether it is impractical to generate a computer program for said target computer system that uses said capabilities of said target computer system to solve the specified problem, so that the specified problem is rejected as inappropriate when it is impractical to generate a computer program for using the capabilities of said target computer system to solve the specified problem,
means for generating a computer program for using said capabilities of said target computer system to solve the specified problem when said means for using said predefined knowledge does not determine that it is impractical to generate a computer program for said target computer system that uses said capabilities of said target computer system to solve the specified problem, and
means for generating an explanation of reasons why said computer program is appropriate for using said capabilities of said target computer system to solve said problem when said means for using said predefined knowledge does not determine that it is impractical to generate a computer program for said target computer system that uses said capabilities of said target computer system to solve the specified problem.

39. The system as claimed in claim 38, further comprising means for generating an explanation of why it is impractical to generate a computer program for said target computer system when said means for using said predefined knowledge determines that it is impractical to generate a computer program for said computer system that uses said capabilities of said target computer system to solve the specified problem.

40. The system as claimed in 38, wherein said means for generating a computer program further comprises means for generating a description of said coded computer program and incorporating at least a portion of said description into the computer program as comments.

41. The system as claimed in claim 38, wherein said means for receiving a specification of a problem include means for accepting initial information from a user in response to presenting to the user predetermined initial inquiries, and means for soliciting and accepting information selected in response to the initial information accepted from the user.

42. The system as claimed in claim 38, wherein the capabilities of said computer system include software capabilities defined by a set of a plurality of predefined programs having respective arguments which specify the operation of the programs, and a set of predetermined modules defining particular sequences of certain ones of the programs for solving certain kinds of problems in said problem area.

43. The system as claimed in claim 42, wherein said modules perform static corrections upon traces of seismic data.

44. The system as claimed in claim 43, wherein said set of modules include modules for semi-automatic corrections, automatic long-wave corrections, and automatic short-wave corrections.

45. The system as claimed in claim 38, wherein said predefined knowledge about methods of solving problems relating to said problem area is stored in the form of distinct rules and wherein said means for using said predefined knowledge include an interpreter having an inference engine for applying said rules to said specification received from said user.

46. The system as claimed in claim 45, wherein said predefined knowledge about methods of solving problems relating to said problem area is stored in a format including if-then-rules operating upon the values of predefined parameters, and the control sequence of applying the rules is determined in part by the instantiation of context types in a predefined hierarchy of context types.

47. A method of operating a digital computer for designing a computer program to be executed on a target computer for using predefined capabilities of the target computer to solve a specified problem, said digital computer having a memory storing predefined knowledge about methods of solving problems relating to a certain problem area including knowledge about employing said capabilities of said target computer system to solve problems relating to said problem area, said method comprising the steps of:
(1) receiving a definition of the specified problem;
(2) applying said knowledge stored in said memory to said definition of the specified problem to generate an indication of whether it is practical to design a computer program for said target computer system that uses said capabilities of said target computer system to solve the specified problem, and
(3) when step (2) indicates that it is practical to design such a computer program, applying said knowledge stored in said memory to generate a design for such a computer program.

48. The method as claimed in claim 47, wherein step (2) further comprises storing in said memory a record of the particular knowledge that is applied and which results in said indication, and wherein said method further comprises the step of interpreting said record to generate an explanation of why it was impractical to design such a computer program.

49. The method as claimed in claim 47, wherein step (3) further comprises storing in said memory a record of the particular knowledge that is applied and results in said design that is generated, and wherein said method further comprises the step of interpreting said record to generate an explanation of why said design is appropriate for using said capabilities of said target computer system to solve said problem.

50. The method as claimed in claim 47, further comprising the step of storing and retrieving in and from memory the design generated in step (3).

51. The method as claimed in claim 47, further comprising the step of:
(4) coding a computer program from said program design.

52. The method as claimed in claim 51, further comprising the step of:
(5) generating a description of the coded computer program.

53. The method as claimed in claim 52, wherein at least a portion of said description is included as comments in said coded computer program.

54. The method as claimed in claim 47, wherein said predefined capabilities of the target computer include a predefined set of computer program modules, and said step (2) of applying said knowledge to generate an indication includes selecting appropriate program modules, and indicating whether the set of selected modules is sufficient for generating a design for such a computer program.

55. The method as claimed in claim 54, wherein said modules include predefined sequences of certain programs having respective arguments that are determined for specifying the operation of the programs; and said step (3) of generating a design for such a computer program includes expanding the selected modules into ordered lists of their component programs, and applying said knowledge stored in memory to determine appropriate arguments for the programs.

56. The method as claimed in claim 55, further comprising applying said knowledge in said memory to determine an explanation of why certain arguments for the programs were determined.

57. The method as claimed in claim 55, wherein said set of modules includes modules for performing semi-automatic, automatic long-wave, and automatic short-/wave static connections to seismic data.

58. The method as claimed in claim 57, wherein said step (2) of generating an indication includes applying said knowledge in said memory to determine the appropriate statics analysis type based on the geographical area where the seismic data were collected.

59. The method as claimed in claim 58, wherein the statics analysis type is one of river-statics, mountain-statics, plain-statics, and dune-statics.

60. The method as claimed in claim 57, wherein said step (2) of generating an indication includes applying said knowledge in said memory to determine an appropriate statics analysis type based on the extent of an anomaly.

61. The method as claimed in claim 47, wherein said predefined capabilities of said target computer include a plurality of kinds of data processing operations upon data received by said target computer, and said step (2) includes applying said knowledge in said memory to determine the appropriate kind of data processing operations that should be performed by said target computer.

62. The method as claimed in claim 61, wherein said step (2) of generating an indication further includes the step of generating a list of things to check that could be responsible for an indication that it is impractical to design such a computer program.

63. The method as claimed in claim 61, wherein said step (1) of receiving a definition of the specified problem includes the steps of soliciting and accepting predetermined initial information from a user upon which the appropriate kind of data processing operation is determined, and soliciting and accepting more specific information from said user in response to the appropriate kind of data processing operations that is determined.

64. The method as claimed in claim 47, wherein said step (2) of generating an indication further includes the step of generating a list of things to check that could be responsible for an indication that it is impractical to design such a computer program.

65. A process of operating a general purpose data processor having a storage area, to generate a computer job to be executed on a target computer to perform static corrections to seismic data, said computer job comprising an ordered list of predefined component programs having respective arguments which are selected to specify the operation of the component programs, said process comprising the steps of
(a) loading into the storage area of the data processor
  (1) a predetermined data base including a set of inference rules encoding knowledge about applying static corrections to seismic data and concluding a sequence of appropriate ones of the predefined component programs and appropriate arguments in said sequence of programs in response to information about the seismic data including geological and geophysical data about the area in which the seismic data were collected, how the seismic data were collected, and information obtained by earlier processing steps performed on the seismic data, and
  (2) rule interpreter means for chaining together a subset of the inference rules to establish an inference from specified information about the seismic data and concluding an appropriate sequence of programs and appropriate arguments for the programs,
(b) inputting said specified information about the seismic data,
(c) executing the rule interpreter to chain together a corresponding subset of the inference rules to establish an inference from said specified information about the seismic data and conclude an appropriate sequence of programs and appropriate arguments for the programs in said sequence, and
(d) outputting from said data processor the concluded sequence of programs and their arguments.

66. The process of operating a general purpose data processor as claimed in claim 65, wherein rule interpreter means include means for generating in the storage area a list of the inference rules chained together to establish said inference from said specified information about the seismic data and concluding said sequence of programs and appropriate arguments and means for generating an explanation of the basis for concluding said sequence of programs and appropriate arguments by interpreting the rules in said list of inference rules, and wherein the process further comprises a step (e) of executing the rule interpreter means to generate said list of inference rules chained together and to generate a corresponding explanation by interpreting said list of rules, and a step (f) of outputting from said data processor said corresponding explanation.

67. The process of operating a general purpose data processor as claimed in claim 65, wherein said inference rules include a subset of rules to determine checks, warnings, and recommendations regarding the processing of the seismic data, and wherein said process further comprises a step of outputting from said data processor the checks, warnings, and recommendations concluded by rules in said subset.

68. The process of operating a general purpose data processor as claimed in claim 65, wherein said inference rules include a subset of rules to determine explanations of why certain arguments are appropriate for their respective programs, and wherein said process further comprises a step of outputting from said data processor the concluded explanations of why certain of the concluded arguments are appropriate for their respective programs.

69. The process of operating a purpose data processor as claimed in claim 65, wherein said inference rules include rules to find a statics analysis type based on information about the geographical area where the data was collected, rules to determine the appropriate type of processing method based on the statics analysis type and information obtained by earlier processing steps, rules to determine the appropriate programs for performing respective types of processing methods, and rules for determining appropriate arguments for respective programs.

70. The process of operating general purpose data processor as claimed in claim 69, wherein the statics analysis types include plain-statics and river-statics, and the types of processing methods include semi-automatic and automatic.

* * * * *